United States Patent
Kim

(10) Patent No.: US 10,742,922 B2
(45) Date of Patent: Aug. 11, 2020

(54) DISPLAY DEVICE AND OPERATION METHOD THEREFOR

(71) Applicant: LG ELECTRONICS INC., Seoul (KR)

(72) Inventor: Jeongsim Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/771,178

(22) PCT Filed: Mar. 23, 2016

(86) PCT No.: PCT/KR2016/002943
§ 371 (c)(1),
(2) Date: Apr. 26, 2018

(87) PCT Pub. No.: WO2017/073856
PCT Pub. Date: May 4, 2017

(65) Prior Publication Data
US 2018/0316886 A1  Nov. 1, 2018

(30) Foreign Application Priority Data

Oct. 27, 2015 (KR) ......................... 10-2015-0149777

(51) Int. Cl.
*H04N 5/445* (2011.01)
*H04N 21/485* (2011.01)
(Continued)

(52) U.S. Cl.
CPC ....... *H04N 5/44582* (2013.01); *H04N 5/4403* (2013.01); *H04N 21/42222* (2013.01);
(Continued)

(58) Field of Classification Search
None
See application file for complete search history.

(56) References Cited

U.S. PATENT DOCUMENTS

2012/0062457 A1* 3/2012 Lee .................. G06F 3/0346
345/157
2015/0084863 A1* 3/2015 Hirata ................ G06F 3/04812
345/157
(Continued)

FOREIGN PATENT DOCUMENTS

KR  10-2013-0129711 A  11/2013
KR  10-1379767 B1  4/2014
(Continued)

*Primary Examiner* — Samira Monshi
(74) *Attorney, Agent, or Firm* — Birch, Stewart, Kolasch & Birch, LLP

(57) ABSTRACT

An operation method for a display device is disclosed. An operation method for a display device according to an embodiment of the present invention comprises the steps of: displaying a pointer on a screen; receiving information on a movement of a remote control device; acquiring the coordinates of the pointer moving in response to a movement of the remote control device, on the basis of the information on a movement of the remote control device; when, on the basis of the acquired coordinates of the pointer, the pointer moves from an area in the screen to an area outside the screen, changing an input, which is provided to the display device, to an external input; and displaying an image using the external input.

16 Claims, 69 Drawing Sheets

(51) Int. Cl.
*H04N 21/431* (2011.01)
*H04N 21/422* (2011.01)
*H04N 5/44* (2011.01)

(52) U.S. Cl.
CPC ....... *H04N 21/4312* (2013.01); *H04N 21/485* (2013.01); *H04N 2005/4432* (2013.01)

(56) References Cited

U.S. PATENT DOCUMENTS

2015/0293739 A1* 10/2015 Choi .................. G06F 3/04812
 345/157
2017/0019717 A1* 1/2017 Jeon ................. H04N 21/41407

FOREIGN PATENT DOCUMENTS

| | | |
|---|---|---|
| KR | 10-2014-0096906 A | 8/2014 |
| KR | 10-2015-0019123 A | 2/2015 |
| WO | WO 2014/073926 A1 | 5/2014 |

* cited by examiner

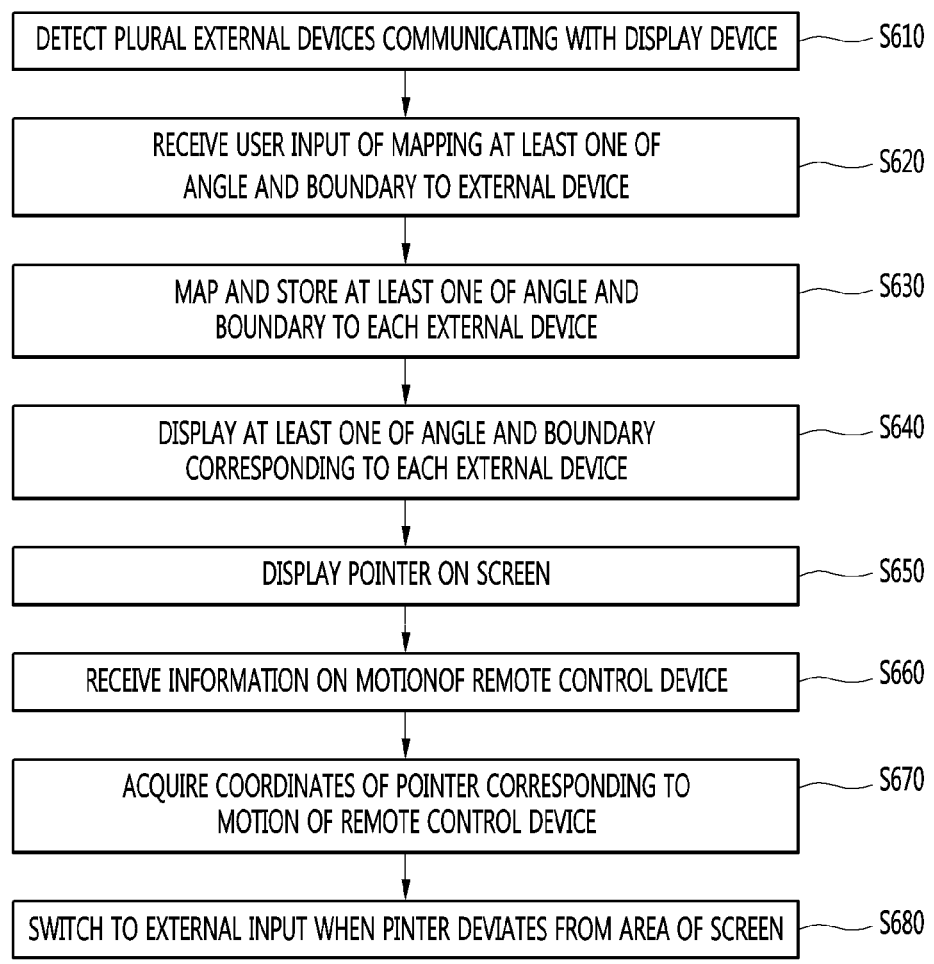

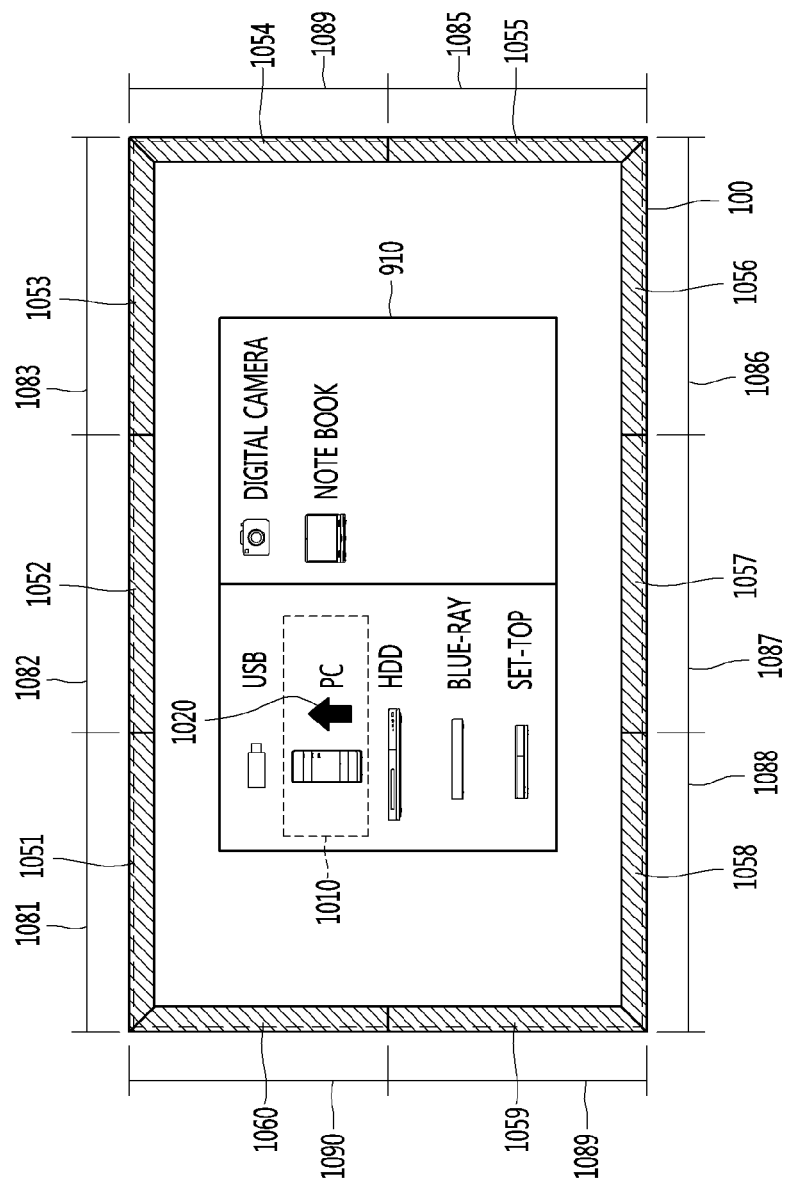

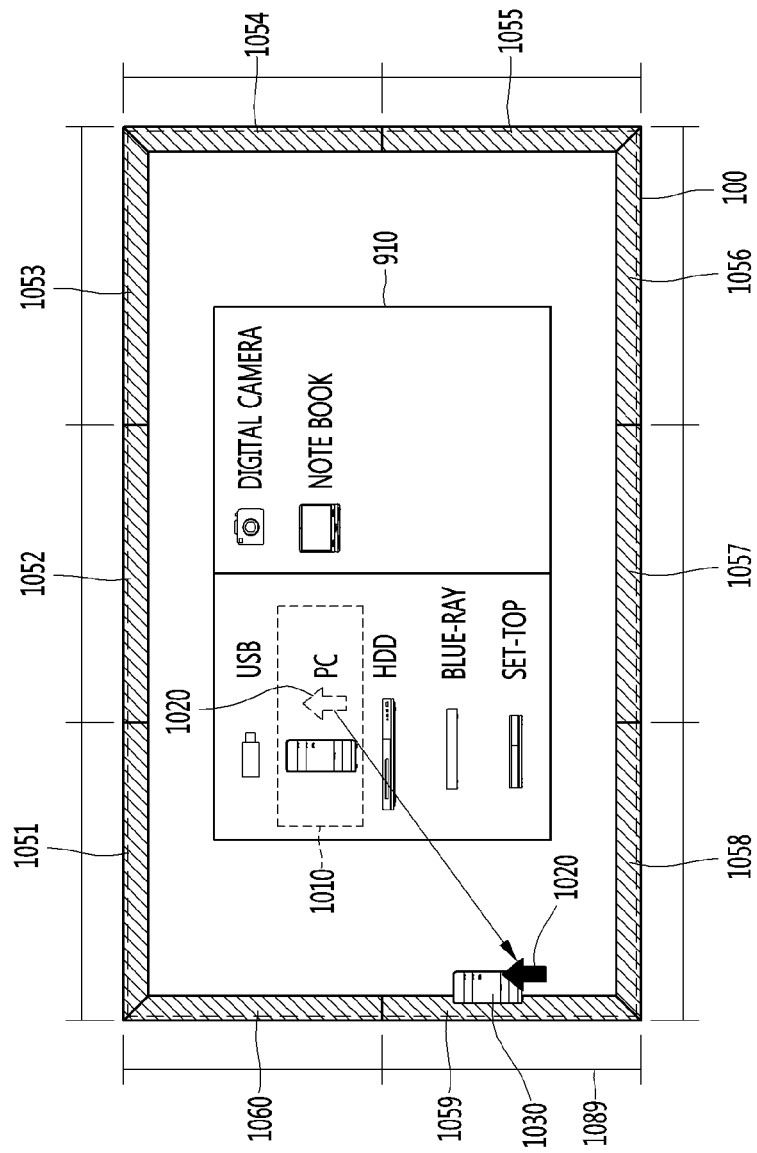

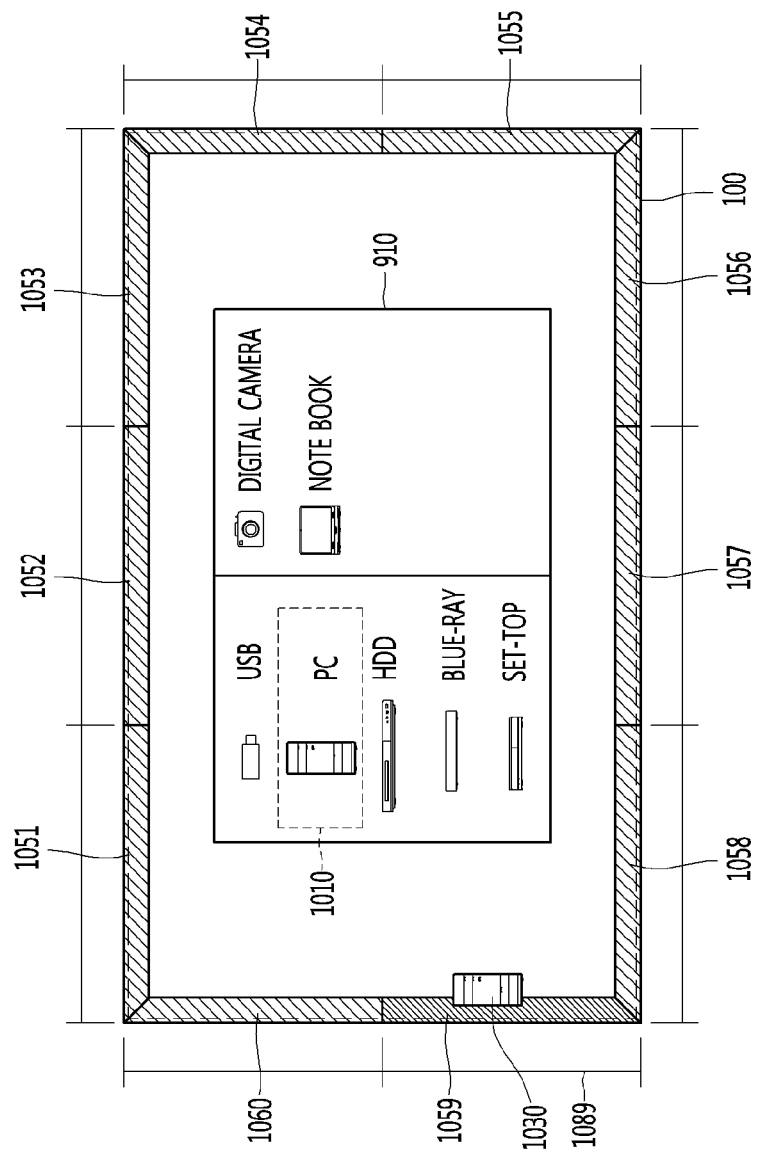

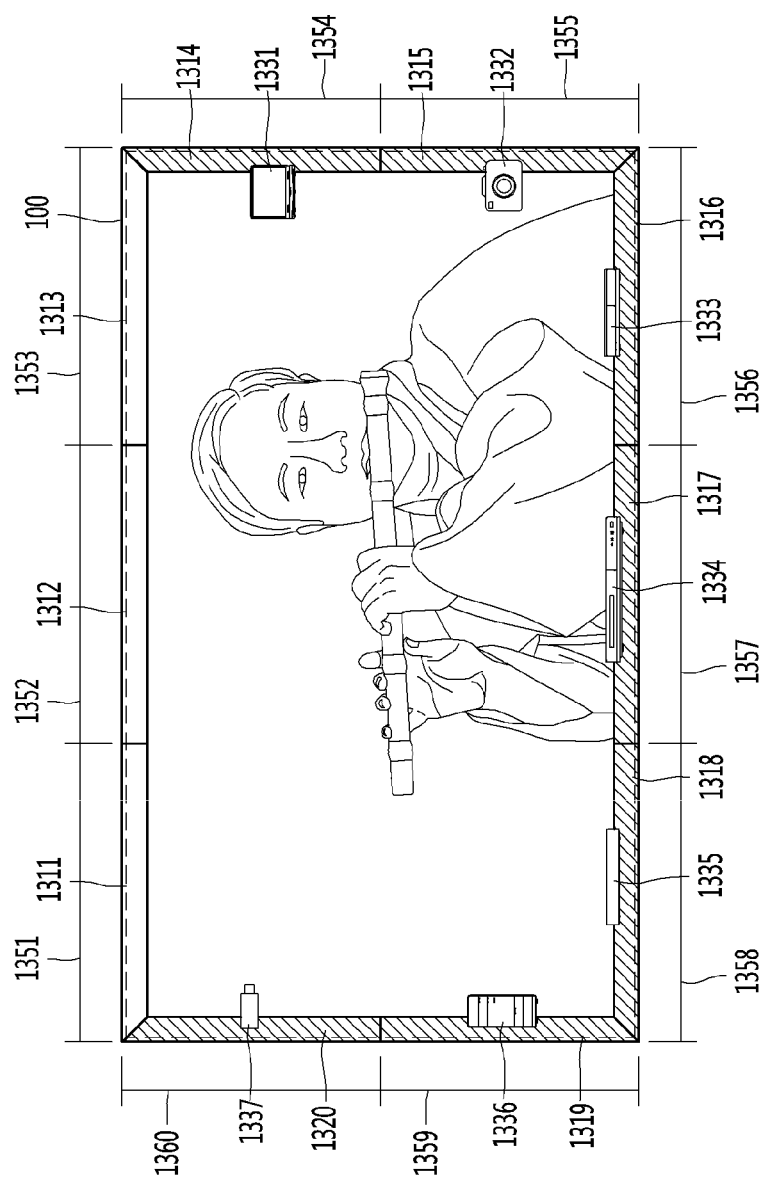

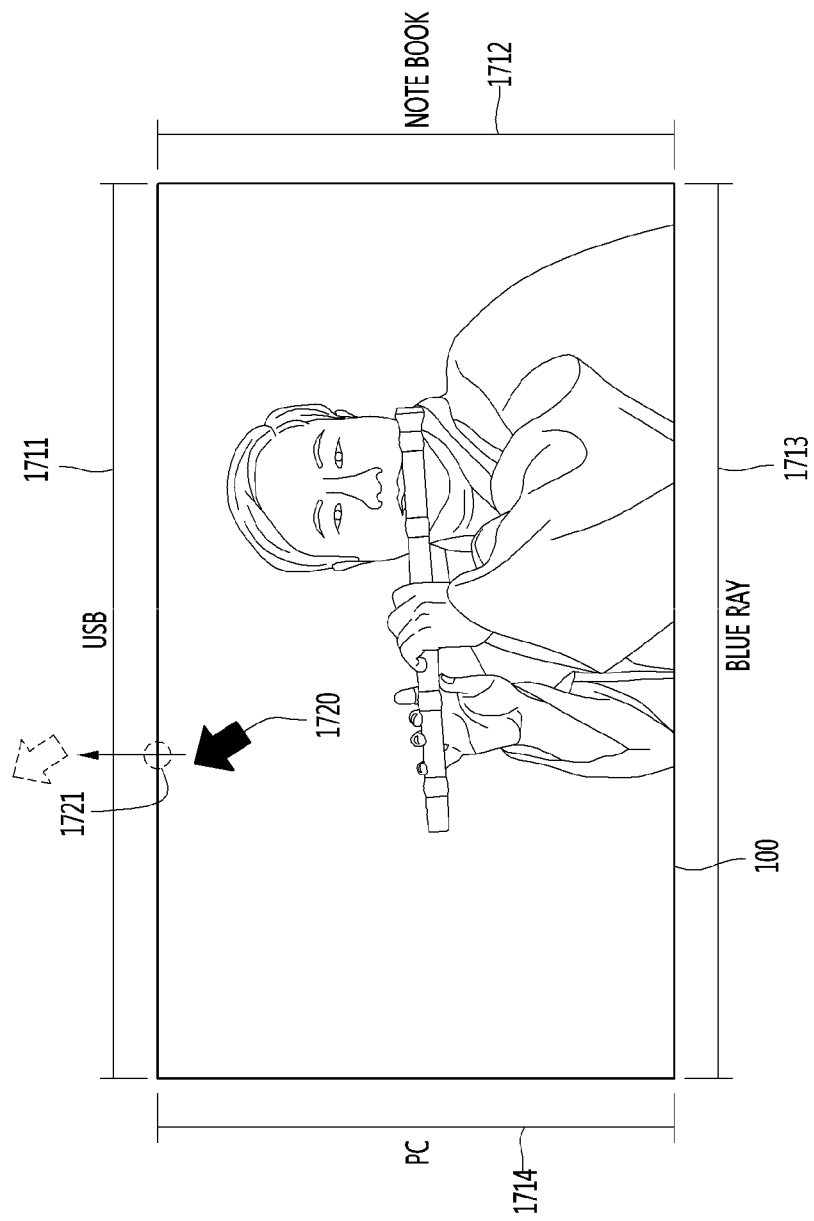

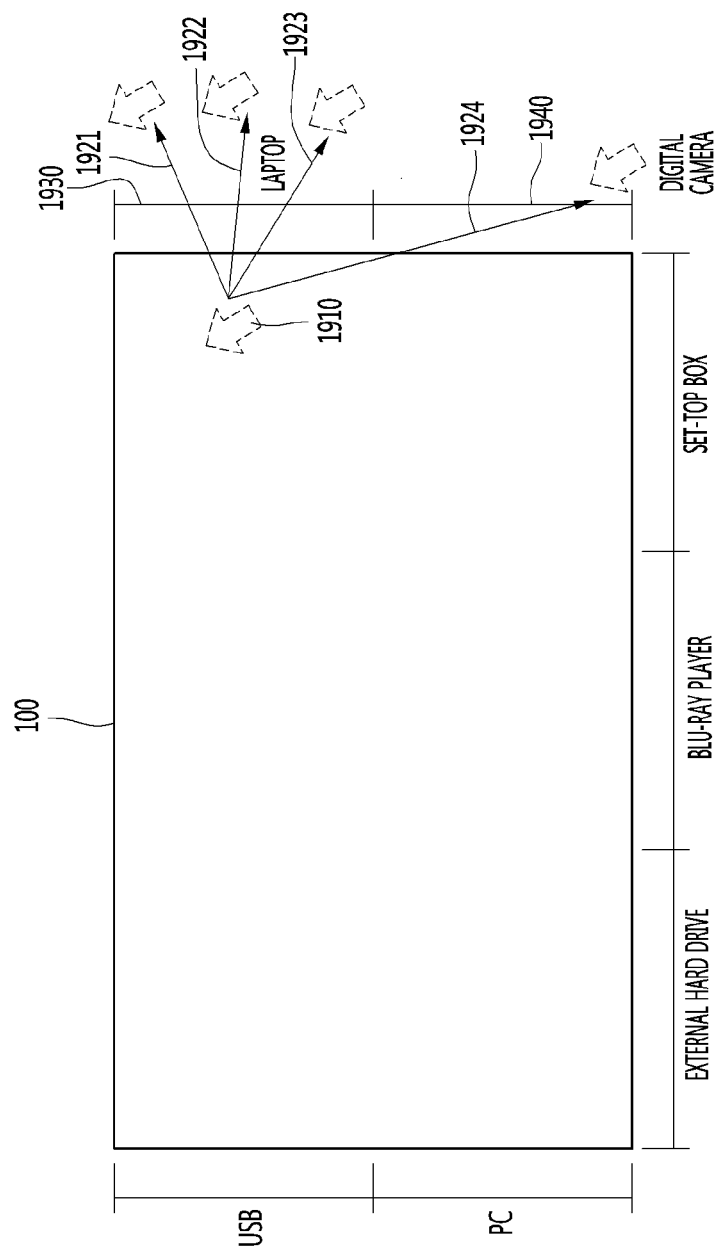

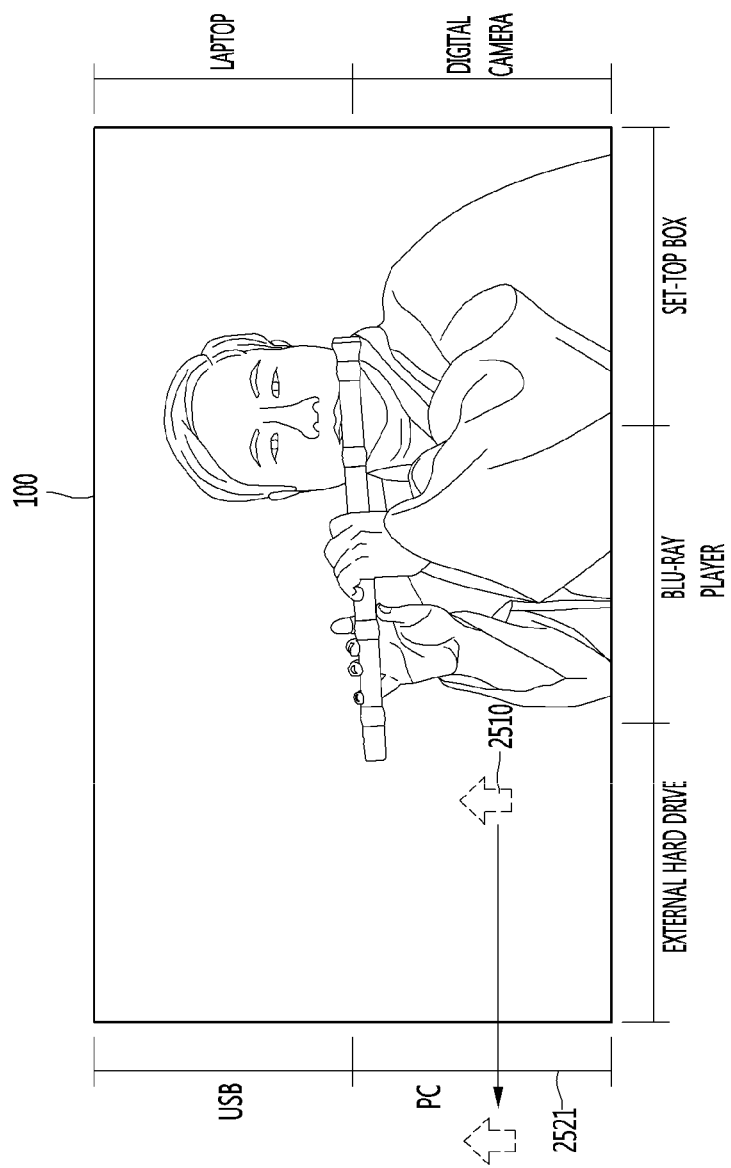

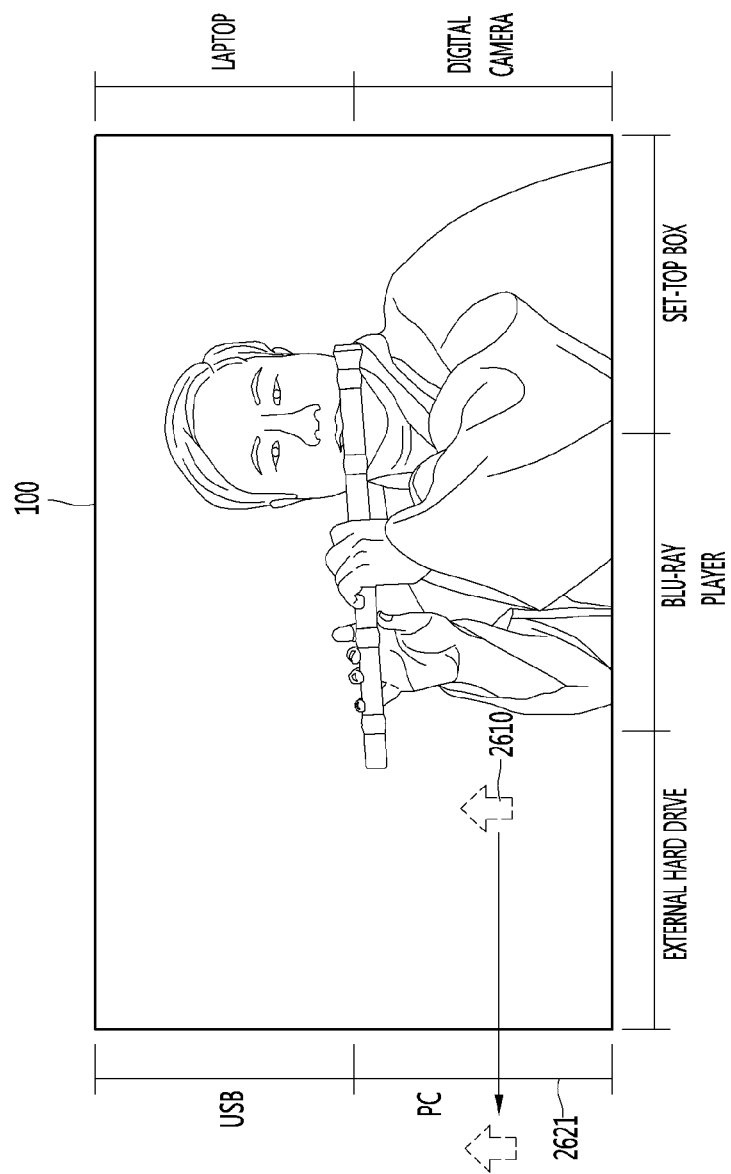

FIG. 27A
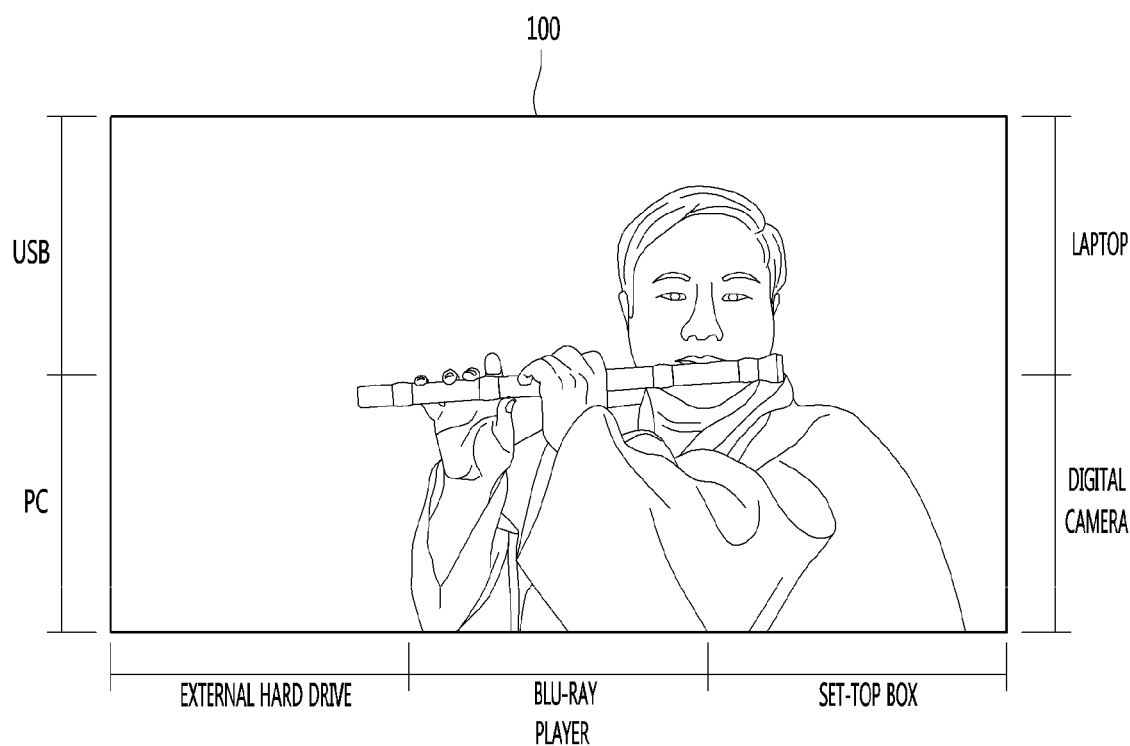
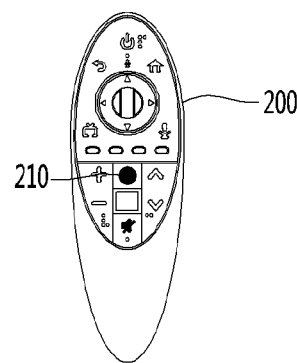

FIG. 27B
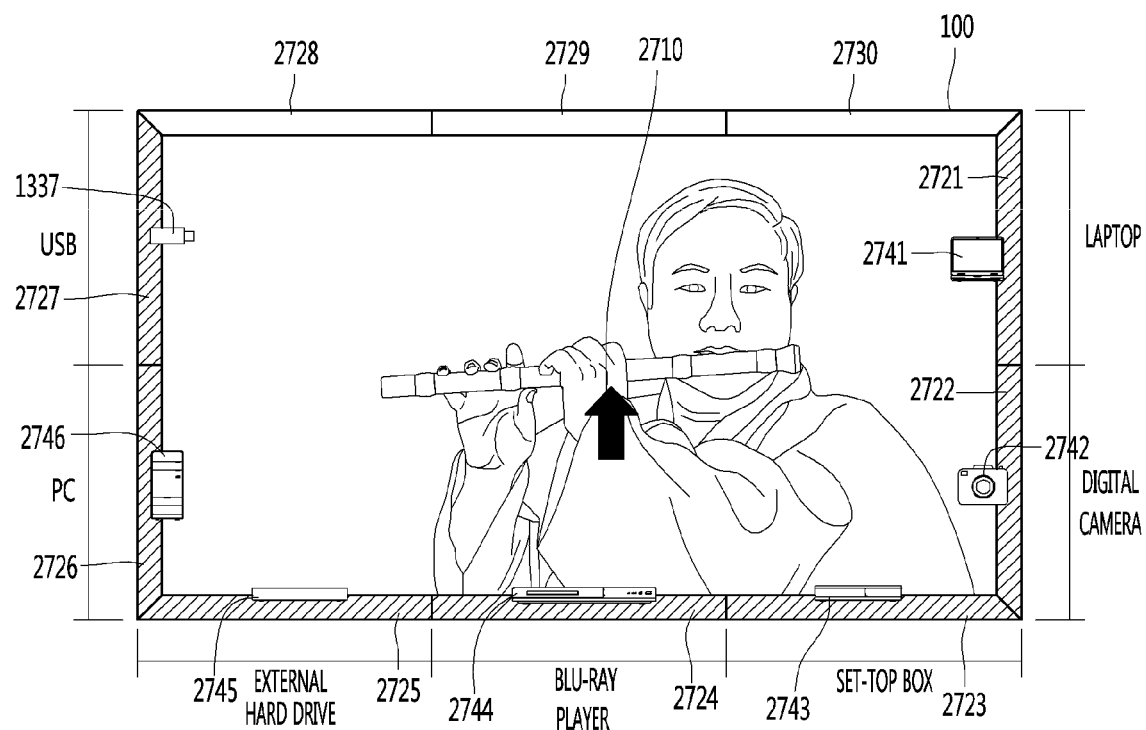
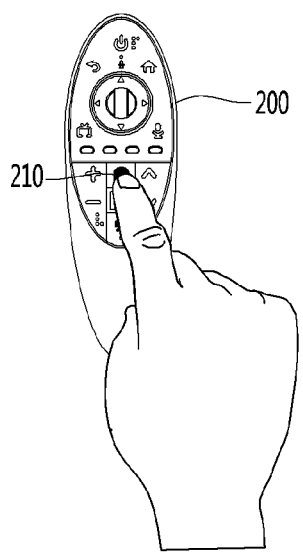

FIG. 27C
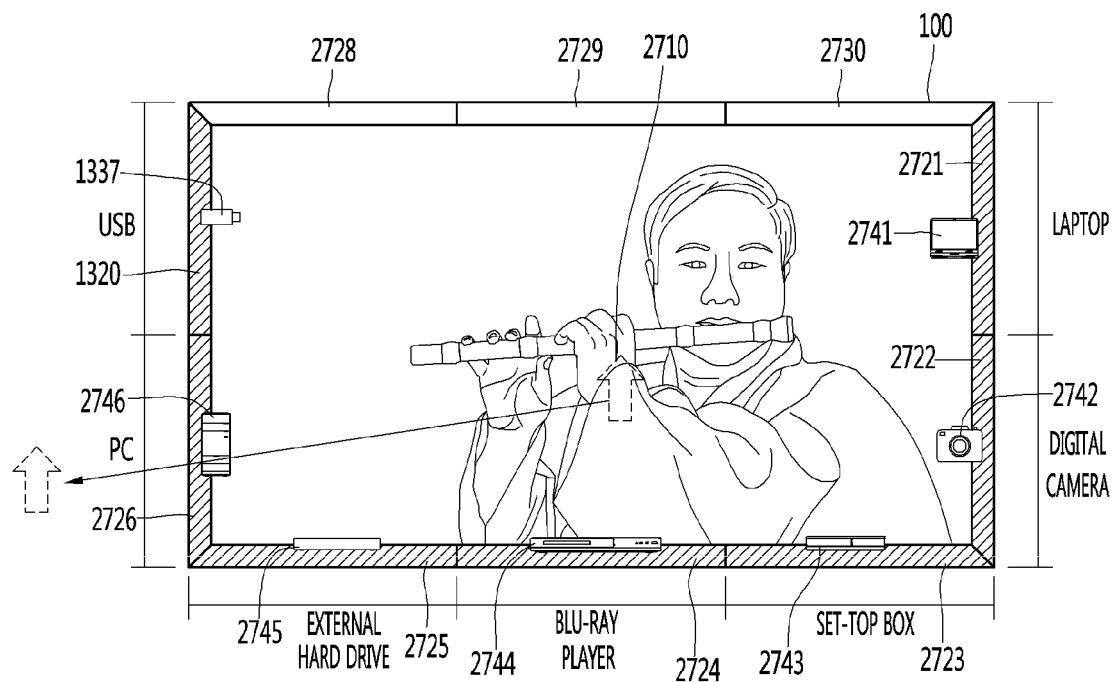
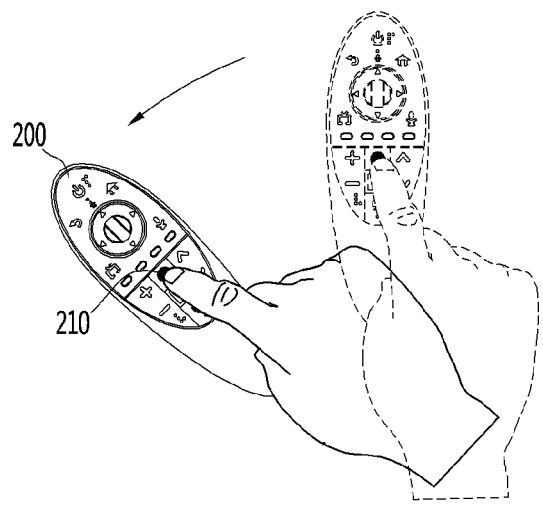

FIG. 39A
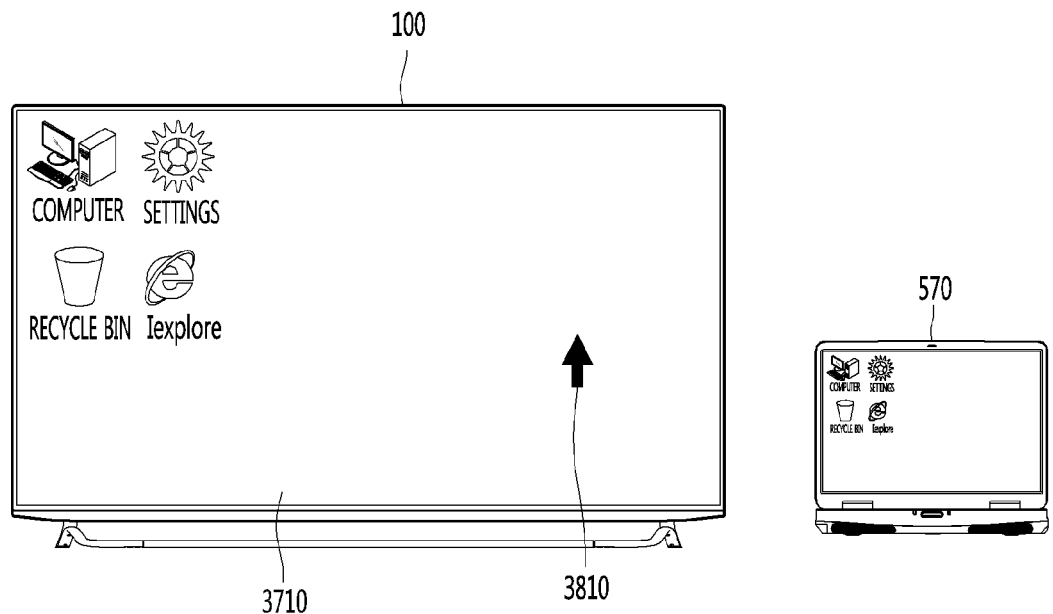
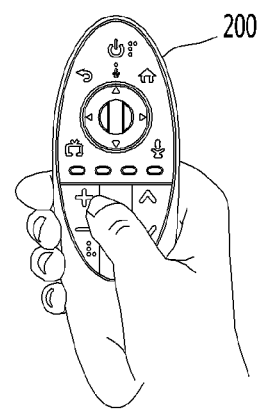

FIG. 39B
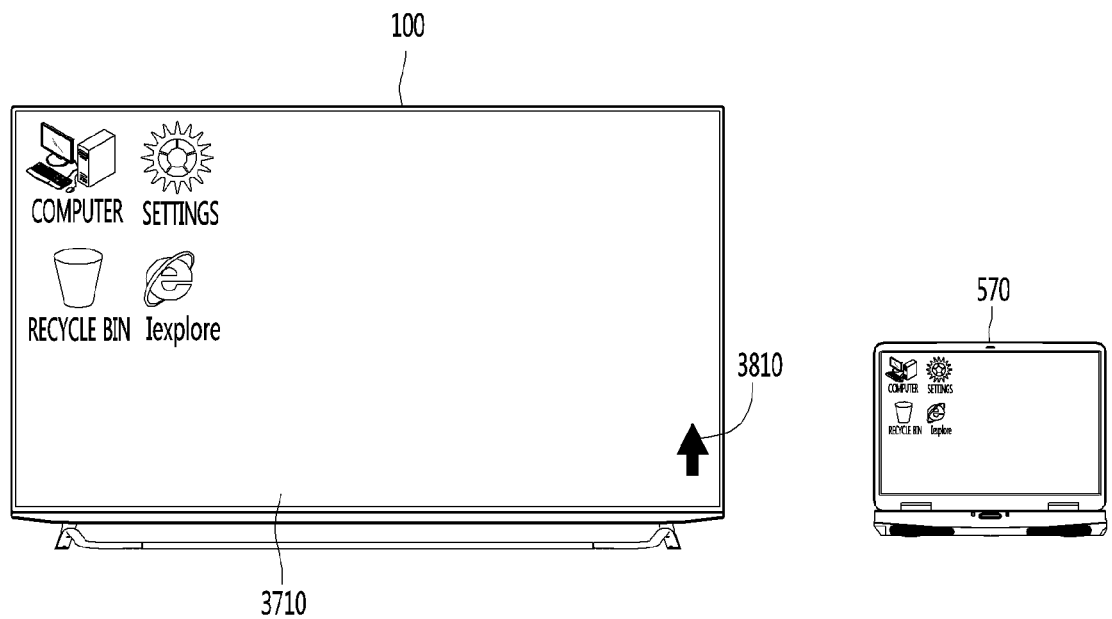
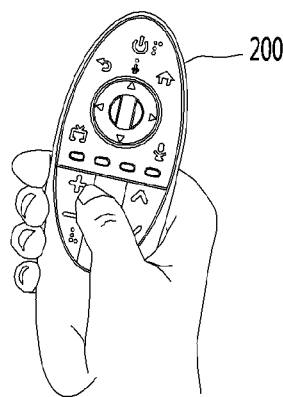

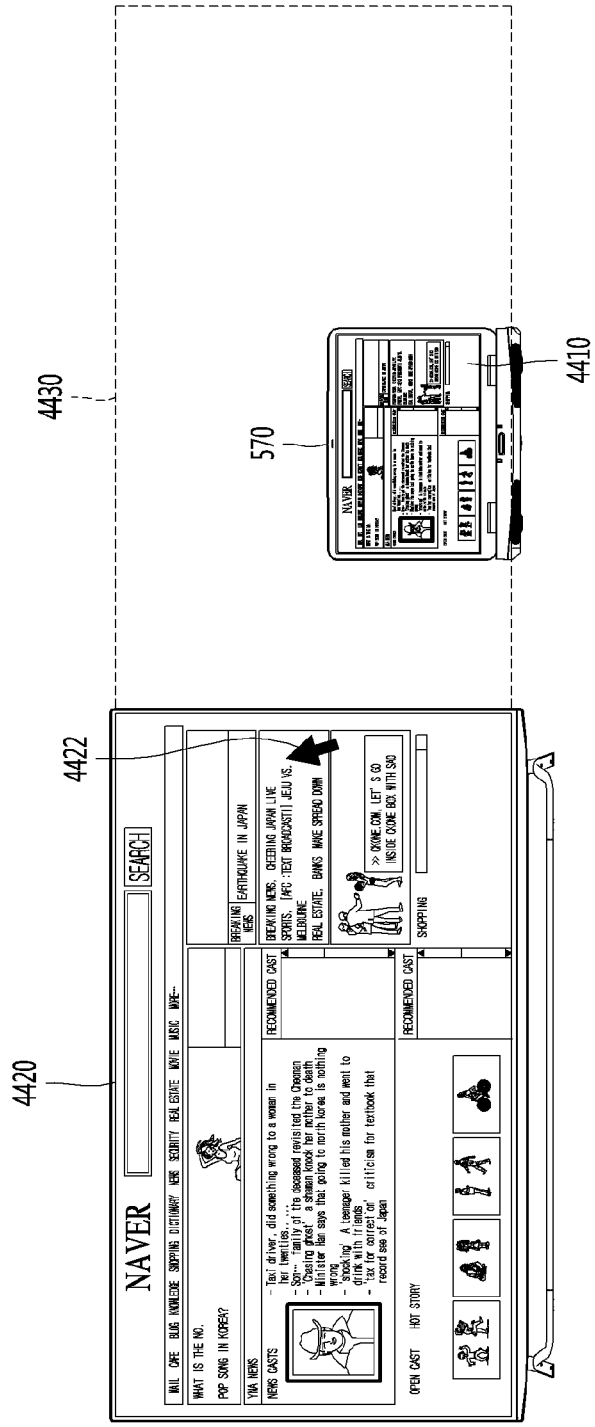

FIG. 46
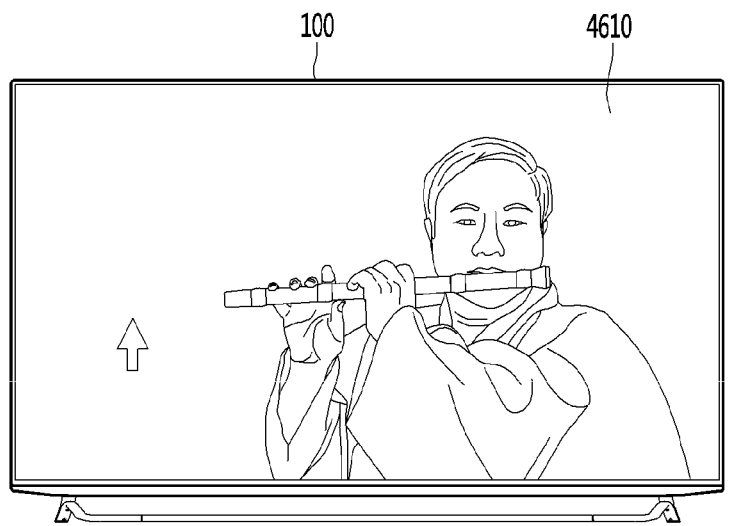
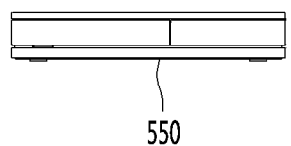

FIG. 47A
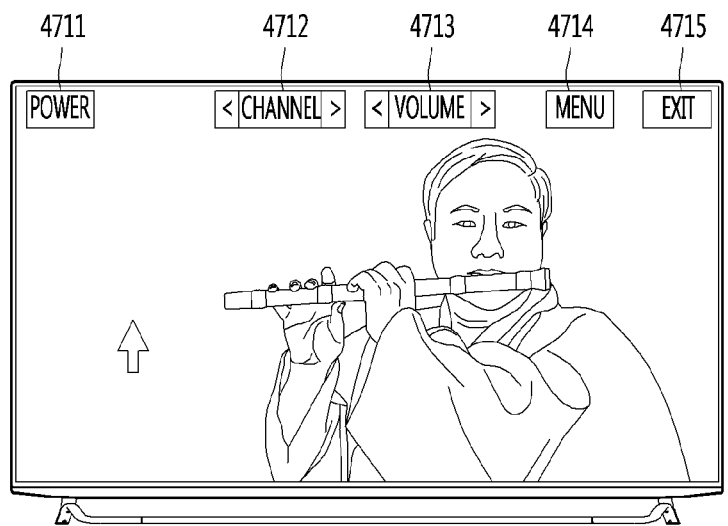
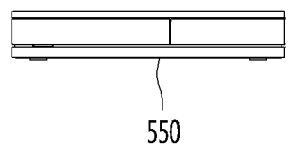

FIG. 47B
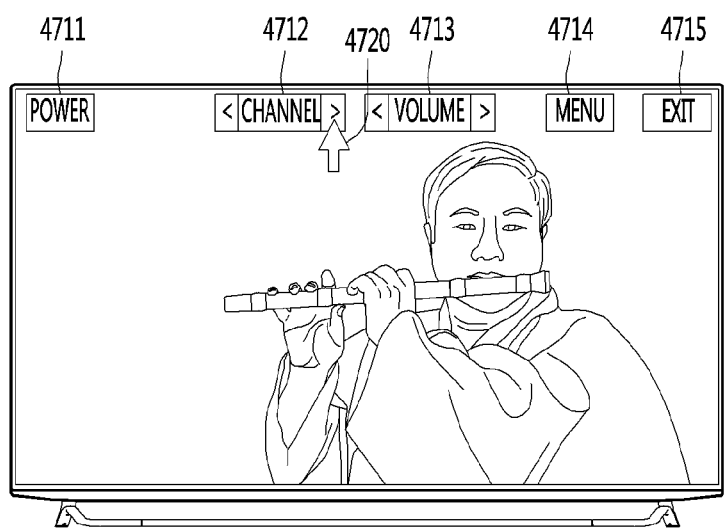
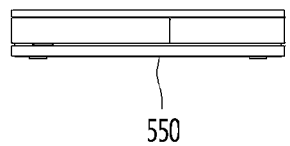

DISPLAY DEVICE AND OPERATION METHOD THEREFOR

CROSS REFERENCE TO RELATED APPLICATIONS

This application is the National Phase of PCT International Application No. PCT/KR2016/002943, filed on Mar. 23, 2016, which claims priority under 35 U.S.C. 119(a) to Patent Application No. 10-2015-0149777, filed in Republic of Korea on Oct. 27, 2015, all of which are hereby expressly incorporated by reference into the present application.

TECHNICAL FIELD

The present invention relates to a display device and a method of operating the same and, more particularly, to a display device for switching to external input when coordinates of a pointer changed according to motion of a remote control device deviate from an area of a screen, and a method of operating the same.

BACKGROUND ART

Recently, a digital TV service using a wired or wireless communication network has come into wide use. The digital TV service may provide various services which cannot be provided by an existing analog broadcast service.

For example, an Internet protocol television (IPTV) service which is a digital TV service provides interactivity for enabling a user to actively select a type of a program to be viewed, a viewing time, etc. The IPTV service may provide various additional services, e.g., Internet search, home shopping, online games, etc. based on such interactivity.

Recently, there has been an increasing number of cases in which a TV is connected to a plurality of external devices to receive and display content from an external device connected to the TV or to display a screen of an external device.

Conventionally, when user input of switching to external input is received, a plurality of interfaces is displayed and, when a user selects a specific interface, switching to external input is realized by switching input to a connected external device through the interface selected by the user.

However, in recent trends in which various external devices may be connected to a TV, a user may not intuitively determine to which external device input is switched.

In addition, since the user has to switch a screen to a screen for displaying a plurality of external inputs through user operation and to perform user operation once again to select one of the plurality of external inputs, user's TV viewing may be disturbed and the user operation needs to be performed several times, for switching to external input.

In addition, in order to control an external device for providing external input upon switching to external input, operation may be performed through an input unit installed in the external device, using a remote controller capable of controlling the external device or using an integrated remote controller capable of controlling the external device as well as the TV.

DISCLOSURE

Technical Problem

An object of the present invention devised to solve the problem lies in a display device for switching to external input when coordinates of a pointer changed according to motion of a remote control device deviate from an area of a screen, and a method of operating the same.

An object of the present invention devised to solve the problem lies in a display device for switching to external input when coordinates of a pointer changed according to motion of a remote control device deviate from an area of a screen and controlling an external device for providing external input, and a method of operating the same.

Technical Solution

A method of operating a display device according to an embodiment of the present invention includes displaying a pointer on a screen, receiving information on motion of a remote control device, acquiring coordinates of the pointer moved in correspondence with the motion of the remote control device based on the information on the motion of the remote control device, switching input provided to the display device to external input when the pointer is moved from an area of the screen to an area outside the screen, based on the acquired coordinates of the pointer, and displaying an image using the external input.

A display device according to an embodiment of the present invention includes a display unit configured to display an image, a user input interface unit configured to receive information on motion of a remote control device, an external input interface unit configured to receive input provided to the display device, and a control unit configured to display a pointer on a screen, to acquire coordinates of the pointer moved in correspondence with the motion of the remote control device based on the information on the motion of the remote control device, to switch input provided to the display device to external input when the pointer is moved from an area of the screen to an area outside the screen, based on the acquired coordinates of the pointer and to display an image using the external input.

DESCRIPTION OF DRAWINGS

FIG. 6 is a view illustrating a method of operating a display device according to an embodiment of the present invention.

FIGS. 10a to 10c are views illustrating a method of mapping boundaries respectively corresponding to a plurality of external devices to the plurality of external devices according to an embodiment of the present invention.

FIGS. 13 to 15 are views illustrating a method of displaying at least one of boundaries and directions, to which a plurality of external devices is mapped, according to an embodiment of the present invention.

FIG. 19 is a view illustrating a method of switching to external input when each of a plurality of external devices is mapped to a plurality of boundaries of an area of a screen.

FIGS. 25a to 25b are views illustrating a display screen when input provided to a display device is switched to external input, according to an embodiment of the present invention. FIGS. 26a to 26b are views illustrating a method of operating an external device when input provided to a display device is switched to external input, according to an embodiment of the present invention.

FIGS. 27a to 27c are views illustrating a process of displaying a pointer, acquiring coordinates of the pointer based on motion of a remote control device and switching to external input when the pointer deviates from an area of a screen, according to an embodiment of the present invention.

FIGS. 39a to 39d are views illustrating a method of receiving a second control signal from a remote control device and transmitting a command to a first external device based on the second control signal according to an embodiment of the present invention.

FIGS. 45a to 45b are views illustrating an operation method when a pointer moved to an area outside a screen moves back to an area of the screen according to an embodiment of the present invention.

FIG. 46 is a view illustrating operation when an external device for providing input to a display device 100 to a second external device which does not include a display device.

FIGS. 47a to 47b are views illustrating a method of controlling an external device when a second external device does not include a display device, according to another embodiment of the present invention.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
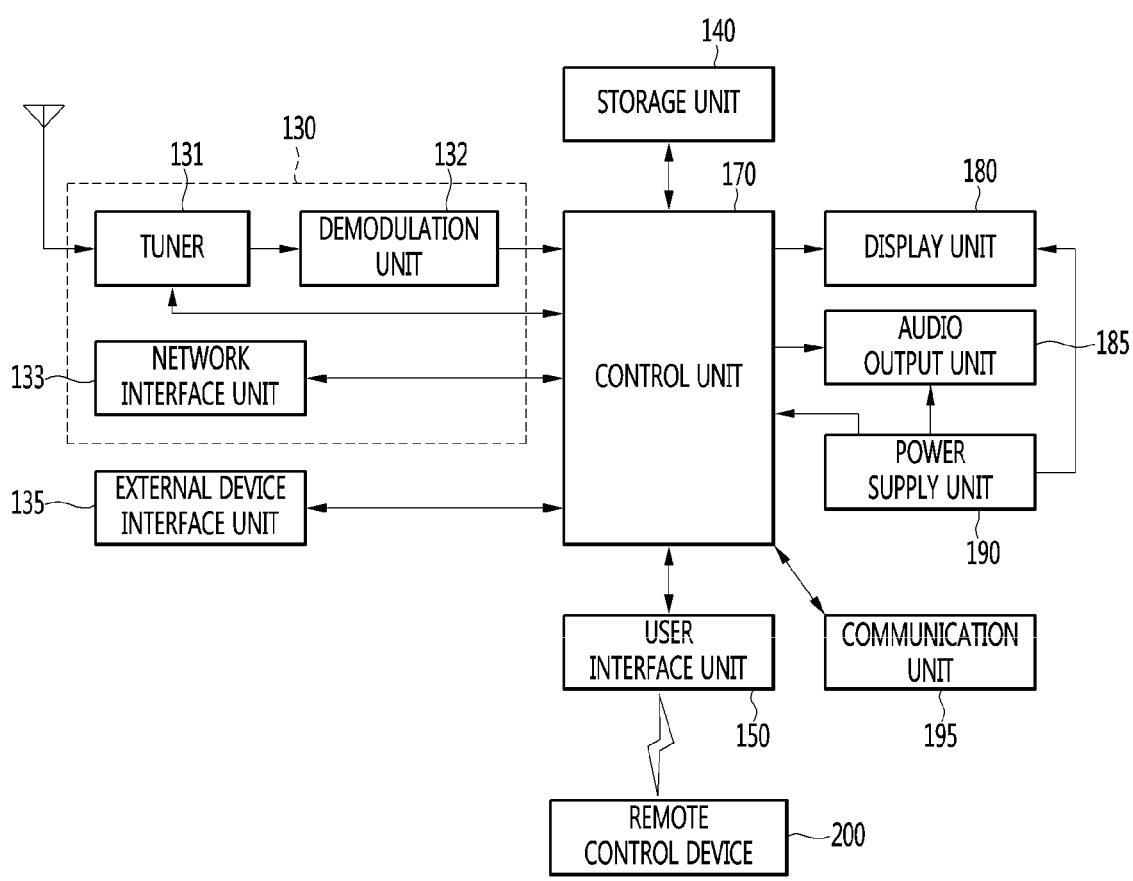
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, the display device 100 may include a broadcast reception unit 130, an external device interface unit 135, a storage unit 140, a user input interface unit 150, a control unit 170, a display unit 180, an audio output unit 185, a power supply unit 190 and a communication unit 195.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio output from an external device that is wirelessly or wiredly connected to the display device 100 and deliver it to the control unit.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

The display unit 180 can convert image signals, data signals, or OSD signals, which are processed in the control unit 170, or images signals or data signals, which are received in the external device interface unit 135, into R, G, and B signals to generate driving signals.

The communication unit 195 can exchange information with another display device through wired or wireless communication. The communication unit 195 can include a short-range communication module. The short-range communication module may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The communication unit 195 may be included in the control unit 170.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

The display device 100 may include an external input interface unit (not shown) for performing the functions of the external device interface unit 135 and the communication unit 173. That is, the display device 100 may communicate with an external device connected through the external input interface unit (not shown) or wirelessly communicate with an external device through the external input interface unit (not shown).

Figure 2:
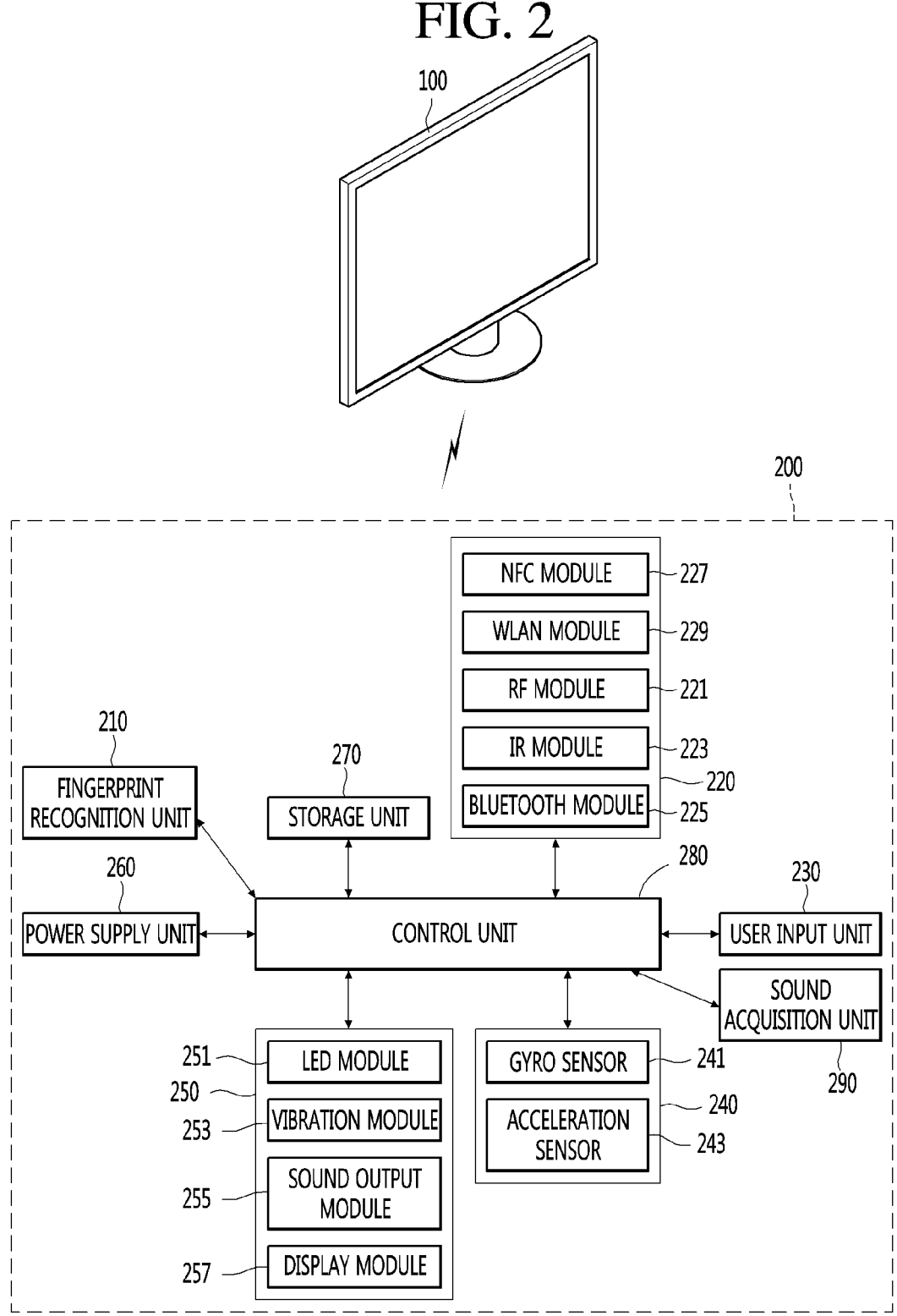
FIG. 2 is a block diagram illustrating a remote control device according to an embodiment of the present invention.
Figure 3:
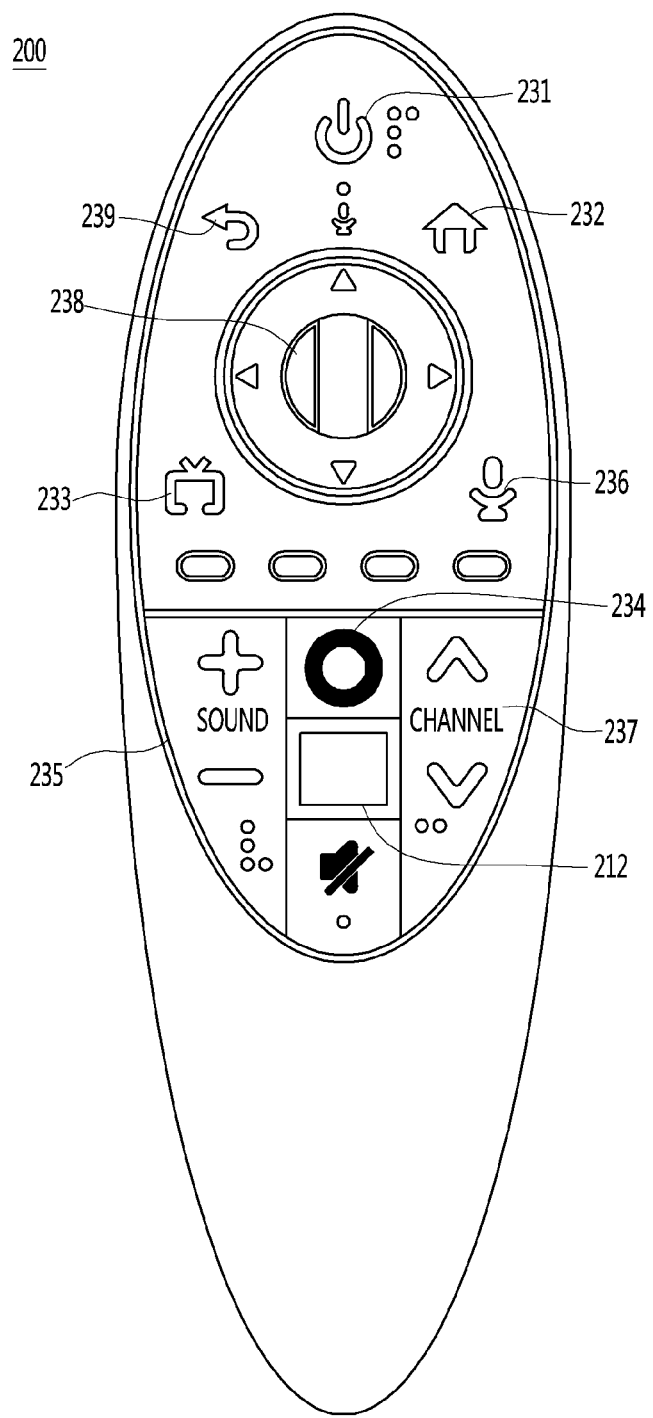
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
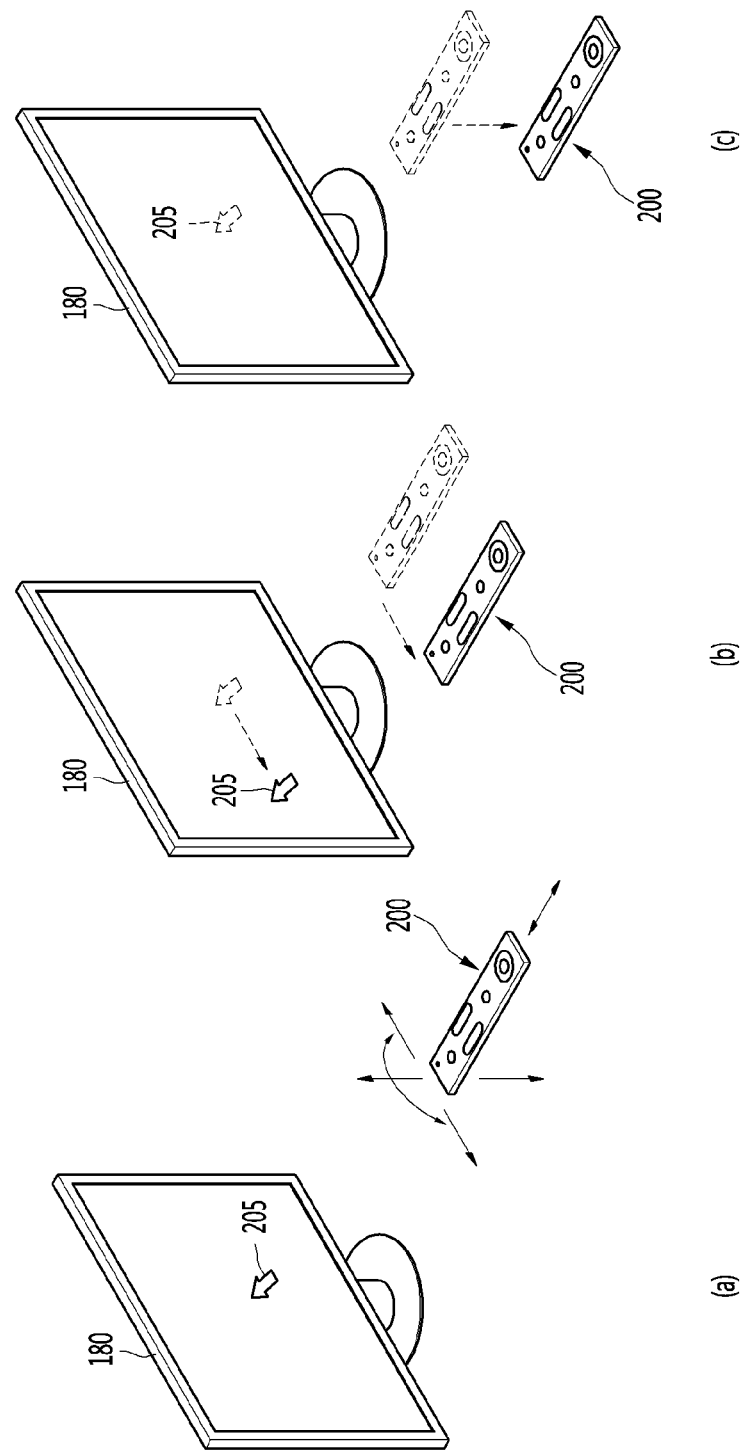
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, a display system according to an embodiment of the present invention will be described with reference to FIG. 5.

Figure 5:
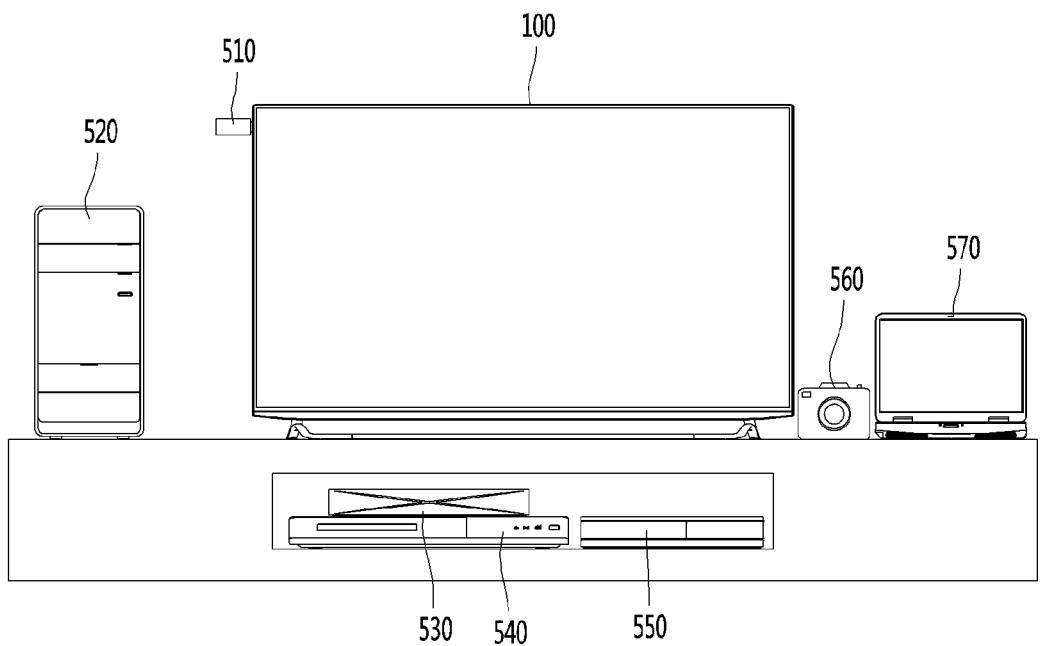
FIG. 5 is a view illustrating a display system including a display device and an external device according to an embodiment of the present invention.

FIG. 5 is a view illustrating a display system including a display device and an external device according to an embodiment of the present invention.

The display device 100 may be connected to a plurality of external devices 510, 520, 530, 540, 550, 560 and 570 through the external device interface unit 135. To this end, the external device interface unit may include various input ports such as HDMI, USB, Composite, Component, optical, RF, RS232, etc.

In addition, the display device 100 may communicate with the plurality of external devices 510, 520, 530, 540, 550, 560 and 570 through the communication unit 195.

Although the plurality of external devices 510, 520, 530, 540, 550, 560 and 570 are described as being a USB 510, a PC 520, an external hard drive 530, a Blu-ray player 540, a set-top box 550, a digital camera 560 and a laptop 570 in FIG. 5, the present invention is not limited thereto and the plurality of external devices may include all devices connected to the display device 100 to provide external input to the display device 100, such as a game console, a camcorder, a smartphone, a tablet PC, an MP3 player, an audio player, a DVD player and a video player.

The display device 100 may receive and display external input from the plurality of external devices 510, 520, 530, 540, 550, 560 and 570 through the external device interface unit 135 or the communication unit 195.

For example, if the display device 100 receives the external input from the PC 520, the control unit 170 may control the display unit 180 to receive the image displayed on the PC from the PC 520 and to display the received image.

As another example, when the display device 100 receives external device from the USB 510, the control unit 170 may control the display unit 180 or the audio output unit 185 to receive content stored in the USB 510 from the USB 510 and to output the received content.

As another example, when the display device 100 receives external input from the set-top box 550, the control unit 170 may receive video or audio output from the set-top box 550 and output the received video through the display unit 180 or output the received audio through the audio output unit 185.

Although the external input is described as being received from the plurality of external devices 510, 520, 530, 540, 550, 560 and 570 communicating with the display device 100 in FIG. 5, the present invention is not limited thereto. Specifically, the "external input" described in the present specification may include not only those received from an external device directly connected to the display device 100 but also a broadcast input through the tuner 131 or content input through the network interface unit.

FIG. 6 is a view illustrating a method of operating a display device according to an embodiment of the present invention.

In FIG. 6, the method of operating the display device according to the embodiment of the present invention may include step S610 of detecting a plurality of external devices communicating with the display device, step S620 of receiving user input of mapping at least one of an angle and a boundary corresponding to each of the plurality of external devices to each of the plurality of detected external devices, step S630 of mapping and storing at least one of the angle and the boundary to each of the plurality of detected external devices based on the user input, step S640 of displaying at least one of the angle and the boundary corresponding to each of the plurality of external devices, step S650 of displaying a pointer on a screen, step S660 of receiving information on motion of a remote control device, step S670 of acquiring coordinates the pointer corresponding to motion of the remote control device based on the information on motion of the remote control device, and step S680 of switching input provided to the display device to external input when the pointer deviates from an area corresponding to the screen based on the acquired coordinates of the pointer.

Prior to the description of step S610 of detecting the plurality of external devices, a plurality of directions or a plurality of boundaries, to which the plurality of external device may be mapped, will be described.

FIGS. 7 to 8 are views illustrating boundaries of a screen, to which external devices may be mapped, directions, to which external devices may be mapped, and boundaries and directions, to which external devices may be mapped.

FIG. 7 is a view illustrating a plurality of boundaries of an area of a screen according to an embodiment of the present invention.

Figure 7A:
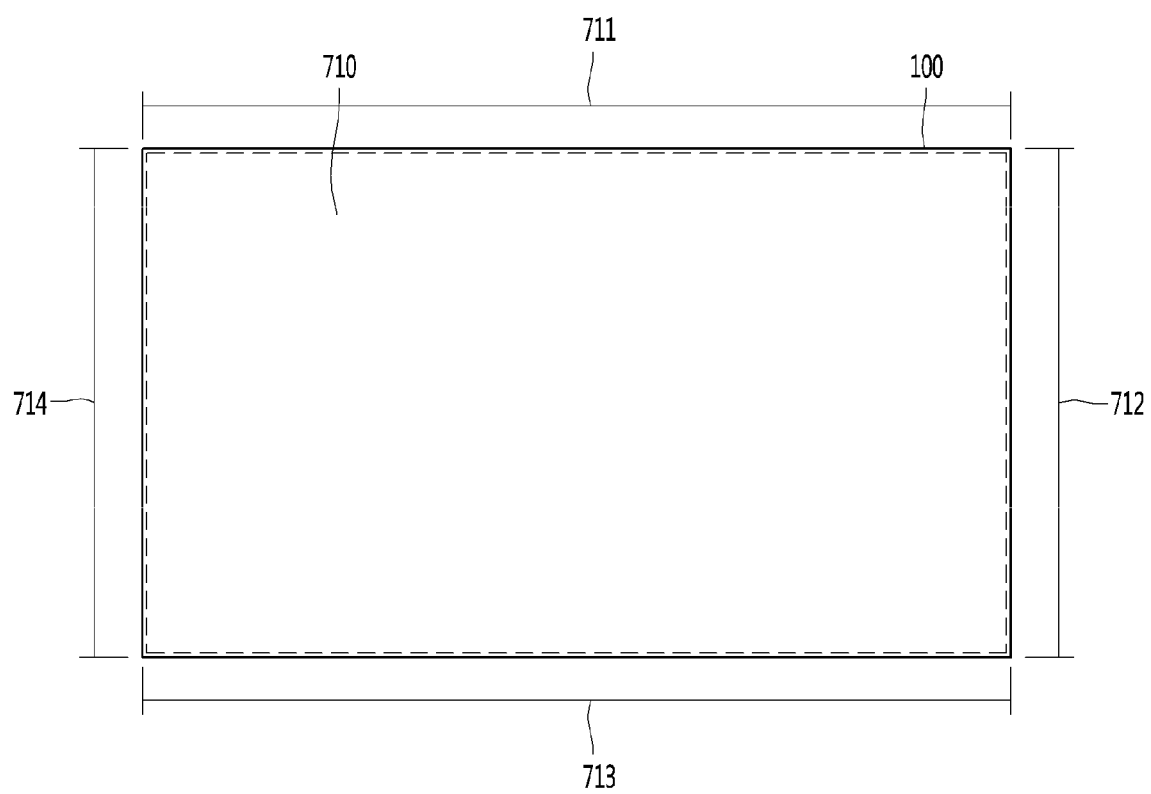
FIGS. 7*a* to 7*c* are views illustrating boundaries of a screen, to which external devices may be mapped, directions, to which external devices may be mapped, and boundaries and directions, to which external devices may be mapped.

In FIG. 7a, a boundary between an area of a screen 710 of the screen and an area other than the area of the screen is denoted by a dotted line.

All boundaries between the area of the screen 710 and the area other than the area of the screen may include a plurality of boundaries 711, 712, 713 and 714 to which external device may be mapped.

Specifically, all boundaries between the area of the screen 710 and the area other than the area of the screen include the plurality of boundaries 711, 712, 713 and 714 obtained by dividing all boundaries between the area of the screen 710 and the area other than the area of the screen.

Here, the plurality of boundaries 711, 712, 713 and 714, to which the external device may be mapped, may include four boundaries such as a boundary 711 of an "upper" direction in the area of the screen, a boundary 712 of a "right" direction in the area of the screen, a boundary 713 of a "lower" direction in the area of the screen and a boundary 714 of a left direction in the area of the screen in all boundaries of the area of the screen, as shown in FIG. 7a.

However, the present invention is not limited thereto. For example, as shown in FIG. 7b, a plurality of boundaries 721, 722, 723, 724, 725, 726, 727, 728, 729 and 730, to which the plurality of external devices may be respectively mapped, may include a plurality of boundaries 721, 722 and 723 of an "upper" direction in the area of the screen, a plurality of boundaries 724 and 725 of a "right" direction in the area of the screen, a plurality of boundaries 726, 727 and 728 of a "lower" direction in the area of the screen and a plurality of boundaries 729 and 730 of a "left" direction in the area of the screen.

That is, the plurality of boundaries 721, 722, 723, 724, 725, 726, 727, 728, 729 and 730, to which the plurality of external devices may be respectively mapped, may include at least one boundary of a first direction in the area of the screen, at least one boundary of a second direction in the screen direction, at least one boundary of a third direction in the area of the screen and at least one boundary of a fourth direction in the area of the screen.

Figure 7B:
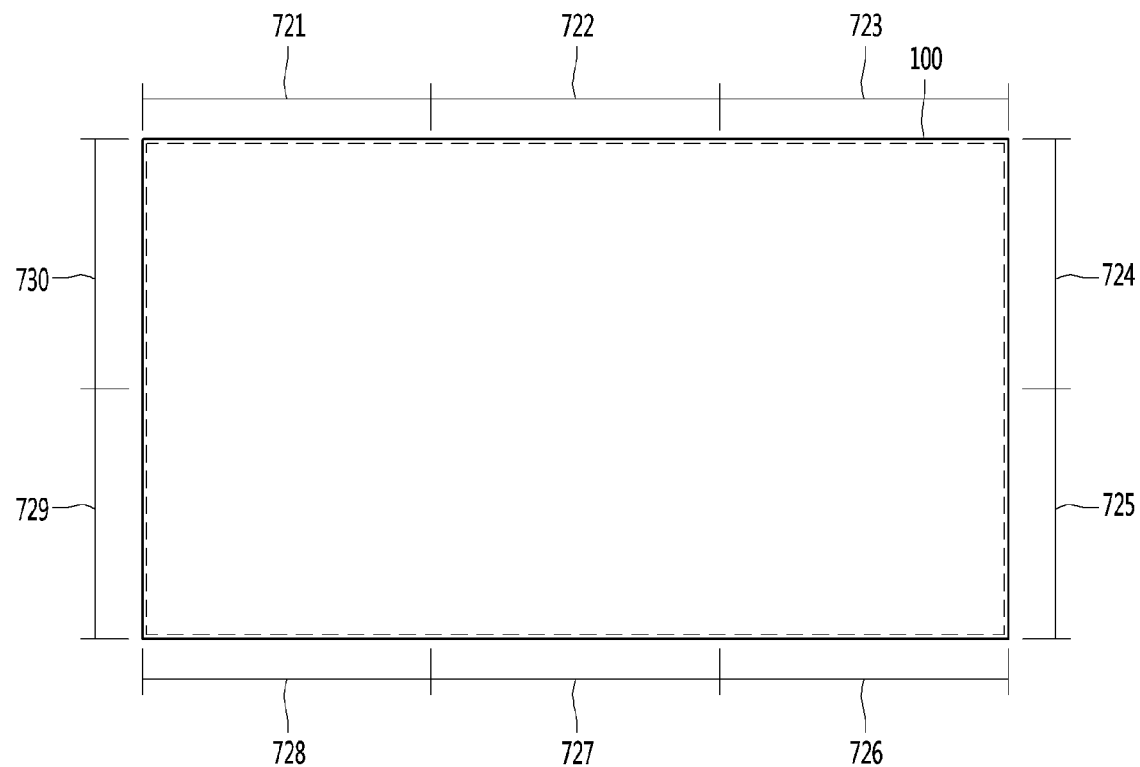

Although the plurality of boundaries, to which the plurality of external devices may be respectively mapped, is described as including all boundaries between the area of the screen and the area other than the area of the screen in FIGS. 7a and 7b, the present invention is not limited thereto. Specifically, the plurality of boundaries, to which the plurality of external devices may be respectively mapped, may include only some of all boundaries between the area of the screen and the area other than the area of the screen.

Figure 7C:
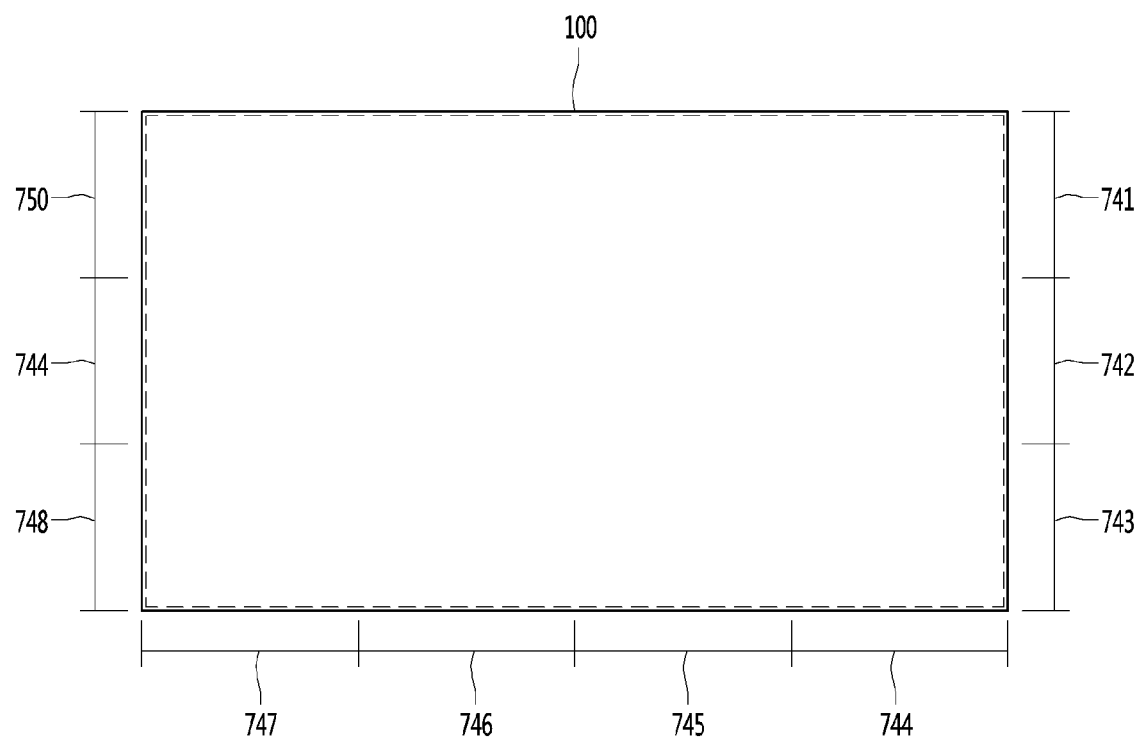

For example, as shown in FIG. 7c, the plurality of boundaries 741, 742, 743, 744, 745, 746, 747, 748, 749 and 750, to which the plurality of external devices may be respectively mapped, may include a boundary of a "right" direction in the area of the screen, a boundary of a "lower" direction in the area of the screen and a boundary of a "left" area in the area of the screen but may not include a boundary of an "upper" direction in the area of the screen.

As another example, some of the boundaries of the "right" direction in the area of the screen may configure the boundaries, to which the external device may be mapped, but the other of the boundaries of the "right" direction in the area of the screen may not configure the boundaries, to which the external device may be mapped.

FIG. 8 is a view illustrating a plurality of directions, to which external devices may be mapped, according to an embodiment of the present invention.

When the pointer displayed on the screen deviates from the area of the screen according to motion of the remote control device, all directions, in which the pointer deviates from the area of the screen, may include a plurality of directions, to which the plurality of external devices may be respectively mapped.

For example, the pointer may deviate from the area of the screen in all directions within 360 degrees relative to a specific angle.

Figure 8A:
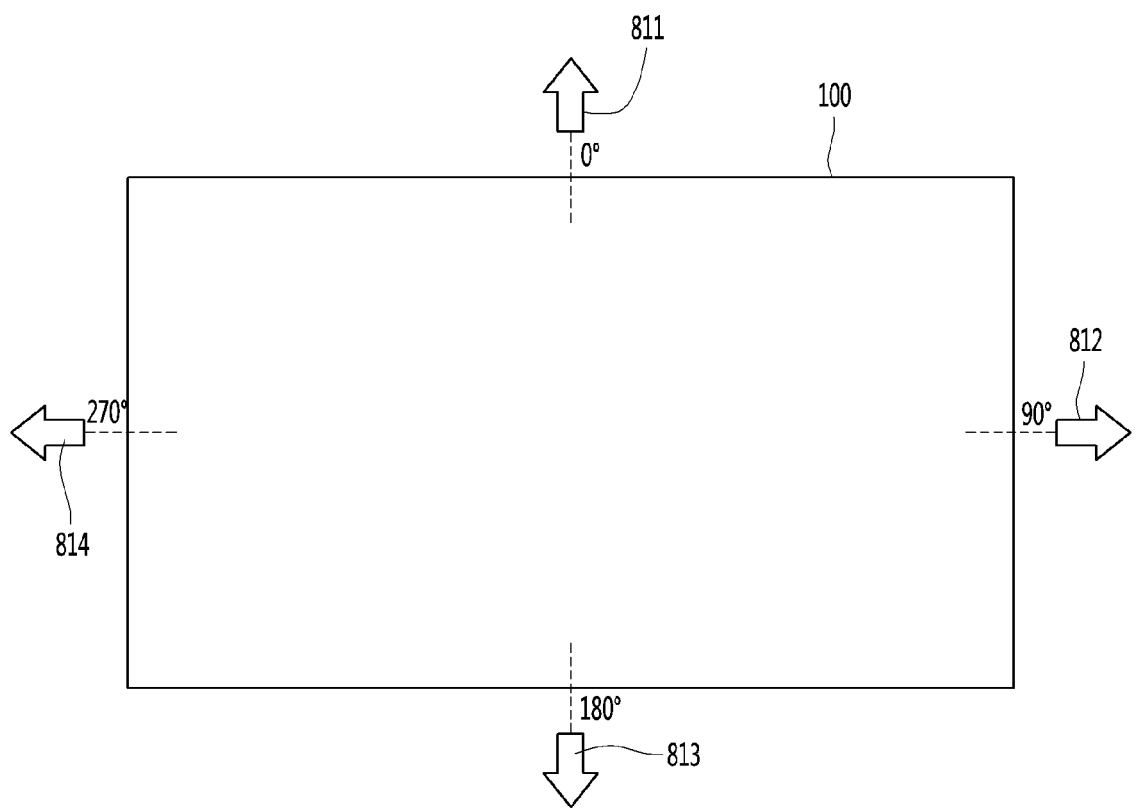
FIGS. 8*a* to 8*c* are views illustrating a plurality of directions, to which external devices may be mapped, according to an embodiment of the present invention.

As shown in FIG. 8a, all directions in which the pointer deviates from the area of the screen may include a plurality of directions 811, 812, 813 and 814, to which the plurality of external devices may be respectively mapped.

Here, the plurality of directions 811, 812, 813 and 814, to which the plurality of external devices may be respectively mapped, may include an upper direction 811 (0 degrees relative to the upper direction) among all directions in which the pointer may deviate from the area of the screen, a right direction 812 (90 degrees relative to the upper direction) among all directions in which the pointer may deviate from the area of the screen, a lower direction 813 (180 degrees relative to the upper direction) among all directions in which the pointer may deviate from the area of the screen, and a left direction 814 (270 degrees relative to the upper direction) among all directions in which the pointer may deviate from the area of the screen, as shown in FIG. 8a.

Figure 8B:
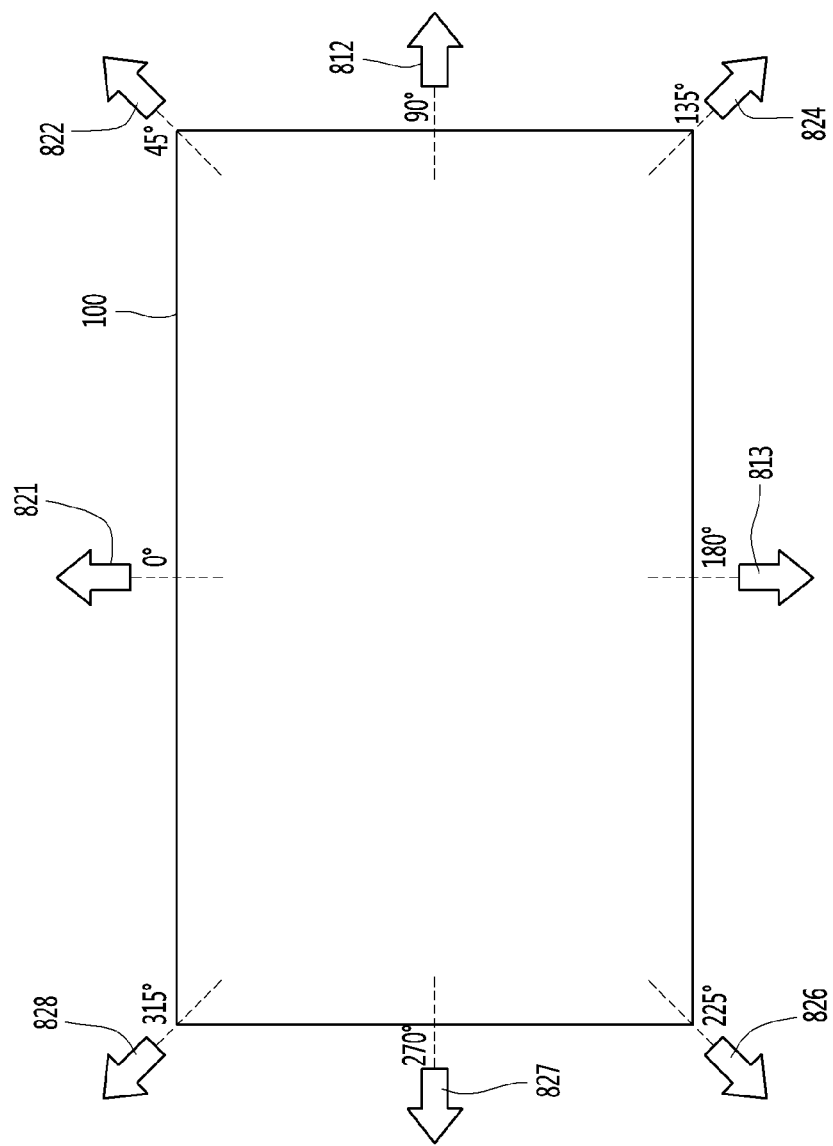

The number of directions, to which the external devices may be mapped, is not limited. For example, as shown in FIG. 8b, the plurality of directions 821, 822, 823, 824, 824, 826, 827 and 828, to which the plurality of external device may be mapped, may include eight directions, as shown in FIG. 8b.

In addition, a specific direction may correspond to an angle in a predetermined range. For example, the angle corresponding to the first direction 821 may be an angle between 337.5 degrees and 22.5 degrees and the angle corresponding to the second direction 822 may be an angle between 22.5 degrees and 67.5 degrees.

Although the angles between specific directions and directions adjacent thereto are described as being all equal in the present invention, the present invention is not limited thereto. For example, the angle between a first direction and a second direction adjacent to the first direction may be 45 degrees and the angle between the second direction and a third direction adjacent to the second direction may be 90 degrees.

Figure 8C:
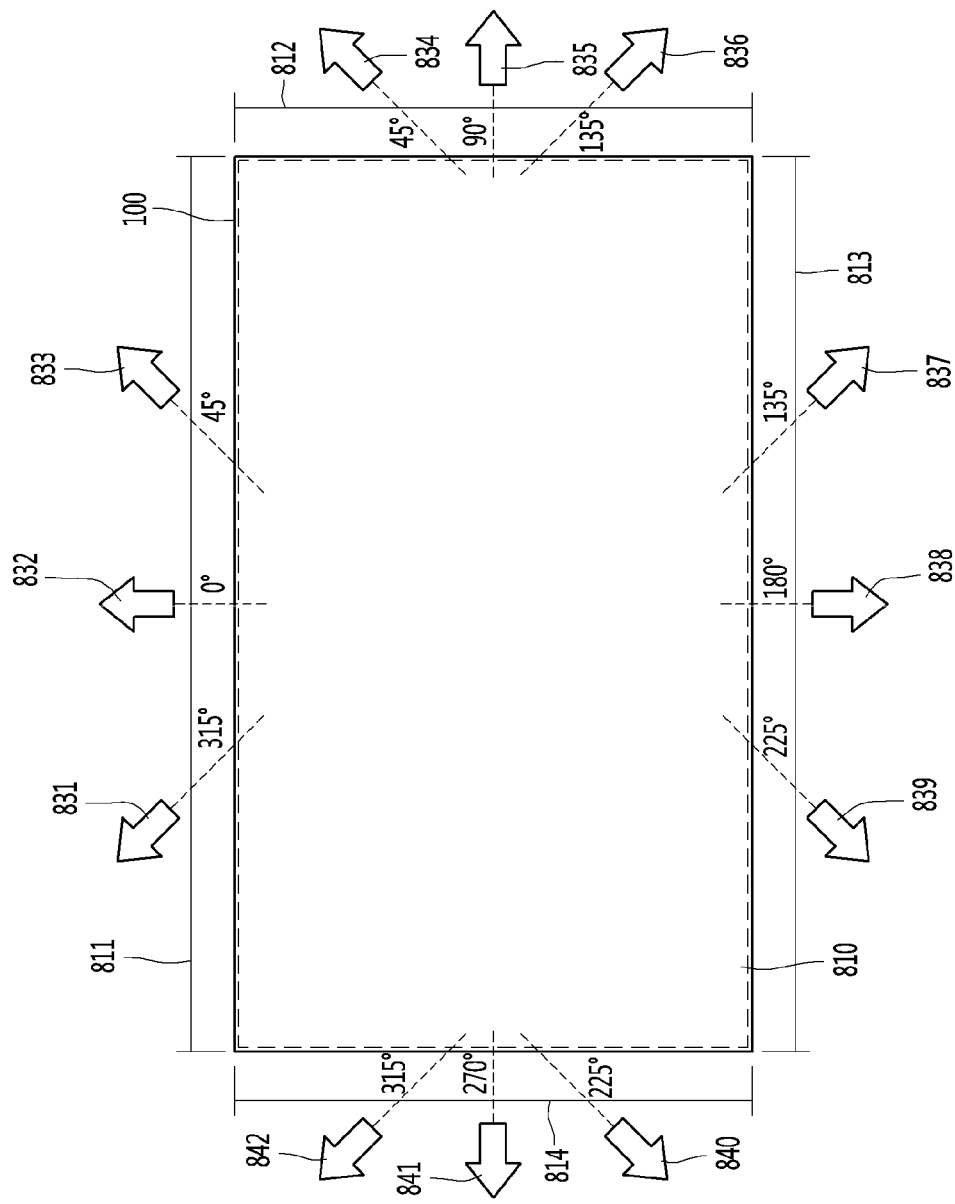

FIG. 8c is a view illustrating boundaries and directions, to which the external devices may be mapped, according to an embodiment of the present invention.

All boundaries between an area of a screen 810 and an area other than the screen area may include a plurality of boundaries 811, 812, 813 and 814.

All directions in which the pointer may deviate from the area of the screen 810 may include a plurality of directions (0 degrees, 45 degrees, 90 degrees, 135 degrees, 180 degrees, 225 degrees, 270 degrees and 315 degrees), to which the external devices may be mapped.

The external device may be mapped to one of the plurality of boundaries 811, 812, 813 and 814 of the area of the screen 810 and one of the plurality of directions (0 degrees, 45 degrees, 90 degrees, 135 degrees, 180 degrees, 225 degrees, 270 degrees and 315 degrees) in which the pointer deviates from the area of the screen 810.

For example, a first external device may be mapped to the first boundary 811 of the plurality of boundaries 811, 812, 813 and 814 and the first direction 831 of the plurality of directions 831, 832 and 833 in which the pointer may deviate from the area of the screen 810 through the first boundary 811.

As another example, a second external device may be mapped to the first boundary 811 of the plurality of boundaries 811, 812, 813 and 814 and the third direction 833 of the plurality of directions 831, 832 and 833 in which the pointer may deviate from the area of the screen 810 through the first boundary 811.

As another example, a third external device may be mapped to the second boundary 812 of the plurality of boundaries 811, 812, 813 and 918 and the second direction 835 of the plurality of directions 834, 835 and 836 in which the pointer may deviate from the area of the screen 810 through the second boundary 812.

As described above, external devices may not be mapped to some of the boundaries of the area of the screen 810.

The number of boundaries, to which the external devices may be mapped, the number of directions, to which the external devices may be mapped, and the number of boundaries and directions, to which the external devices may be mapped, may be determined according to user settings.

In addition, the length of the boundary, to which the external device may be mapped, the angle of the direction, to which the external device may be mapped, or the length of the boundary and the angle of the direction, to which the external device may be mapped, may be determined according to user settings.

The present invention provides various methods of mapping external devices, thereby providing an environment in which the external devices may be mapped to suit an actual arrangement environment of the external devices.

For example, the number of areas, to which the external devices may be mapped, may be changed and thus the user may flexibly set mapping areas according to the number of external devices.

In addition, the mapping areas may be appropriately set according to the locations of the external devices.

For example, if a PC, a laptop and a USB are located at the left side of a television and only a blu-ray player is located at the right side of the television, the user may set three mapping areas at a left boundary of an area of a screen and set only one mapping area at a right boundary of the area of the screen. In addition, by adjusting the length of the mapping area, the PC, the laptop and the USB may be mapped to a plurality of boundaries obtained by dividing the left boundary of the area of the screen into three and the blu-ray player may be mapped to the entire right boundary of the area of the screen.

In addition, if no external device is located at an upper side of the television, the user may not set the mapping area at the upper boundary of the area of the screen.

Returning to FIG. 3, the method of operating the display device according to the embodiment of the present invention may include step S610 of detecting the plurality of external devices communicating with the display device. This will be described in detail with reference to FIG. 9.

Figure 9:
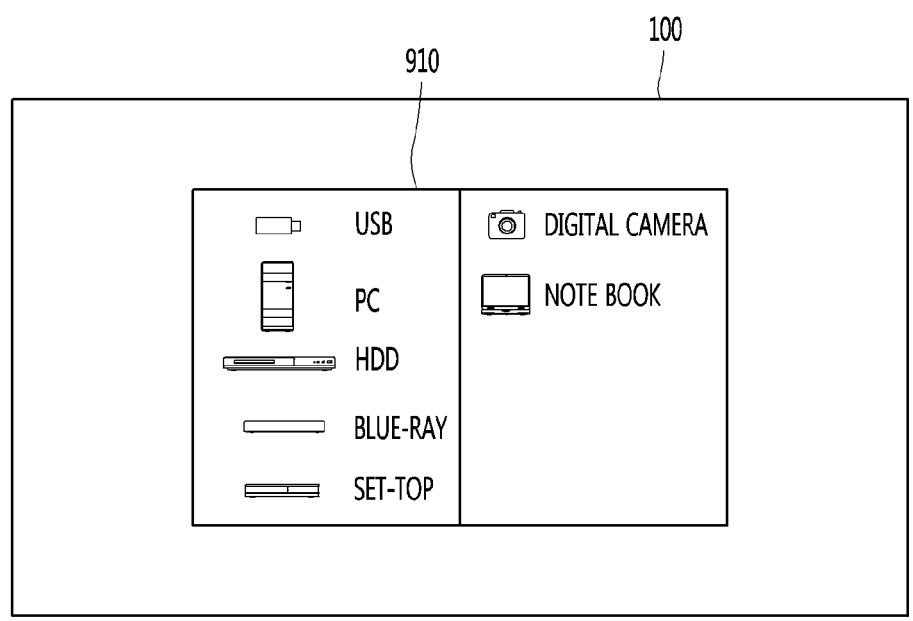
FIG. 9 is a view showing a display screen in a state of detecting a plurality of external devices communicating with a display device according to an embodiment of the present invention.

FIG. 9 is a view showing a display screen in a state of detecting a plurality of external devices communicating with a display device according to an embodiment of the present invention.

The control unit 170 may detect the plurality of external devices communicating with the display device 100.

Specifically, if the plurality of external devices is connected to the display device 100 through the external device interface unit 135 or if the plurality of external devices communicates with the display device 100 through the communication unit 195, the control unit 170 may receive identification information of each of the plurality of external devices from the plurality of devices.

In addition, the control unit 170 may acquire information on each of the plurality of external devices communicating with the display device 100 and display the acquired information 910 on each of the plurality of external devices as shown in FIG. 9, based on the identification information received from each of the plurality of external devices.

Meanwhile, the information 910 on each of the plurality of external devices may include at least one of a type of the external device and an icon corresponding to the external device. Specifically, the control unit 170 may determine and display the type of the external device based on the identification information received from the external device. In addition, the control unit 170 may display the icon corresponding to the external device, when the type of the external device is determined.

Although the icon is described as indicating the form or type of the external device in the present embodiment, the present invention is not limited thereto. For example, the icon may indicate the form of content output from the external device or a method of outputting content. For example, the icon corresponding to the blu-ray player may include a movie poster or a videotape. As another example, the icon corresponding to a digital camera may include a photograph.

The present invention provides an environment in which the user may easily confirm the mapping area of the external device.

Returning to FIG. 3, the method of operating the display device according to the embodiment of the present invention may include step S620 of receiving user input of mapping at least one of the angle and the boundary corresponding to each of the plurality of external devices to each of the plurality of detected external devices and step S630 of mapping and storing at least one of the angle and the boundary to each of the plurality of detected external devices based on the user input.

Step S620 of receiving user input of mapping at least one of the angle and the boundary corresponding to each of the plurality of external devices to each of the plurality of detected external devices and step S630 of mapping and storing at least one of the angle and the boundary to each of the plurality of detected external devices based on the user input will be described in detail with reference to FIG. 10.

FIG. 10 is a view illustrating a method of mapping boundaries respectively corresponding to a plurality of external devices to the plurality of external devices according to an embodiment of the present invention.

The control unit 170 may receive user input of selecting one of the plurality of external devices.

In FIG. 10a, assume that the PC 101 is selected by the user input.

The control unit 170 may display areas 1051, 1502, 1503, 1504, 1505, 1506, 1507, 1508, 1509 and 1560 respectively corresponding to a plurality of boundaries 1081, 1082, 1083, 1084, 1085, 1086, 1087, 1088, 1089 and 1090, to which the external devices may be mapped, on the screen of the display device 100.

The control unit 170 may receive the information on motion of the remote control device 200 from the remote control device 200. In addition, the control unit 170 may move and display the pointer to correspond to motion of the remote control device as shown in FIG. 10b.

As the pointer is moved after the PC 1010 is selected, the control unit 170 may move and display the icon 1030 of the PC to correspond to movement of the pointer.

When the pointer is moved to an area 1059 corresponding to the ninth boundary 1089, the control unit 170 may map information on the ninth boundary 1089 of the plurality of boundaries 1081, 1082, 1083, 1084, 1085, 1086, 1087, 1088, 1089 and 1090 to the PC and store the information in the storage unit 140.

In this case, the information on the ninth boundary 1089 stored in the storage unit 140 may be information on the coordinates corresponding to the ninth boundary 1089. For example, if the coordinates corresponding to the ninth boundary 1089 are (x, y)=(0, 540 to 1080), the control unit 170 may map and store the coordinates 0 and 540 to 1080 corresponding to the ninth boundary 1089 to the PC.

If mapping is finished, as shown in FIG. 10c, the control unit 170 may display the area 1059 corresponding to the ninth boundary 1089, to which the external device is mapped, to be distinguished from the other areas 1051, 1052, 1053, 1054, 1055, 1056, 1057, 1058 and 1060. For example, the control unit 170 may display the area 1059 corresponding to the ninth boundary 1089, to which the external device is mapped, with a darker color than the other areas 1051, 1052, 1053, 1054, 1055, 1056, 1057, 1058 and 1060.

If mapping is finished, the control unit 170 displays the icon 1030 of the external device mapped to the ninth boundary 1089 in the area 1059 corresponding to the ninth boundary 1089, to which the external device is mapped.

Although the external device is described as being mapped to the boundary when the pointer is moved to the areas 1051, 1502, 1503, 1504, 1505, 1506, 1507, 1508, 1509 and 1560 respectively corresponding to the plurality of boundaries 1081, 1082, 1083, 1084, 1085, 1086, 1087, 1088, 1089 and 1090 in the present embodiment, the present invention is not limited thereto.

For example, when the pointer displayed on the screen deviates from the screen through any one of the plurality of boundaries 1081, 1082, 1083, 1084, 1085, 1086, 1087, 1088, 1089 and 1090, the control unit 170 may map the boundary, through which the pointer passes, of the plurality of boundaries 1081, 1082, 1083, 1084, 1085, 1086, 1087, 1088, 1089 and 1090 to the external device selected by the user and store the boundary in the storage unit 140.

FIG. 11 is a view illustrating a method of mapping directions corresponding to a plurality of external devices to the plurality of external devices according to an embodiment of the present invention.

The control unit 170 may receive user input of selecting one of the plurality of external devices.

Figure 11A:
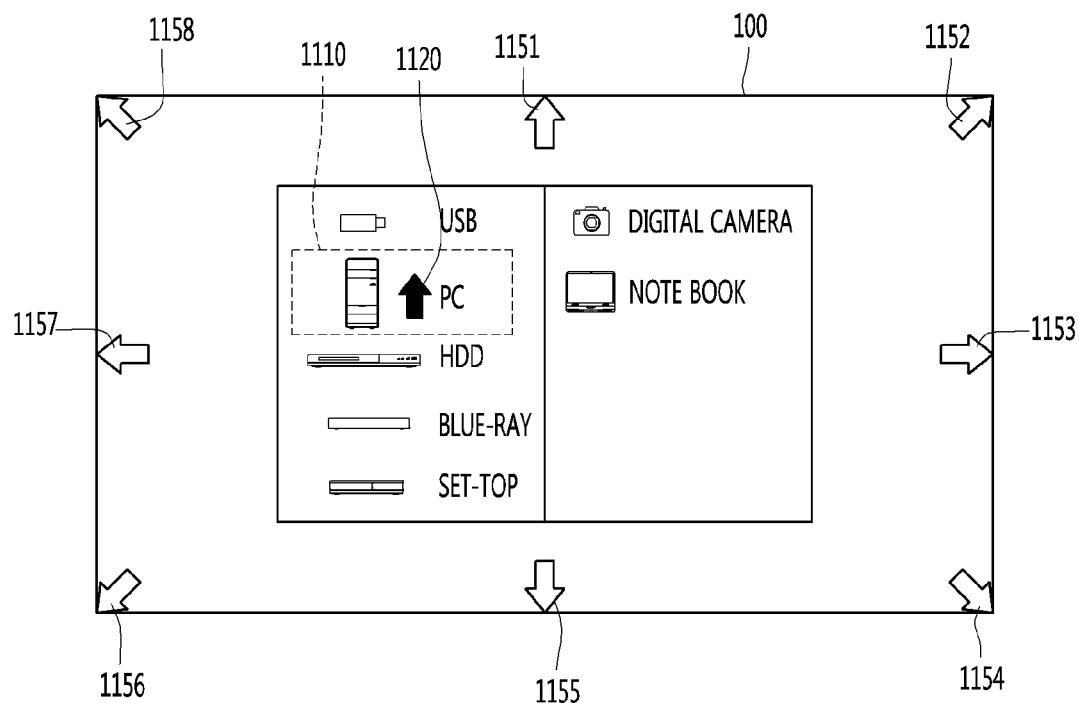
FIGS. 11a to 11d are views illustrating a method of mapping directions corresponding to a plurality of external devices to the plurality of external devices according to an embodiment of the present invention.

In FIG. 11a, assume that a PC 1110 is selected by user input.

The control unit 170 may display UIs 1151, 1152, 1153, 1154, 1155, 1156, 1157 and 1158 indicating a plurality of directions, to which the external devices may be mapped, on the screen of the display device 100.

Figure 11B:
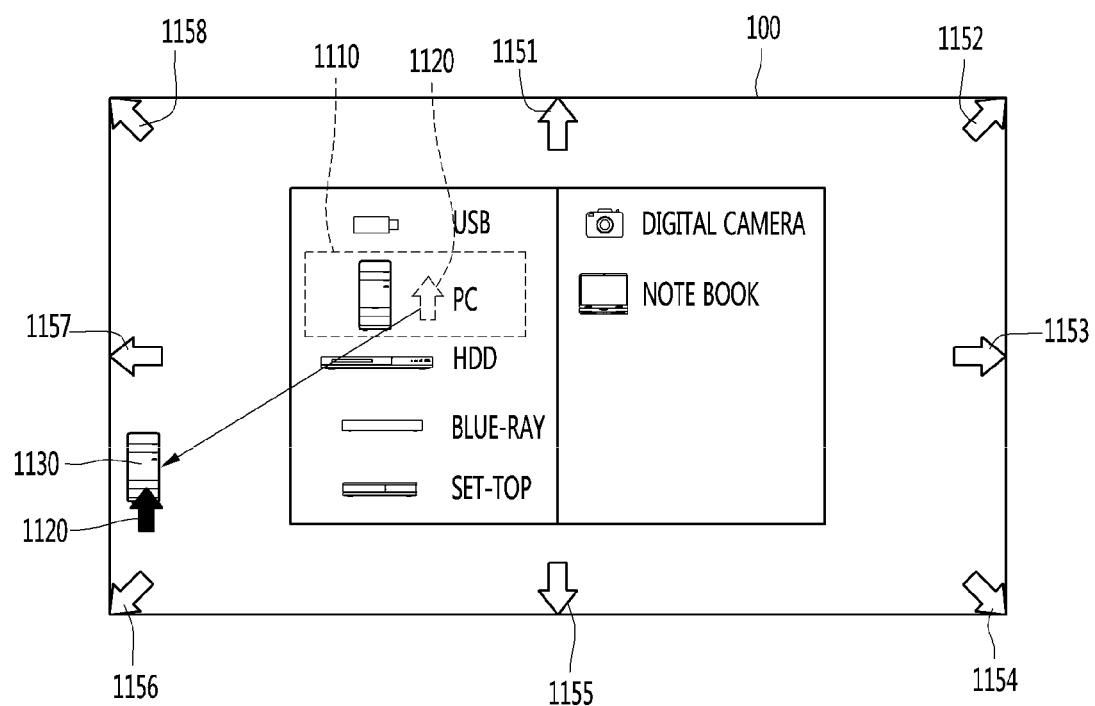

The control unit 170 may receive information on motion of the remote control device 200 from the remote control device 200. In addition, the control unit 170 may move and display the pointer to correspond to motion of the remote control device, as shown in FIG. 11b.

As the pointer is moved after the PC 1010 is selected, the control unit 170 may move and display the icon 1030 of the PC to correspond to movement of the pointer.

Figure 11C:
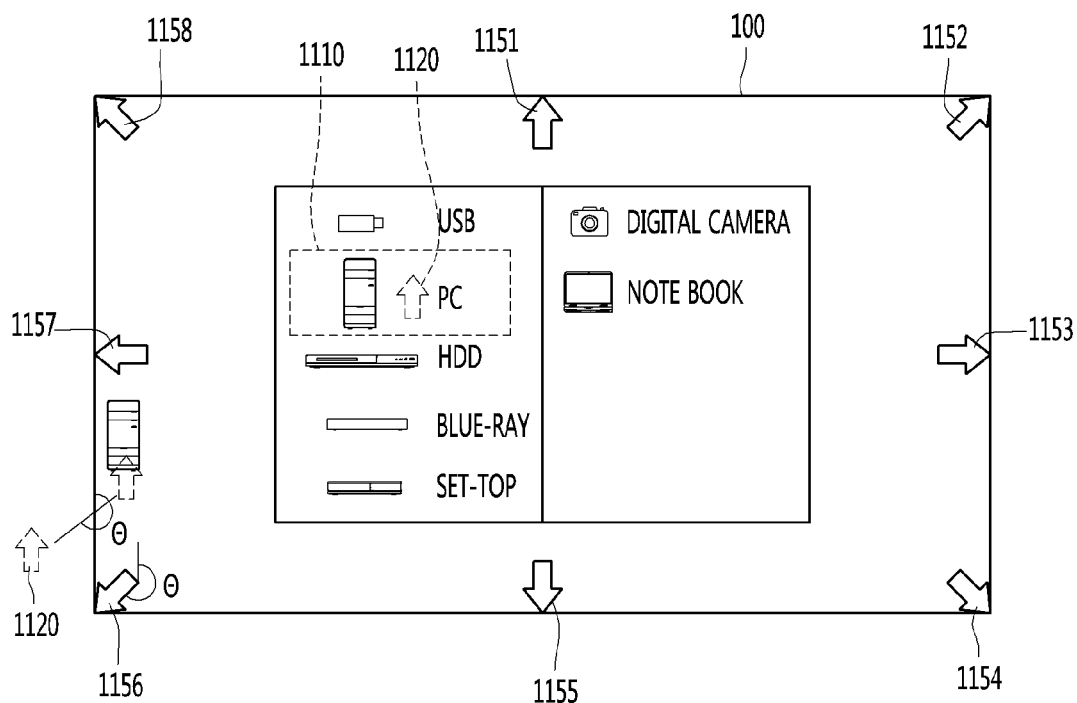

As shown in FIG. 11c, when the pointer deviates from the area of the screen in the same direction as the UI 1156 indicating the sixth direction, the control unit 170 may map the sixth direction of the plurality of directions, to which the external devices may be mapped, to the PC and store the sixth direction in the storage unit 140.

In this case, information on the sixth direction stored in the storage unit 140 may be information on an angle corresponding to the sixth direction. For example, the angle θ of the sixth direction is 225 degrees relative to the upper direction of the screen, the control unit 170 may map and store 225 degrees which is the angle θ corresponding to the sixth direction to the PC.

Figure 11D:
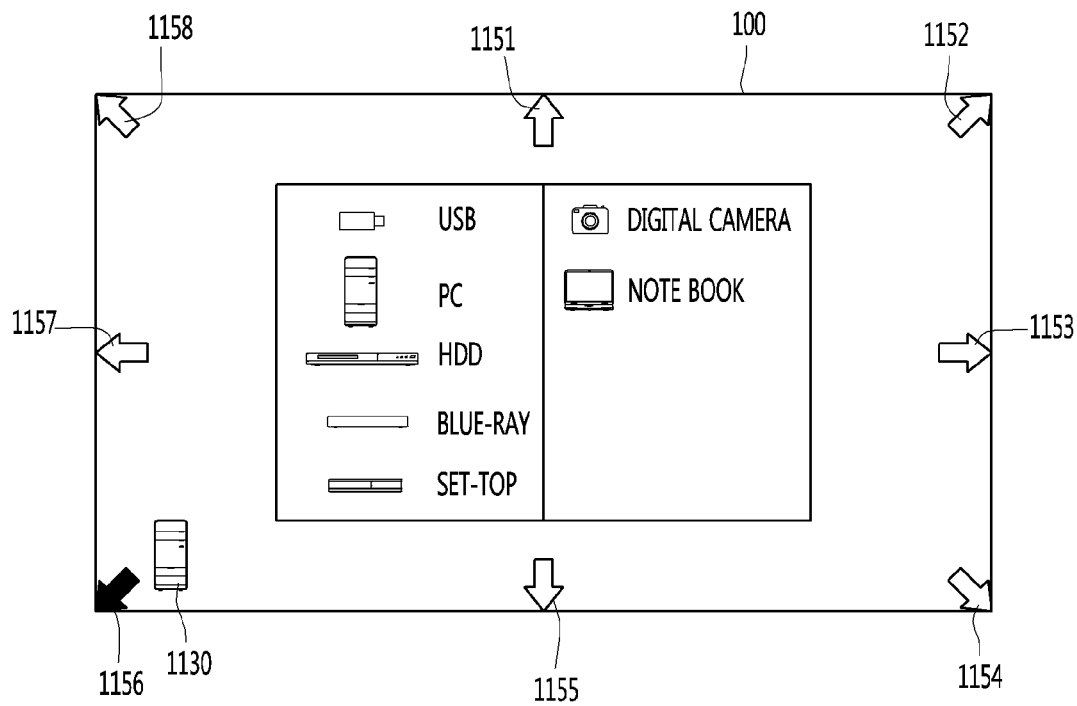

If mapping is finished, as shown in FIG. 11d, the control unit 170 may display the UI 1156 indicating the sixth direction, to which the external device is mapped, to be distinguished from the UIs 1151, 1152, 1153, 1154, 1155, 1157 and 1158 indicating the other directions. For example, the control unit 170 may display the UI 1156 indicating the sixth direction, to which the external device is mapped, with a dark color than the UIs 1151, 1152, 1153, 1154, 1155, 1157 and 1158 indicating the other directions.

If mapping is finished, the control unit 170 may display the icon 1130 of the external device mapped to the sixth direction along with the UI 1156 indicating the sixth direction, to which the external device is mapped.

In the present embodiment, when the pointer deviates from the area of the screen in a state of selecting a specific external device, the direction is mapped to the selected external device. However, the present invention is not limited thereto and, when the pointer is moved in a specific direction in a state of selecting a specific external device (that is, even when the pointer does not deviate from the area of the screen), the specific direction may be mapped to the specific external device.

FIG. 12 is a view illustrating a method of mapping boundaries and directions to external device according to an embodiment of the present invention.

The control unit 170 may receive user input of selecting one of the plurality of external devices.

Figure 12A:
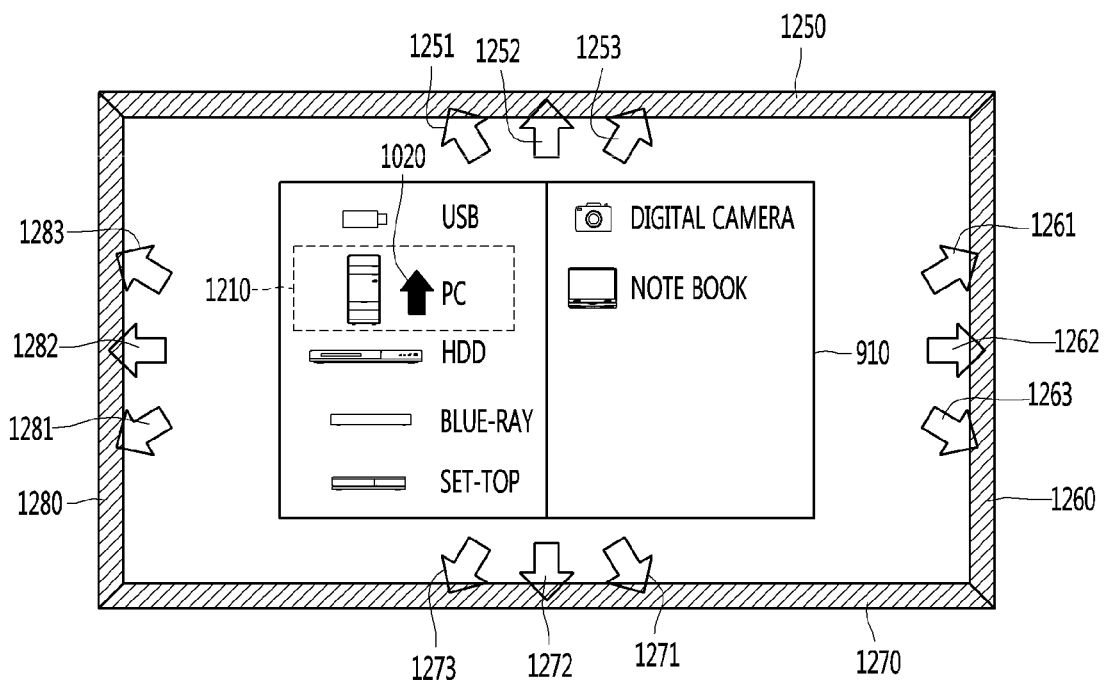
FIGS. 12a to 12d are views illustrating a method of mapping boundaries and directions to external devices according to an embodiment of the present invention.

In FIG. 12a, assume that a PC 1210 is selected by user input.

The control unit 170 may display areas 1250, 1260, 1270 and 1280 respectively corresponding to the plurality of boundaries, to which the external devices may be mapped, and UIs 1251, 1252, 1253, 1261, 1262, 1263, 1271, 1272, 1273, 1281, 1282 and 1283 indicating the plurality of directions, to which the external devices may be mapped, on the screen of the display device 100.

Among others, the first area 1250 corresponds to the boundary located in the "upper" direction of the area of the screen and the first UI 1251, the second UI 1252 and the third 1253 indicate the directions mapped along with the boundary located in the "upper" direction of the area of the screen.

Similarly, the second area 1260 corresponds to the boundary located in the "right" direction of the area of the screen and the fourth UI 1261, the fifth UI 1262 and the sixth UI 1263 indicate the directions mapped along with the boundary located in the "upper" direction of the area of the screen.

Figure 12B:
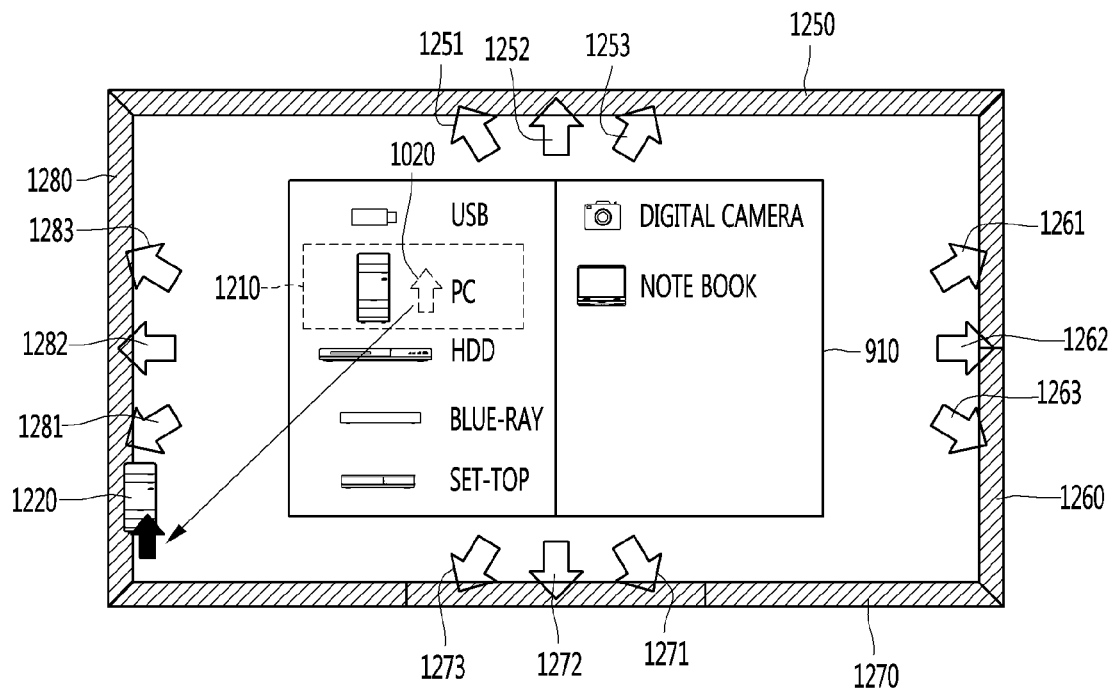

The control unit 170 may receive information on motion of the remote control device 200 from the remote control device 200. In addition, the control unit 170 may move and display the pointer to correspond to motion of the remote controller, as shown in FIG. 12b.

As the pointer is moved after the PC 1210 is selected, the control unit 170 may move and display the icon of the PC to correspond to movement of the pointer.

Figure 12C:
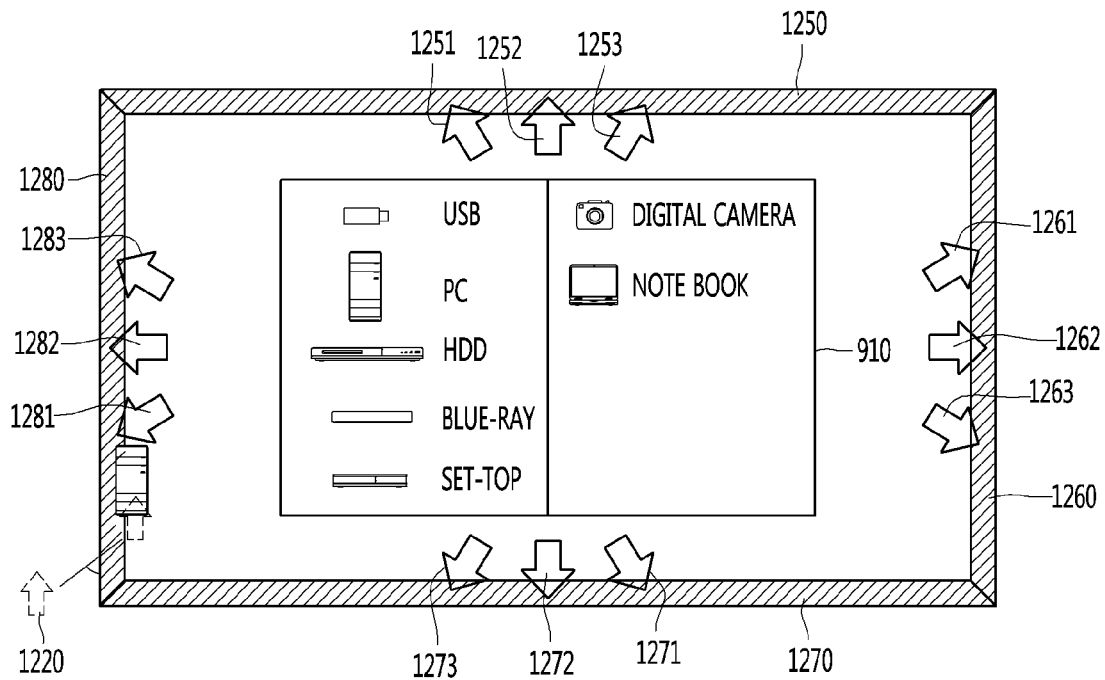

As shown in FIG. 12c, when the pointer deviates from the screen through the boundary located in the "left" direction of the area of the screen and deviates from the area of the screen in the same direction as the seventh UI 1281 indicating the seventh direction, the control unit 170 may map the boundary located in the "left" direction of the area of the screen and the seventh direction to the PC and store the boundary and the direction in the storage unit 140.

The information on the specific boundary and the information on the specific direction stored in the storage unit 140 may be information on the coordinates of the specific boundary and the angle corresponding to the specific direction.

For example, if the coordinates of the boundary located in the "left" direction of the area of the screen are (x, y)=(0, 0 to 1080) and the angle of the seventh direction is 225 degrees relative to the upper direction of the screen, the control unit 170 may map and store the coordinates (0, 0 to 1080) of the boundary located in the "left" direction of the area of the screen and 225 corresponding to the seventh direction to the PC.

Figure 12D:
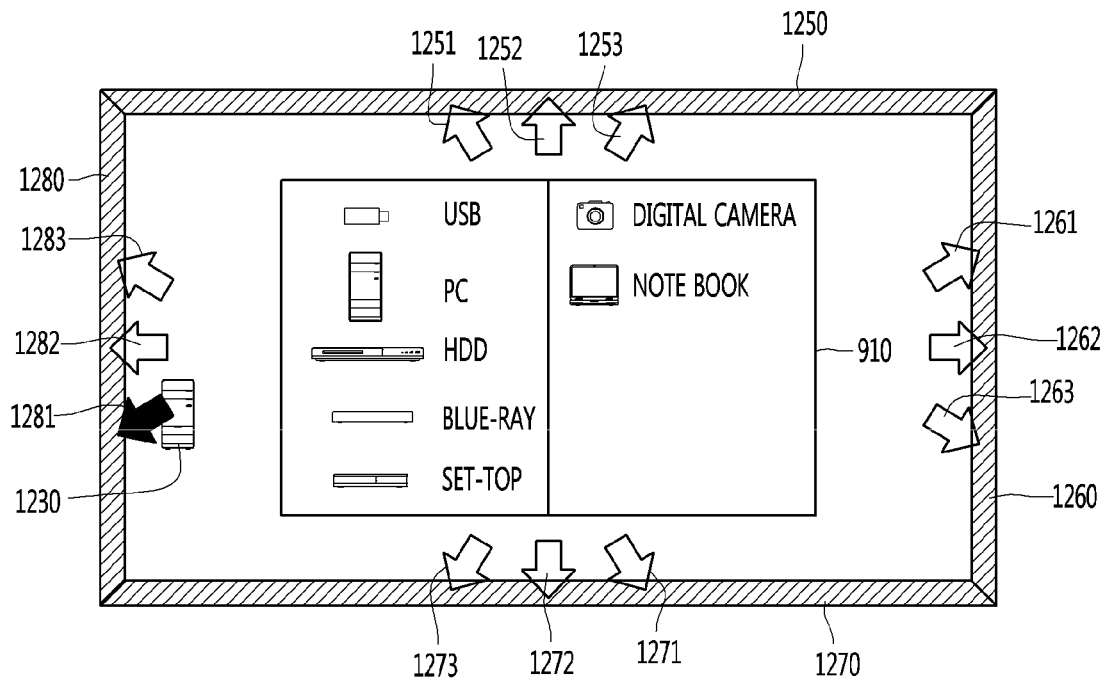

If mapping is finished, as shown in FIG. 12d, the control unit 170 may display the boundary of the "left" direction, to which the external device is mapped, and the UI 1281 indicating the seventh direction to be distinguished from the other UIs.

If mapping is finished, the control unit 170 may display the icon 1230 of the external device mapped to the boundary of the "left" direction and the seventh direction along with the boundary of the "left" direction, to which the external device is mapped, and the UI 1281 indicating the seventh direction.

The external devices located around the TV are generally located at fixed places. Accordingly, the user may map a specific external device to a boundary or direction corresponding to an area in which the specific external device is located. Therefore, the user may intuitively switch external input, by moving the pointer in a direction in which the external device is actually located, upon switching of external input.

In addition, when a place where the external device is located is changed, the mapping area is changed, such that the user may intuitively switch external input by moving the pointer in a direction in which the external device is actually located, upon switching of external input.

Although the mapping method of the external device according to the movement direction and the movement area of the pointer is described in FIGS. 10 to 12, the mapping method of the external device is not limited thereto. For example, when a specific external device is selected, the control unit 170 may display a list of a plurality of boundaries, to which the specific external device may be mapped, a plurality of directions, to which the specific external device may be mapped or a plurality of boundaries and directions, to which the specific external device may be mapped. When the user selects at least one of the specific boundaries and the specific directions included in the list, the control unit 170 may map at least one of the specific boundary and the specific direction to the specific external device and store the specific boundary and the specific direction in the storage unit 140.

Returning to FIG. 6, the method of operating the display device according to the present invention may include step S640 of displaying at least one of the angle and the boundary corresponding to each of the plurality of external devices.

This will be described in detail with reference to FIG. 13.

Figure 14:
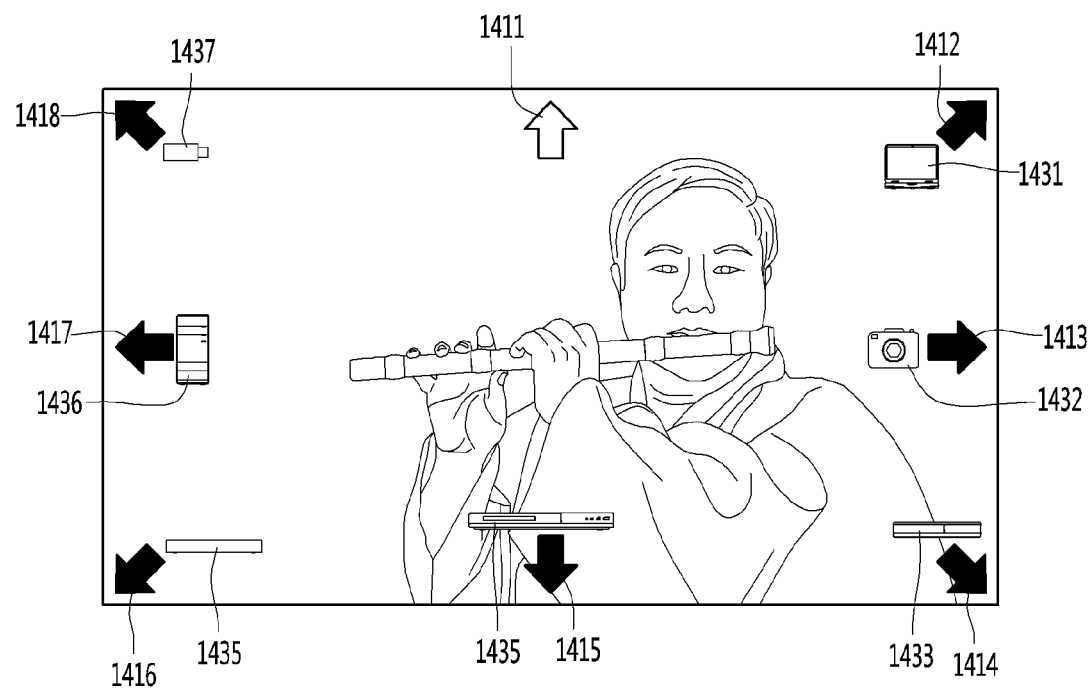
Figure 15:
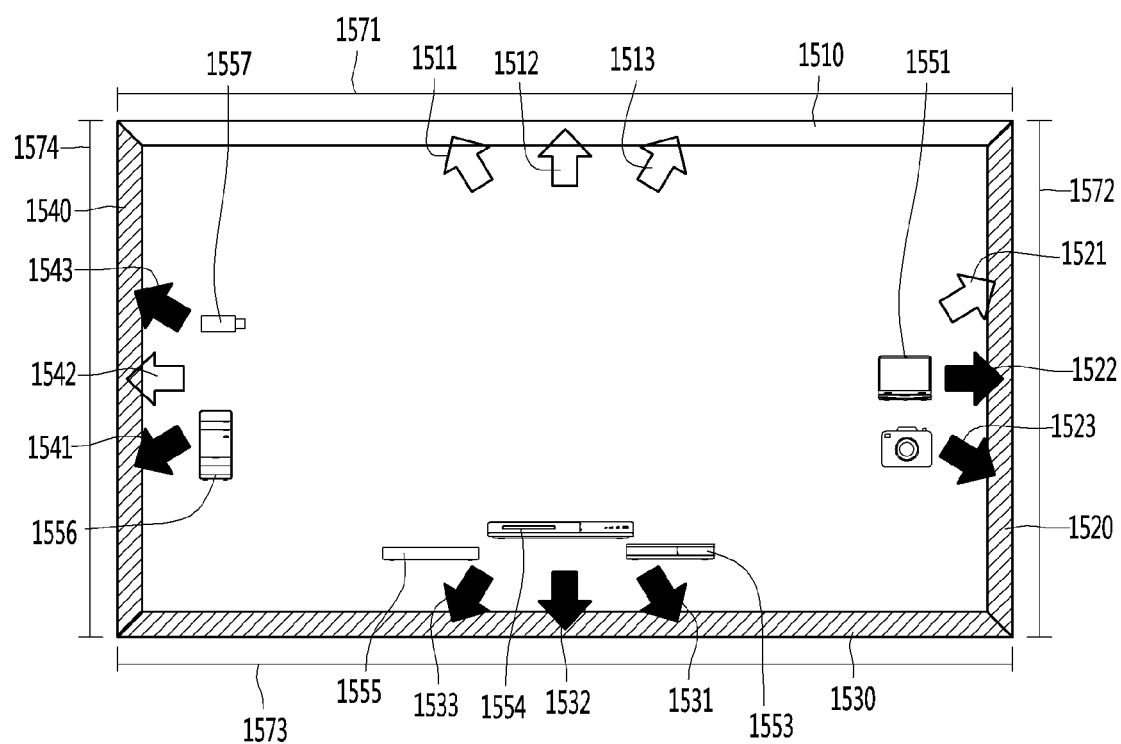

FIGS. 13 to 15 are views illustrating a method of displaying at least one of boundaries and directions, to which a plurality of external devices is mapped, according to an embodiment of the present invention.

FIG. 13 is a view showing a plurality of boundaries, to which a plurality of external devices is respectively mapped, according to an embodiment of the present invention.

If input of confirming the mapping state of each of the plurality of external devices is received, the control unit 170 may display an area corresponding to the boundary, to which each of the plurality of external devices is mapped.

Specifically, the control unit 170 may display a plurality of areas 1314, 1315, 1316, 1317, 1318, 1319 and 1320 respectively corresponding to the plurality of boundaries 1354, 1355, 1356, 1357, 1358, 1359 and 1360, to which the plurality of external devices is mapped, among the boundaries between the area of the screen and the area other than the area of the screen.

In addition, the control unit 170 may display a plurality of icons 1331, 1332, 1333, 1334, 1335, 1336 and 1337 respectively corresponding to the plurality of boundaries 1354, 1355, 1356, 1357, 1358, 1359 and 1360, to which the plurality of external devices is mapped, along with the plurality of areas 1314, 1315, 1316, 1317, 1318, 1319 and 1320 respectively corresponding to the plurality of boundaries 1354, 1355, 1356, 1357, 1358, 1359 and 1360, to which the plurality of external devices is mapped. Here, each of the plurality of 1331, 1332, 1333, 1334, 1335, 1336 and 1337 may be an icon indicating each of the plurality of external devices.

For example, if a PC is mapped to the fourth boundary 1354, the control unit 170 may display the fourth area 1314 corresponding to the fourth boundary 1354. In addition, the control unit 170 may display an icon 1331 indicating the PC along with the fourth area 1314 corresponding to the fourth boundary 1354.

Meanwhile, although, when input of confirming the boundary, to which each of the plurality of external devices is mapped, is received, the area corresponding to the boundary, to which each of the plurality of external devices is mapped, is described as being displayed in FIG. 13, the present invention is not limited.

Specifically, the control unit 170 may display areas 1311, 1312, 1313, 1314, 1315, 1316, 1317, 1318, 1319 and 1320 respectively corresponding to the plurality of boundaries 1351, 1352, 1353, 1354, 1355, 1356, 1357, 1358, 1359 and 1360, to which the plurality of external devices may be respectively mapped. That is, the control unit 170 may display the areas 1314, 1315, 1316, 1317, 1318, 1319 and 1320 respectively corresponding to the boundaries 1354, 1355, 1356, 1357, 1358, 1359 and 1360, to which the external devices are mapped, and the areas 1311, 1312 and 1313 respectively corresponding to the boundaries 1351, 1352 and 1353, to which the external devices are not mapped, among the plurality of boundaries 1351, 1352, 1353, 1354, 1355, 1356, 1357, 1358, 1359 and 1360, to which the plurality of external devices may be respectively mapped.

The control unit 180 may display the areas 1314, 1315, 1316, 1317, 1318, 1319 and 1320 respectively corresponding to the boundaries 1354, 1355, 1356, 1357, 1358, 1359 and 1360, to which the external devices are mapped, and the areas 1311, 1312 and 1313 respectively corresponding to the boundaries 1351, 1352 and 1353, to which the external devices are not mapped, to be distinguished therebetween. For example, the control unit 170 may display the areas 1314, 1315, 1316, 1317, 1318, 1319 and 1320 respectively corresponding to the boundaries 1354, 1355, 1356, 1357, 1358, 1359 and 1360, to which the external devices are mapped, with a darker color than the areas 1311, 1312 and 1313 respectively corresponding to the boundaries 1351, 1352 and 1353, to which the external devices are not mapped, FIG. 14 is a view showing a plurality of directions, to which a plurality of external devices is respectively mapped, according to an embodiment of the present invention.

When input of confirming the mapping state of each of the plurality of external devices is received, the control unit 170 may display UIs 1412, 1413, 1414, 1415, 1416, 1417 and 1418 corresponding to the plurality of directions, to which the plurality of external devices is respectively mapped.

In addition, the control unit 170 may display a plurality of icons 1431, 1432, 1433, 1434, 1435, 1436 and 1437 respectively corresponding to the plurality of external devices along with the UIs 1412, 1413, 1414, 1415, 1416, 1417 and 1418 corresponding to the plurality of directions, to which the plurality of external devices is respectively mapped. Here, the UIs 412, 1413, 1414, 1415, 1416, 1417 and 1418 corresponding to the plurality of directions, to which the plurality of external devices is respectively mapped, may be displayed to correspond to the plurality of icons 1431, 1432, 1433, 1434, 1435, 1436 and 1437 respectively corresponding to the plurality of external devices. Here, the plurality of icons 1331, 1332, 1333, 1334, 1335, 1336 and 1337 may be icons respectively indicating the plurality of external devices.

For example, if a USB is mapped to an eighth direction, the control unit 170 may display the UI 1418 corresponding to the eighth direction. In addition, the control unit 170 may display the icon 1437 indicating the USB mapped to the eighth direction to correspond to the UI 1418 corresponding to the eighth direction.

Although the direction, to which each of the plurality of external devices is mapped, is described as being displayed in the FIG. 14, the present invention is not limited thereto.

Specifically, the control unit 170 may display the UIs 1411, 1412, 1413, 1414, 1415, 1416, 1417 and 1418 corresponding to the plurality of directions, to which the plurality of external devices may be respectively mapped. That is, the control unit 170 may display the UIs 1412, 1413, 1414, 1415, 1416, 1417 and 1418 corresponding to the directions, to which the external devices are mapped, and the UI 1411 corresponding to the direction, to which the external device is not mapped, among the plurality of directions which the plurality of external devices may be respectively mapped.

The control unit 170 may display the UIs 1412, 1413, 1414, 1415, 1416, 1417 and 1418 corresponding to the directions, to which the external devices are mapped, and the UI 1411 corresponding to the direction, to which the external device is not mapped, to be distinguished therebetween. For example, the control unit 170 may display the UIs 1412, 1413, 1414, 1415, 1416, 1417 and 1418 corresponding to the directions, to which the external devices are mapped, with a darker color than the UI 1411 corresponding to the direction, to which the external device is not mapped.

FIG. 15 is a view showing a plurality of boundaries and directions, to which a plurality of external devices is respectively mapped, according to an embodiment of the present invention.

When input of confirming the mapping state of each of the plurality of external devices is received, the control unit 170 may display areas and directions corresponding to boundaries, to which the plurality of external devices is respectively mapped.

Specifically, the control unit 170 may display a plurality of areas 1520, 1530 and 1540 respectively corresponding to the plurality of boundaries 1572, 1573 and 1574, to which the plurality of external devices is mapped, among the boundaries between the area of the screen and the area other than the area of the screen, and UIs 1522, 1523, 1531, 1532, 1533, 1541 and 1543 indicating a plurality of directions, to which the plurality of external devices is mapped.

Among UIs 1522, 1523, 1531, 1532, 1533, 1541 and 1543 indicating the plurality of directions, to which the plurality of external devices is mapped, the seventh UI 1531, the eighth UI 1532 and the ninth UI 1533 indicate three directions mapped along with the third boundary 1573.

As another example, among the UIs 1522, 1523, 1531, 1532, 1533, 1541 and 1543 indicating the plurality of directions, to which the plurality of external devices is mapped, the tenth UI 1541 and the twelfth UI 1543 indicate two directions mapped along with the fourth boundary 1574.

For example, a laptop is mapped to the same direction as the second boundary and the fifth UI 1522 and the USB is mapped to the same direction as the fourth boundary 1574 and the twelfth UI 1543.

In addition, the control unit 170 may display icons corresponding to the plurality of external devices along with UIs indicating the boundaries and directions, to which the plurality of external devices is mapped.

For example, the control unit 170 may display the fourth boundary 1574 and an icon 1557 indicating the external device mapped to the twelfth direction along with the fourth boundary 1574 and the UI 1543 indicating the twelfth direction.

Although, when input of confirming the boundary, to which each of the plurality of external devices is mapped, is received, the boundary and direction, to which each of the plurality of external devices is mapped, is described as being displayed in FIG. 15, the present invention is not limited thereto.

Specifically, the control unit 170 may display the plurality of areas 1510, 1520, 1530 and 1540 respectively corresponding to the plurality of boundaries 1571, 1572, 1573 and 1574, to which the plurality of external devices may be mapped, among the area of the screen and the area other than the area of the screen, and UIs 1511, 1512, 1513, 1521, 1522, 1523, 1531, 1532, 1533, 1541, 1542 and 1543 indicating the plurality of directions, to which the plurality of external devices is mapped.

The control unit 170 may display the areas 1520, 1530 and 1540 corresponding to the boundaries 1572, 1573 and 1574, to which the external devices are mapped, and UIs 1522, 1523, 1531, 1532, 1533, 1541 and 1543 corresponding to the directions, to which the external devices are mapped, to be distinguished from the area 1510 corresponding to the boundary 1571, to which the external device is not mapped, and the UIs 1511, 1512, 1513, 1521 and 1542 corresponding to the directions, which the external devices are not mapped.

Although the plurality of icons respectively corresponding to the plurality of external devices is described as being displayed in FIGS. 13 to 15, the present invention is not limited thereto and the types of the plurality of external devices may be displayed.

The present invention provides an environment in which the area corresponding to the external device is capable of being easily confirmed. That is, the user may confirm the area (the boundary, the direction or the boundary and the direction) corresponding to the external device to change the mapping area. In addition, the user may easily switch input to a desired external device.

Returning to FIG. 6, the method of operating the display device according to the embodiment of the present invention may include step S650 of displaying the pointer on the screen and step S660 of receiving information on motion of the remote control device.

The remote control device 200 may receive input of displaying the pointer, and the control unit 180 may receive a command for displaying the pointer from the remote control device 200 through the user input interface unit 150.

In addition, the control unit 170 may control the display unit 180 to display the pointer, when the command for displaying the pointer is received.

Meanwhile, the remote control device 200 may sense motion of the remote control device 200 and transmit information on the motion of the remote control device 200 to the display device 100.

Meanwhile, the method of operating the display device according to the embodiment of the present invention may include step S670 of acquiring the coordinates of the pointer corresponding to motion of the remote control device based on the information on motion of the remote control device.

This will be described in detail with reference to FIG. 16.

Figure 16:
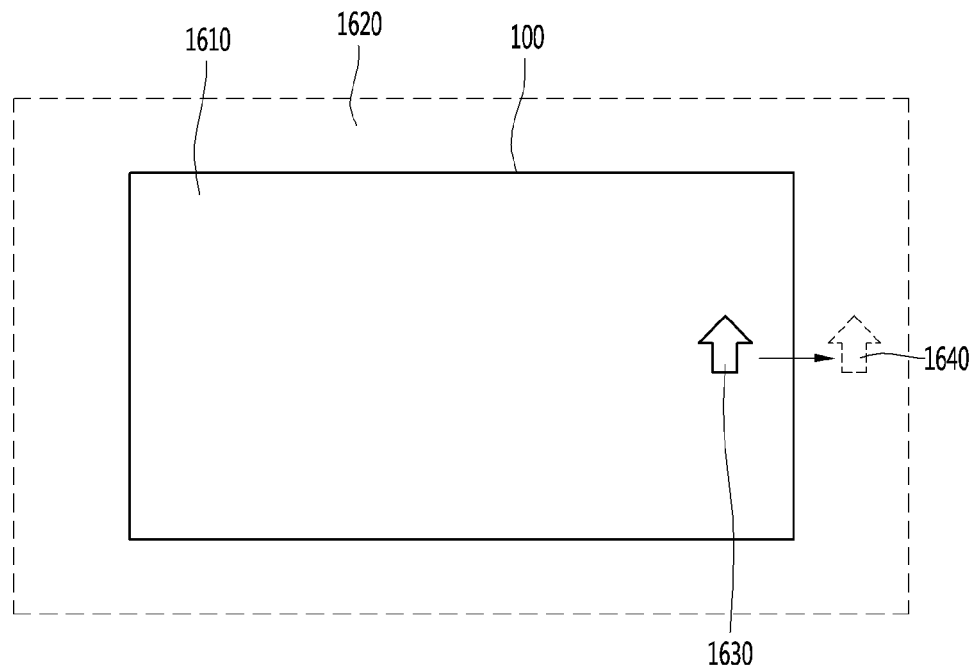
FIG. 16 is a view illustrating a method of acquiring coordinates of a pointer corresponding to motion of a remote control device according to an embodiment of the present invention.

FIG. 16 is a view illustrating a method of acquiring the coordinates of the pointer corresponding to motion of a remote control device according to an embodiment of the present invention.

The coordinates of the pointer corresponding to motion of the remote control device may include the coordinates of an area 1610 on the screen of the display device 100 and the coordinates of a virtual area 1620 other than the screen the display device 100.

Specifically, if the pointer 1630 is located in the area 1610 of the screen of the display device 100, the control unit 170 may calculate the coordinates of the pointer 1630 moved in correspondence with motion of the remote control device 200 based on information on motion of the remote control device 200. In addition, the control unit 170 may display the pointer 1630 on the screen based on the calculated coordinates of the pointer 1630.

Meanwhile, the pointer 1640 may be located in the area 1620 other than the screen of the display device 100. Here, the pointer 1640 may be a virtual pointer which is not a pointer displayed on the screen.

In this case, the control unit 170 may acquire the virtual coordinates of a virtual pointer 1640 moved in correspondence with motion of the remote control device 200 based on the information on motion of the remote control device 200.

Meanwhile, the control unit 170 may determine whether the pointer 1630 deviates from the area 1610 of the screen based on the coordinates of the pointer.

For example, if the coordinates of the pointer moved in correspondence with motion of the remote control device 200 deviates from the coordinates of the area 1610 of the screen, the control unit 170 may determine that the pointer 1630 deviates from the area 1610 of the screen.

As another example, if the coordinates of the pointer moved in correspondence with motion of the remote control device 200 is changed from the coordinates of the area 1610 of the screen to the virtual coordinates of the area 1620 other than the screen, the control unit 170 may determine that the pointer 1630 deviates from the area 1610 of the screen.

Returning to FIG. 6, the method of operating the display device according to the embodiment of the present invention may include step S680 of switching external input when the pointer deviates from the area corresponding to the screen based on the acquired coordinates of the pointer. This will be described in detail with reference to FIGS. 17 to 27.

FIGS. 17 to 18 are views illustrating a method of switching input provided to the display device to external input when a pointer deviates from an area of a screen according to an embodiment of the present invention.

Here, input provided to the display device may be input provided by an external device, such as a USB, a PC, an external hard drive, a blu-ray player, a set-top box, a digital camera, a laptop, a game console, a camcorder, a smartphone, a tablet PC, an MP3 player, an audio/DVD player, a video player, etc. connected to the display device 100.

In addition, input provided to the display device may be broadcast content provided by a broadcast provider and received through the tuner 131 or content provided by a content provider and received through the network interface unit 133.

The control unit 170 may output video using input provided to the display device. For example, if input is provided by a set-top box (that is, the set-top box outputs a broadcast image), the control unit 170 may output the broadcast image using input provided by the set-top boxy. As another example, if input is provided from a laptop to the display device 100, the control unit 170 may output an image on the screen of the laptop using input provided by the laptop (e.g., the image on the screen of the laptop). As another example, if input is provided from a USB to the display device 100, the control unit 170 may output the image of content stored in the USB using input provided by the USB (e.g., the content stored in the USB).

Meanwhile, "external input" described in the present specification may further include at least one of broadcast content input through the tuner 131 and content input through the network interface unit, in addition to input provided by an external device, such as a USB, a PC, an external hard drive, a blu-ray player, a set-top box, a digital camera, a laptop, a game console, a camcorder, a smartphone, a tablet PC, an MP3 player, an audio/DVD player, a video player, etc. connected to the display device 100.

Accordingly, external input may be switched to input provided by one of external devices in a state in which broadcast content input through the tuner 131 is displayed and external input may be switched to broadcast content received through the tuner 131 in a state in which an image corresponding to input provided by one of the external devices is displayed.

Meanwhile, in FIGS. 17 and 18, assume that the USB is mapped to the first boundary 1711 of the area of the screen, the laptop is mapped to the second boundary 1712 of the area of the screen, the blu-ray player is mapped to the third boundary 1713 of the area of the screen, and the PC is mapped to the fourth boundary 1714 of the area of the screen.

When the pointer deviates from the area of the screen, the control unit 170 may switch input provided to the display device 100 to external input. Specifically, when the pointer deviates from the area of the screen based on the coordinates of the pointer, the control unit 170 may switch input provided to the display device 100 and used to output an image to external input.

That is, when the pointer displayed on the screen is moved from the area of the screen to the area outside the screen (that is, a virtual coordinate area), the control unit 170 may switch input provided to the display device to external input.

In this case, the control unit 170 may switch input provided to the display device to input provided by the external device corresponding to a specific boundary 1711 located at a point 1721 where the pointer 1720 deviates from the area of the screen among a plurality of boundaries 1711, 1712, 1713 and 1714 of the area of the screen.

For example, as shown in FIG. 17*a*, when the pointer 1720 deviates from the area of the screen at the specific point 1721 of the first boundary 1711, the control unit 170 may switch input provided to the display device 100 to input provided by the USB as the external device corresponding to the first boundary 1711.

Meanwhile, when input provided to the display device is switched to external input, the control unit 170 may display the screen switched to the external input.

Specifically, when input provided to the display device is switched to input provided by a specific external device among a plurality of external devices, the control unit 170 may display an image in a state in which input is switched to the specific external device.

Figure 17B:
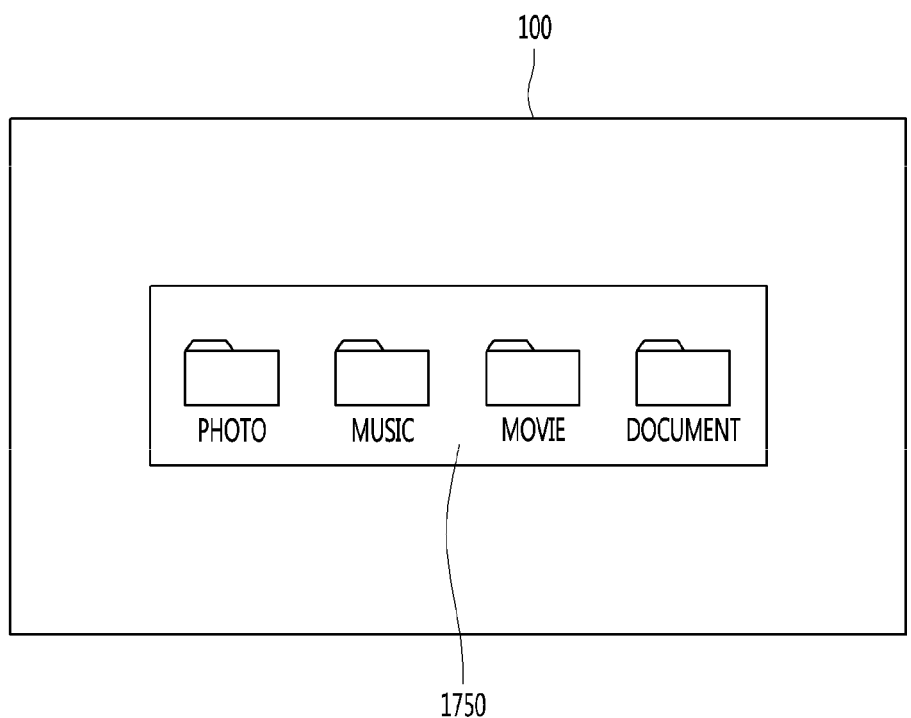
FIGS. 17a to 18b are views illustrating a method of switching input provided to a display device to external input when a pointer deviates from an area of a screen according to an embodiment of the present invention.

For example, in FIG. 17*a*, the image of broadcast content provided by a broadcast provider and received through the tuner 131 is displayed. If input provided to the display device is switched to input provided by the USB, the control unit 170 may display an image 1750 in a state in which input provided to the display device is switched to input provided by the USB as shown in FIG. 17*b*.

In addition, when input provided to the display device is switched to input provided by the USB, the control unit 170 may receive content stored in the USB from the USB and control the display unit 180 to display the image of the received content.

Figure 18A:
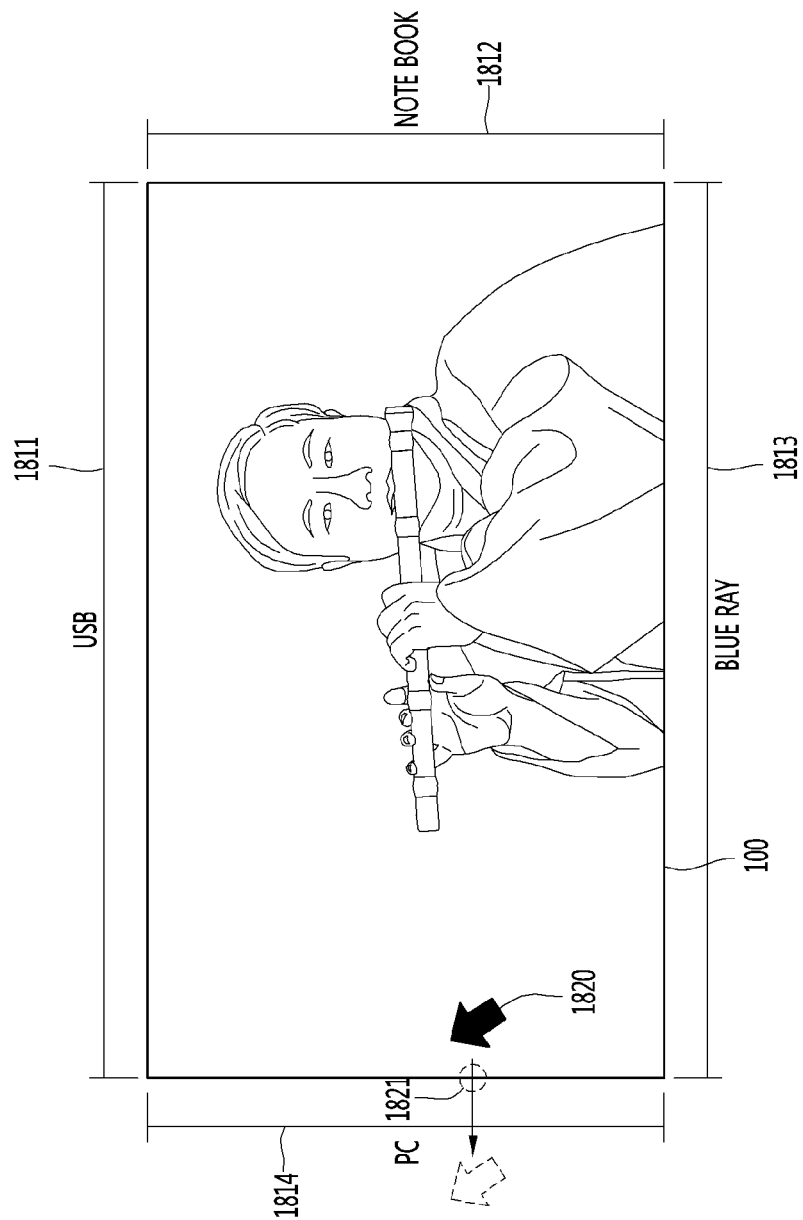

As another example, in FIG. 18*a*, input provided to the display device is broadcast provided by a broadcast provider and received through the tuner 131, and the control unit 170 displays the image of the broadcast content.

Meanwhile, when the pointer 1820 deviates from the area of the screen at a specific point 1821 of the fourth boundary 1814, the control unit 170 may switch input provided to the display device 100 to input provided by the PC which is the external device corresponding to the fourth boundary 1814.

Meanwhile, when input provided to the display device is switched to external input, the control unit 170 may display an image received from external input. Specifically, when input provided to the display device 100 is switched to input provided by a specific external device, the control unit 170 may receive an image from the specific external device. In addition, the control unit 170 may receive the received image.

Figure 18B:
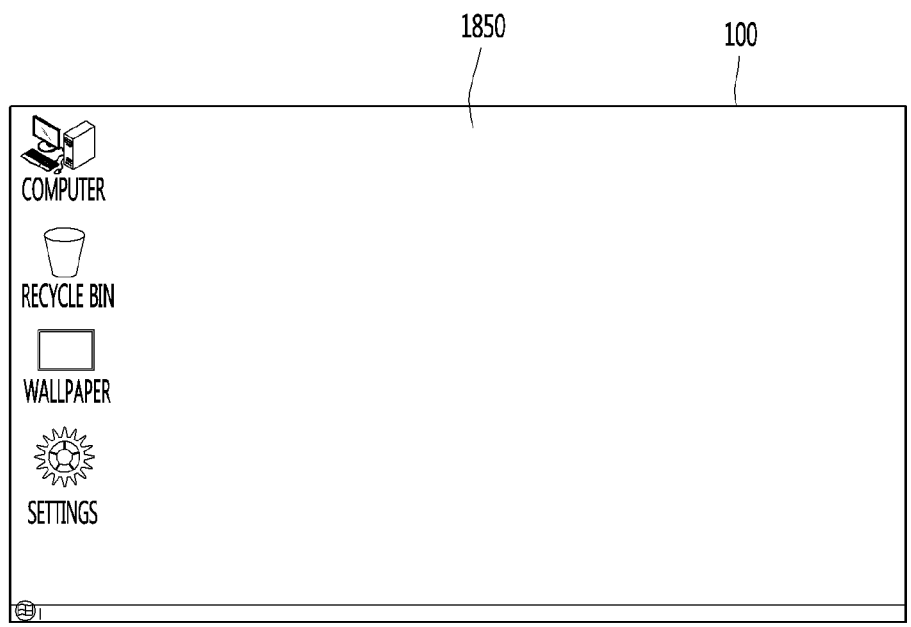

For example, when external input is switched to input provided by the PC, the control unit 170 may receive an image from the PC and display the image received from the PC, as shown in FIG. 18*b*.

FIG. 19 is a view illustrating a method of switching to external input when each of a plurality of external devices is mapped to a plurality of boundaries of an area of a screen.

In FIG. 19, a laptop is mapped to a first boundary 1930 among the plurality of boundaries of the area of the screen and a digital camera is mapped to a second boundary 1940.

Meanwhile, when the pointer 1910 deviates from the area of the screen through the first boundary 1930, the control unit 170 may switch input to input provided by the laptop which is the external device corresponding to the first boundary 1930.

Meanwhile, the pointer 1910 may deviate from the area of the screen in various directions. That is, the pointer 1910 may deviate from the area of the screen in a first direction 1921, a second direction 1922 or a third direction 1923. When the pointer 1910 deviates from the area of the screen in the first direction 1921, the second direction 1922 or the third direction 1923, the pointer 1910 deviates from the area of the screen through the first boundary 1930.

Accordingly, when the pointer 1910 deviates from the area of the screen in the first direction 1921, the second direction 1922 or the third direction 1923, the control unit 170 may switch input provided to the display device 100 to input provided by the laptop which is the external device corresponding to the first boundary 1930.

Meanwhile, when the pointer 1910 deviates from the area of the screen in a fourth direction 1924, the pointer 1910 may deviate from the area of the screen through the second boundary 1940.

Accordingly, when the pointer 1910 deviates from the area of the screen in the fourth direction 1924, the control unit 170 may switch input provided to the display device 100 to input provided by the digital camera which is the external device corresponding to the second boundary 1940.

Figure 20:
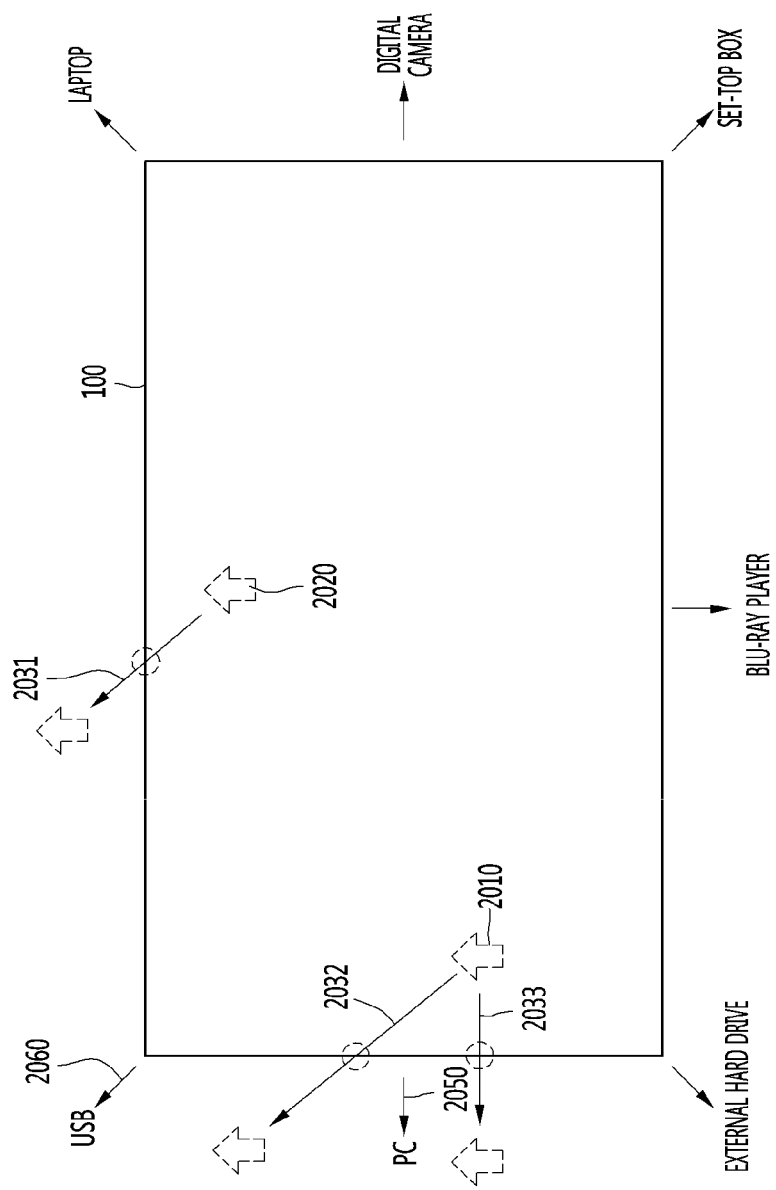
FIG. 20 is a view illustrating a method of switching to external input when each of a plurality of external devices is mapped to a plurality of directions in which a pointer deviates from an area of a screen.

FIG. 20 is a view illustrating a method of switching to external input when each of a plurality of external devices is mapped to a plurality of directions in which a pointer deviates from an area of a screen.

In FIG. 20, a USB is mapped to a seventh direction 2060 among the plurality of directions, in which the pointer deviates from the area of the screen, and a PC is mapped to a sixth direction 2050 among the plurality of directions, in which the pointer deviates from the area of the screen.

Meanwhile, if the pointer 1910 deviates from the area of the screen in the seventh direction, the control unit 170 may switch input provided to the display device 100 to input provided by the USB which is the external device corresponding to the seventh direction.

For example, if a first pointer 2010 deviates from the area of the screen in the seventh direction 2032, the control unit 170 may switch input provided to the display device 100 to input provided by the USB which is the external device corresponding to the seventh direction 2060.

As another example, if a second pointer 2020 deviates from the area of the screen in the seventh direction 2031, the control unit 170 may switch input provided to the display device 100 to input provided by the USB which is the external device corresponding to the seventh direction 2060.

Meanwhile, if the first pointer 2010 deviates from the area of the screen in the sixth direction 2033, the control unit 170 may switch input provided to the display device 100 to input provided by the PC which is the external device corresponding to the sixth direction 2050.

That is, in the embodiment of FIG. 20, switching to external input may be performed only by the direction in which the pointer deviates from the area of the screen, regardless of the boundary of a point at which the pointer deviates from the area of the screen.

Figure 21:
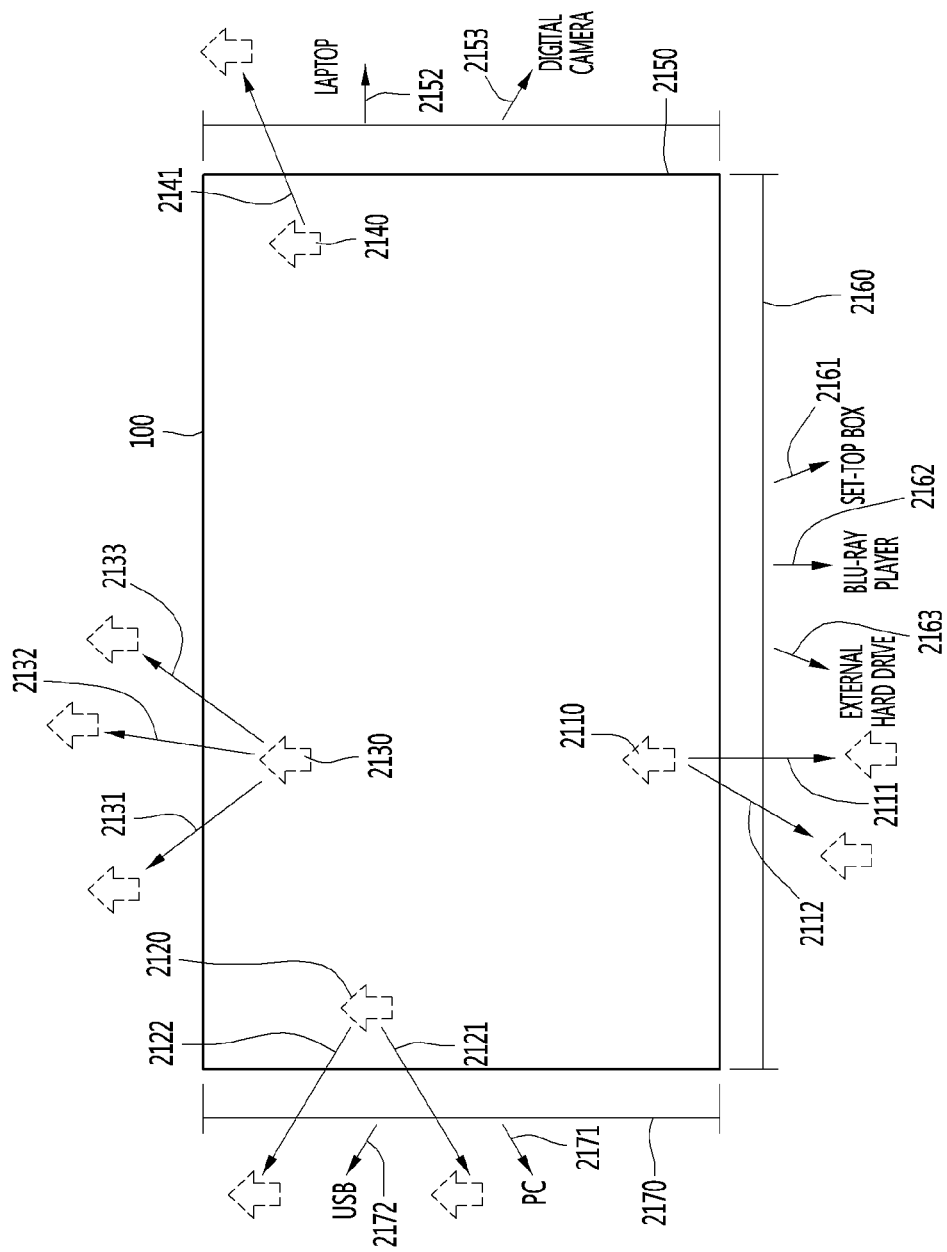
FIG. 21 is a view illustrating a method of switching to external input when each of a plurality of external devices is mapped to a plurality of boundaries and directions of an area of a screen.

FIG. 21 is a view illustrating a method of switching to external input when each of a plurality of external devices is mapped to a plurality of boundaries and directions of an area of a screen.

In FIG. 21, a laptop is mapped to a second boundary 2150 of a plurality of boundaries and a fifth direction 2152 of a plurality of directions, a digital camera is mapped to the second boundary 2150 of the plurality of boundaries and a sixth direction 2153 of the plurality of directions, a set-top box is mapped to a third boundary 2160 of the plurality of boundaries and a seventh direction 2161 of the plurality of directions, a blu-ray player is mapped to the third boundary 2160 of the plurality of boundaries and an eighth direction 2162 of the plurality of directions, an external hard drive is mapped to the third boundary 2160 of the plurality of boundaries and a tenth direction 2171 of the plurality of directions, a PC is mapped to a fourth boundary 2170 of the plurality of boundaries and a tenth direction 2171 of the plurality of directions, and a USB is mapped to the fourth direction 2170 of the plurality of boundaries and a twelfth direction 2172 of the plurality of directions.

Meanwhile, when the pointer deviates from the area of the screen through a specific boundary of the plurality of boundaries of the area of the screen and the pointer deviates from the area of the screen in a specific direction, the control unit 170 may switch input provided to the display device 100 to input provided by the external device corresponding to the specific boundary and the specific direction.

For example, if a first pointer 2110 deviates from the area of the screen through a third boundary 2160 and the first pointer 2110 deviates from the area of the screen in an eighth direction 2111, the control unit 170 may switch input provided to the display device 100 to input provided by the blu-ray player which is the external device corresponding to the third boundary 2161 and the eighth direction 2162.

As another example, when the first pointer 2110 deviates from the area of the screen through the third boundary 2160 and the first pointer 2110 deviates from the area of the screen in a ninth direction 2112, the control unit 170 may switch input provided to the display device 100 to input provided by an external hard drive which is the external device corresponding to the third boundary 2161 and the ninth direction 2163.

As another example, when the second pointer 2120 deviates from the area of the screen through the fourth boundary 2170 and the second pointer 2120 deviates from the area of the screen in a tenth direction 2121, the control unit 170 may switch input provided to the display device 100 to input provided by the PC which is the external device corresponding to the fourth boundary 2170 and the tenth direction 2171.

As another example, when the second pointer 2120 deviates from the area of the screen through the fourth boundary 2170 and the second pointer 2120 deviates from the area of the screen in a twelfth direction 2122, the control unit 170 may switch input provided to the display device 100 to input provided by the USB which is the external device corresponding to the fourth boundary 2170 and the twelfth direction 2172.

Meanwhile, a third pointer 2130 deviates from the area of the screen through an upper boundary of the area of the screen but there is no external device mapped to the upper boundary of the area of the screen. Accordingly, even when the third pointer 2130 deviates from the area of the screen through the upper boundary of the area of the screen in a plurality of directions 2131, 2132 and 2133, the control unit 170 may not switch input provided to the display device 100.

Meanwhile, the fourth pointer 2140 deviates from the area of the screen through a second boundary 2150 and deviates from the area of the screen in a fourth direction 2141. Meanwhile, although the laptop and the digital camera are mapped to the second boundary 2150, the direction in which the pointer deviates from the area of the screen and the direction to which the laptop and the digital camera are mapped are different. Accordingly, the control unit 170 may not switch input provided to the display device 100.

Meanwhile, when the pointer deviates from the area of the screen but there is no external device mapped to the boundary or direction in which the pointer deviates from the screen, the control unit 170 may output a message indicating that there is no external device corresponding to the boundary or direction in which the pointer deviates from the screen.

Figure 22:
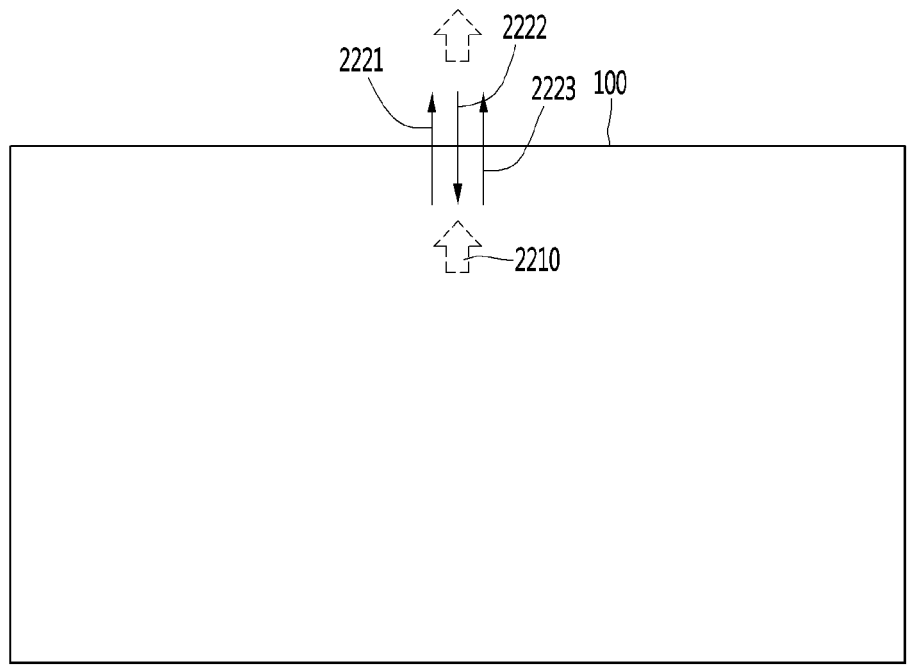
FIGS. 22 to 24b are views illustrating various methods of determining whether a pointer deviates from an area of a screen according to an embodiment of the present invention.

FIGS. 22 to 24 are views illustrating various methods of determining whether a pointer deviates from an area of a screen according to an embodiment of the present invention.

FIG. 22 is a view illustrating a method of determining whether a pointer deviates from an area of a screen when a user shakes a remote control device according to an embodiment of the present invention.

The control unit 170 may acquire the coordinates of the pointer based on motion of the remote control device and determine whether the pointer deviates from the area of the screen.

Meanwhile, when a pointer 2210 moves to correspond to shaking of the remote control device based on the boundary of the area of the screen, the control unit 170 may determine that the pointer deviates from the area of the screen.

Specifically, as shown in FIG. 22, when the pointer moves from the area of the screen to a virtual area located outside the screen due to first movement 2221 of the pointer 2210, the pointer moves from the virtual area located outside the screen to the area of the screen due to second movement 2222 of the pointer 2210 and the pointer moves from the area of the screen to the virtual area located outside the screen again due to third movement 2223 of the pointer 2210, the control unit 170 may determine that the pointer deviates from the area of the screen.

FIG. 23 is a view illustrating a method of determining whether a pointer deviates from an area of a screen according to a movement distance of the pointer according to an embodiment of the present invention.

The control unit 170 may acquire the coordinates of the pointer based on motion of the remote control device 200 and determine the movement distance when the pointer moves once.

Specifically, when the user moves the remote control device 200 upward once, the control unit 170 moves the pointer upward once based on motion of the remote control device 200 and displays the pointer. In this case, the control unit 170 may determine the movement distance when the pointer moves once. Here, the movement distance of the pointer may include not only a movement distance of the pointer in the area of the screen but also a movement distance of the pointer in the virtual area outside the screen.

Meanwhile, if the movement distance of the pointer is equal to or greater than a specific distance, the control unit 170 may determine that the pointer deviates from the area of the screen.

Figure 23A:
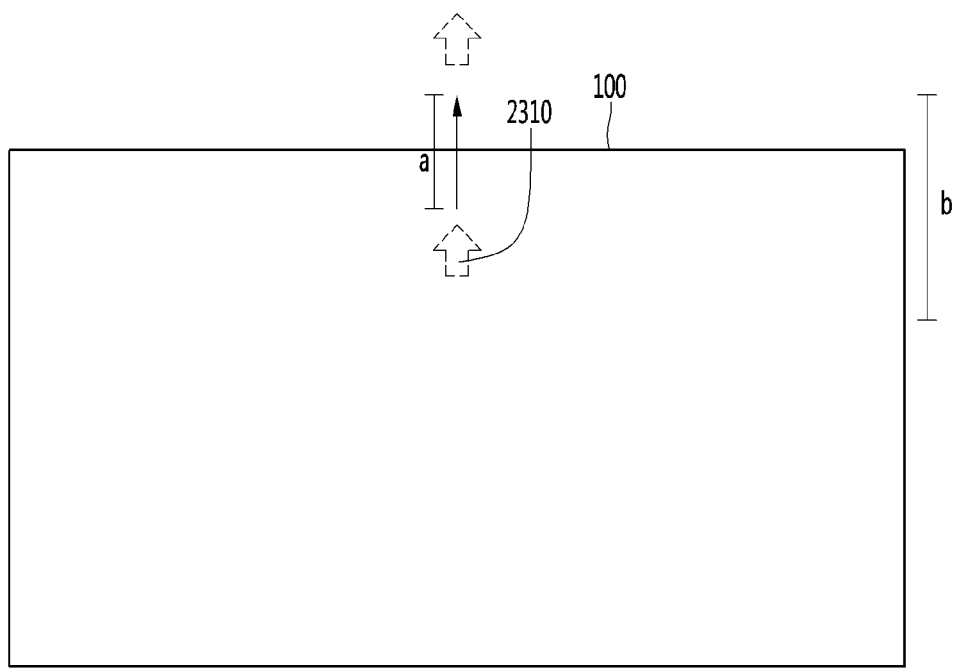

For example, when the specific distance is b and a pointer 2310 moves by a distance a shorter than the distance b as shown in FIG. 23a, the control unit 170 may determine that the pointer does not deviate from the area of the screen.

Figure 23B:
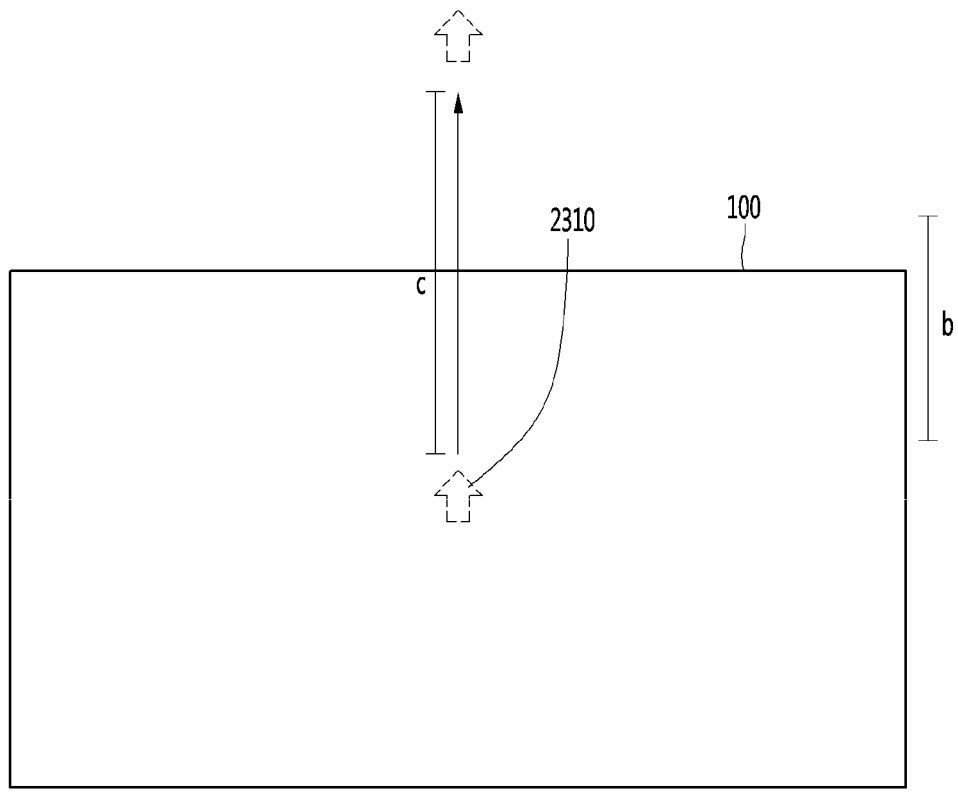

As another example, if the specific distance is b and the pointer 2310 moves by a distance c longer than the distance b as shown in FIG. 23b, the control unit 170 may determine that the pointer deviates from the area of the screen.

FIG. 24 is a view illustrating a method of determining whether a pointer deviates from an area of a screen according to the movement speed of the pointer according to an embodiment of the present invention.

The control unit 170 may acquire the movement speed of the pointer based on the movement distance of the pointer and the movement time of the pointer according to motion of the remote control device 200.

Here, the movement distance of the pointer may include not only a movement distance of the pointer in the area of the screen but also a movement distance of the pointer in the virtual area outside the screen.

Meanwhile, if the movement speed of the pointer is equal to or greater than a specific speed, the control unit 170 may determine that the pointer deviates from the area of the screen.

Figure 24A:
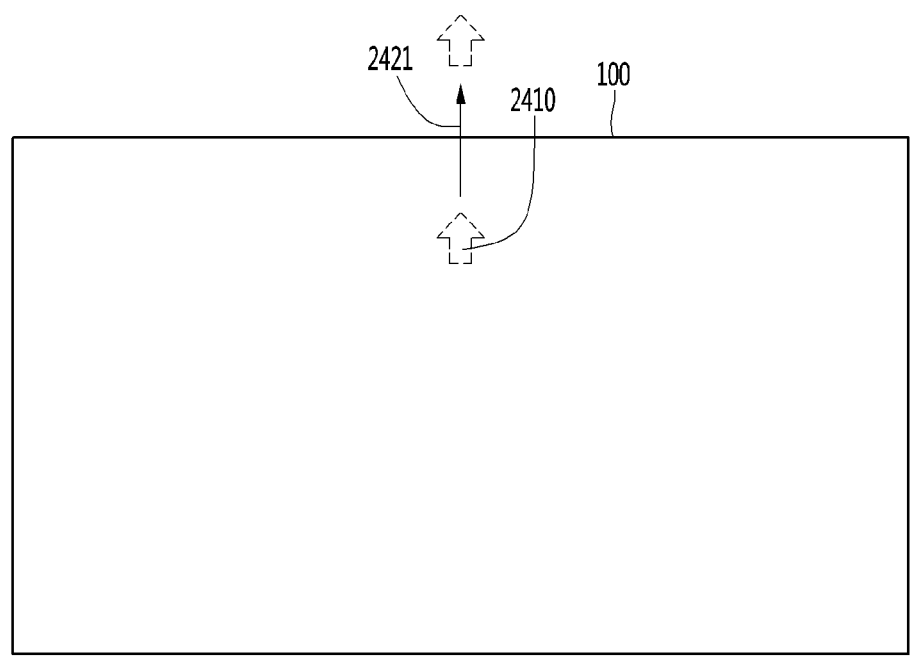

For example, as shown in FIG. 24a, when the pointer 2410 moves at a specific speed or less and deviates from the area of the screen, the control unit 170 may determine that the pointer 2410 does not deviate from the area of the screen.

Figure 24B:
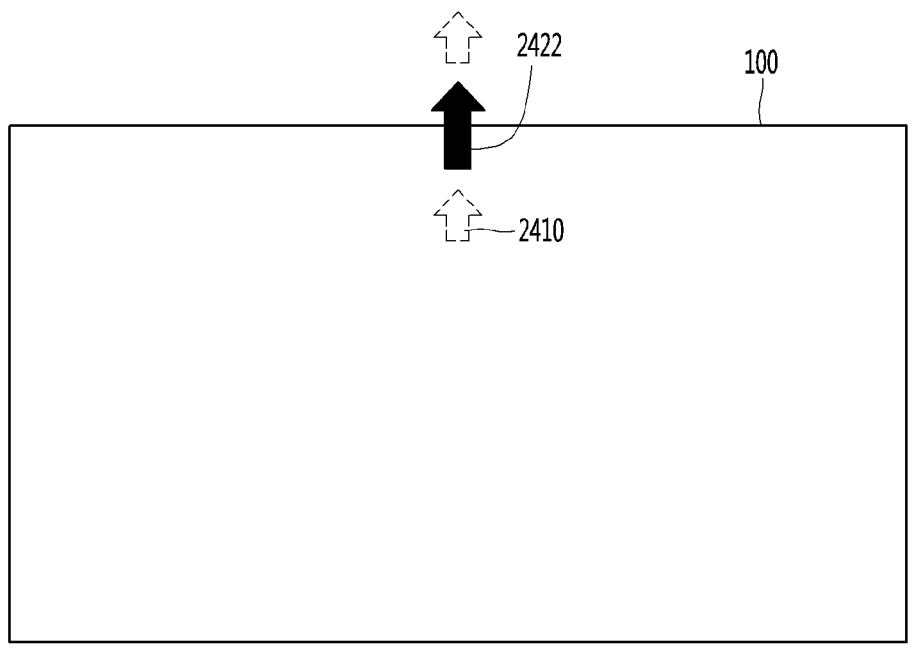

As another example, as shown in FIG. 24b, when the pointer 2410 moves at a speed exceeding the specific speed and deviates from the area of the screen, the control unit 170 may determine that the pointer 2410 deviates from the area of the screen.

Conventionally, for switching to external input, an external input button was pressed to confirm a list of interfaces (e.g., a USB terminal, a first HDMI terminal, etc.) capable of receiving external input was confirmed and then a specific interface was selected.

In the present invention, external devices capable of providing external input are displayed through icons indicating the external devices and the types of the external devices, such that the user may more intuitively determine a desired external device.

In addition, unlike the conventional method of pressing the specific button and selecting the specific interface to switch to external input, an environment capable of switching to external input by a simple operation of moving the pointer to the outside of the area of the screen is provided.

In addition, in the present invention, since the user may map an external device to a desired area and move the pointer to an area, in which the external device is located, to switch input, an environment in which switching to external input may be intuitively performed is provided.

FIG. 25 is a view illustrating a display screen when input provided to a display device is switched to external input, according to an embodiment of the present invention.

As shown in FIG. 25a, if a pointer 2510 deviates from a boundary 2521 of an area of a screen corresponding to a PC in a state in which input (broadcast content) provided by a broadcast provider and received through the tuner 131 is displayed, the control unit 170 may switch input provided to the display device 100 to input provided by the PC.

Figure 25B:
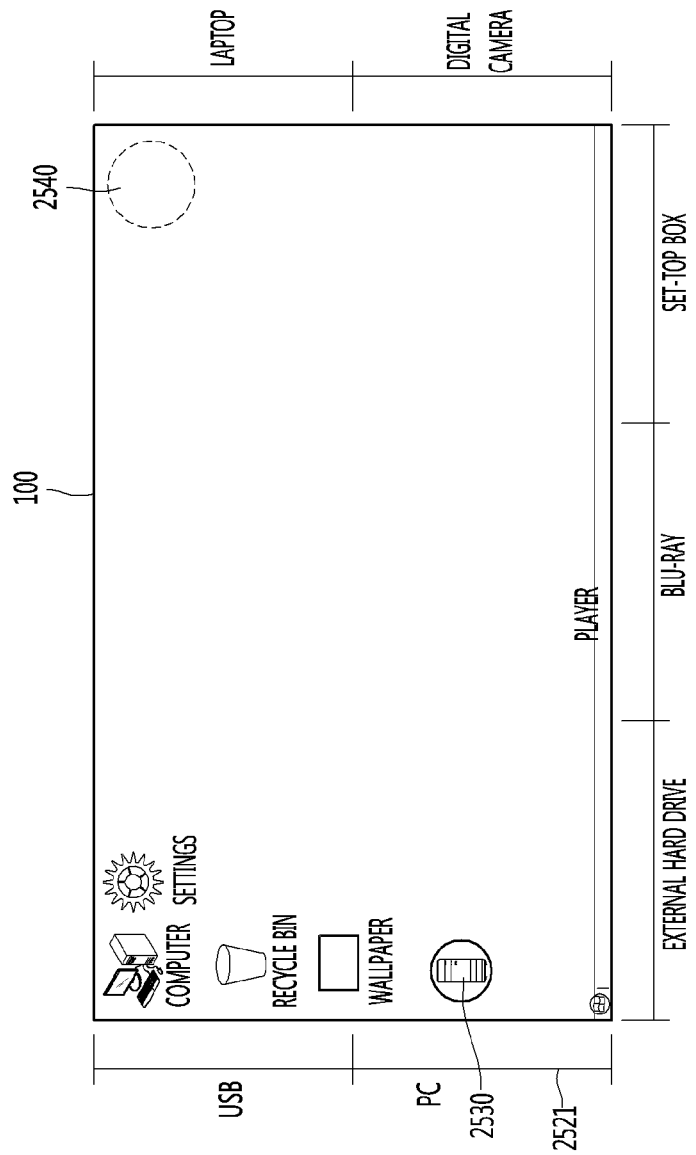

Meanwhile, when input provided to the display device 100 is switched to input provided by the PC, the control unit 170 may receive input provided by the PC. That is, as shown in FIG. 25*b*, an image may be received from the PC and the received image may be displayed. In this case, the image received from the PC may be equal to the image displayed on the screen of the PC.

When input provided to the display device 100 is switched to input provided by a specific external device, the control unit 170 may display an icon indicating the specific external device in an area corresponding to a boundary, to which the specific external device is mapped.

For example, when input provided to the display device 100 is switched to input provided by the PC, the control unit 170 may display an icon 2530 indicating the PC in the area corresponding to the boundary 2521, to which the PC is mapped.

The present invention is not limited thereto and the icon 2530 indicating the PC may be displayed in one area of the screen. For example, the icon 2530 indicating the PC may be displayed in the upper right area 2540 of the screen so as not to disturb user's viewing.

Meanwhile, the icon indicating the external device for providing input to the display device 100 may be periodically displayed. For example, the control unit 170 may display the icon 2530 indicating the PC when input provided to the display device 100 is switched to input provided by the PC, stop display of the icon 2530 indicating the PC, and repeatedly display the icon 2530 indicating the PC at a predetermined time interval.

Meanwhile, the icon indicating the external device for providing input to the display device 100 may be displayed according to user input. For example, when user input of confirming the external device for currently providing input to the display device is received, the control unit 170 may display the icon 2530 indicating the PC in one area of the screen.

FIG. 26 is a view illustrating a method of operating an external device when input provided to a display device is switched to external input, according to an embodiment of the present invention.

As shown in FIG. 26*a*, when a pointer 2610 deviates from a boundary 2621 of an area of a screen corresponding to a PC in a state in which input (broadcast content) provided by a broadcast provider and received through the tuner 131 is displayed, the control unit 170 may switch input provided to the display device 100 to input provided by the PC.

Figure 26B:
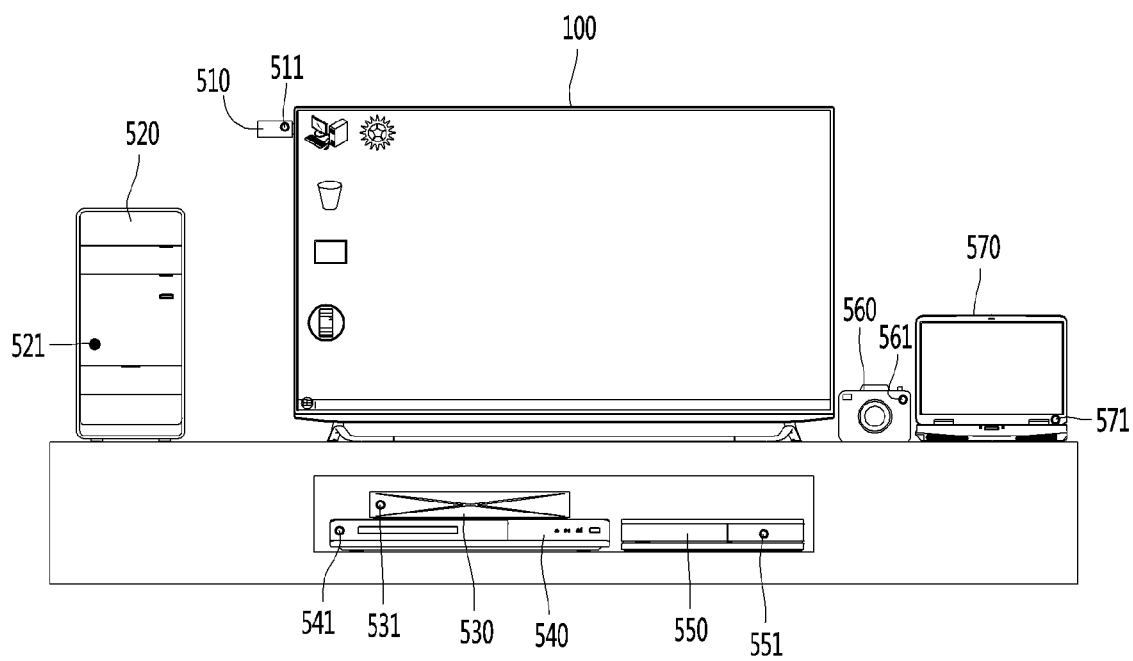

In addition, the control unit 170 may receive and display an image from the PC, as shown in FIG. 26*b*.

Meanwhile, although a plurality of external devices 520, 530, 540, 550, 560 and 570 are mapped to the boundaries of the area of the screen or directions in which the pointer deviates from the screen, some of the plurality of mapped external devices 520,530, 540, 550, 560 and 570 may be powered on and the remaining external devices may be powered off.

Meanwhile, when the pointer 2610 deviates from the boundary of the area of the screen corresponding to a specific external device but the specific external device is powered off, the control unit 170 may transmit a power ON command to the specific external device and switch input provided to the display device 100 to input provided by the specific external device. Specifically, the control unit 170 may determine whether communication with the specific external device is possible through the communication unit 173 or the external device interface unit 135 and transmit the power ON command to the specific external device when the specific external device is powered off and thus communication with the specific external device is impossible.

For example, as shown in FIG. 26*a*, when the pointer 2610 deviates from the boundary 2621 of the area of the screen corresponding to the PC but the PC 520 is powered off, the control unit 170 may transmit the power ON command to the PC through the external device interface unit 135 or the communication unit 173.

Meanwhile, when the power ON command is received from the display device 100, the control unit of the PC 520 may power the PC 520 on and provide input to the display device 100.

In this case, the control unit 170 may output an image using input provided by the PC 520.

Meanwhile, the plurality of external devices 520, 530, 540, 550, 560 and 570 may include light output units 521, 531, 541, 551, 561 and 571, respectively. Here, each of the light output units 521, 531, 541, 551, 561 and 571 may include an LED.

Meanwhile, when input provided to the display device 100 is switched to input provided by a specific external device, the control unit 170 may transmit a light output command to the specific external device. For example, when input provided to the display device 100 is switched to input provided by the PC, the control unit 170 may transmit the light output command to the PC.

Meanwhile, when the light output command is received from the display device 100, the control unit of the PC 520 may control the light output unit 521 to output a light signal.

Meanwhile, the control unit 170 may periodically transmit the light output command to the specific external device and the control unit of the specific external device may periodically output the light signal.

In addition, when user input of confirming the external device for providing input to the display device is received, the control unit 170 may transmit the light output command to the specific external device.

Although the light output command is described as being transmitted in the present embodiment, the present invention is not limited thereto. For example, in the case of the USB 510 which does not include the control unit, the control unit 170 of the display device 100 may directly control the light output unit 511 of the USB 510 to output the light signal.

In the present invention, the user can easily confirm the external device for providing external input in a state of being switched to external input.

FIG. 27 is a view illustrating a process of displaying a pointer, acquiring coordinates of the pointer based on motion of a remote control device and switching to external input when the pointer deviates from an area of a screen, according to an embodiment of the present invention.

As shown in FIG. 27*a*, the remote control device 200 may receive input to a specific button 210. Here, input to the specific button 210 may be user input of displaying a pointer and confirming the mapping states of a plurality of external devices.

Meanwhile, the remote control device 200 may transmit a signal corresponding to the specific button 210 to the display device 100.

Meanwhile, when the signal corresponding to the specific button 210 is received from the remote control device 200, the control unit 170 may display a pointer 2710 on the screen. In addition, when the signal corresponding to the specific button 210 is received from the remote control device 200, the control unit 170 may display at least one of the boundaries and directions respectively corresponding to the plurality of external devices.

For example, as shown in FIG. 27b, the control unit 170 may display areas 2721, 2722, 2723, 2724, 2725, 2726 and 2727 respectively corresponding to a plurality of boundaries, to which the plurality of external devices is mapped.

In addition, the control unit 170 may display a plurality of icons 2741, 2742, 2743, 2744, 2745, 2746 and 2747 respectively indicating the plurality of external devices along with the areas 2721, 2722, 2723, 2724, 2725, 2726 and 2727 respectively corresponding to the plurality of boundaries, to which the plurality of external devices is mapped.

Meanwhile, although the areas corresponding to the boundaries, to which the plurality of external devices is mapped, are described as being displayed in FIG. 27b, the present invention is not limited thereto.

Specifically, the control unit 180 may display areas 2721, 2722, 2723, 2724, 2725, 2726, 2727, 2728 and 2729 respectively corresponding to the plurality of boundaries, to which the plurality of external devices may be respectively mapped.

Meanwhile, the control unit 170 may display the areas 2721, 2722, 2723, 2724, 2725 and 2726 corresponding to the boundaries, to which the external devices are mapped, and the areas 2727, 2728 and 2729 corresponding to the boundaries, to which the external devices are not mapped, to be distinguished therebetween.

FIG. 27c is a view showing movement of a remote control device and movement of a pointer corresponding to movement of the remote control device.

Here, movement of the remote control device 200 may be movement in a state of maintaining input to the specific button. Specifically, the user may move the remote control device 200 in a state of maintaining input to the specific button 210 of the remote control device 200. In this case, the remote control device 200 may transmit, to the display device 100, information on motion of the remote control device 200 in a state of maintaining input to the specific button 210.

When the information on motion of the remote control device 200 in a state of maintaining input to the specific button 210 is received, the control unit 170 of the display device 100 may determine whether the pointer deviates from the area of the screen based on the information on motion of the remote control device 200 in a state of maintaining input to the specific button 210.

Specifically, the control unit 170 of the display device 100 may receive the information on motion of the remote control device 200 in a state of maintaining input to the specific button 210 and acquire the coordinates of the pointer 2710 based on the information on motion of the remote control device 200. In addition, when the coordinates of the pointer 2710 deviate from the area of the screen, the control unit 170 may switch input provided to the display device 100 to external input.

Meanwhile, although the plurality of external devices is described as being mapped to the plurality of boundaries of the area of the screen in the present embodiment, the present invention is not limited thereto. For example, the control unit 170 may display the directions in which the pointer deviated from the area of the screen, to which the plurality of external devices is mapped. As another example, the control unit 170 may display the boundaries of the area of the screen and the directions in which the pointer deviates from the area of the screen, to which the plurality of external devices is mapped.

In the present invention, external input may be switched to an external device by a simple operation. For example, the conventional method of switching to external input is performed by (1) selecting an external input button and displaying a list of external devices, (2) moving the remote control device, and (3) pressing a button in order to select an external device included in the list. In contrast, in the present invention, external input is switched by (1) the user pressing an external input button to confirm the mapping area of an external device and (2) moving the remote control device in a state of pressing the external input button, thereby providing a simpler operation environment. In addition, since the mapping areas of the external devices may be simultaneously confirmed, it is possible to improve input switching accuracy.

Meanwhile, although operation in a state of maintaining input to the specific button is described in the present embodiment, the present invention is not limited thereto.

For example, the pointer may be displayed when first input is received and input may be switched to input provided by the external device corresponding to a direction (or the boundary or the boundary and the direction), in which the pointer deviates from the screen, when the pointer deviates from the screen.

As another example, the pointer may be displayed when first input is received, icons indicating the plurality of external devices may be displayed when second input is received and input may be switched to input provided by the external device corresponding to a direction (or the boundary or the boundary and direction), in which the pointer deviates from the screen), when the pointer deviates from the screen.

As another example, the pointer and the icons indicating the plurality of external devices may be displayed when first input is received and input may be switched to input provided by the external device corresponding to the direction (or the boundary or the boundary and direction), in which the pointer deviates from the screen, when the pointer deviates from the area of the screen in a specific direction (or a specific boundary or the specific boundary and direction).

FIG. 28 is a view illustrating a method of distinguishably displaying an external device corresponding to a specific boundary such that a pointer deviates from an area of a screen through the specific boundary.

In the above-described embodiments, when the pointer deviates from the area of the screen, input provided to the display device 100 is immediately switched to external input. However, in the present embodiment, when the pointer deviates from the area of the screen and user input of switching to the external input is received, input provided to the display device 100 is switched to external input.

Figure 28A:
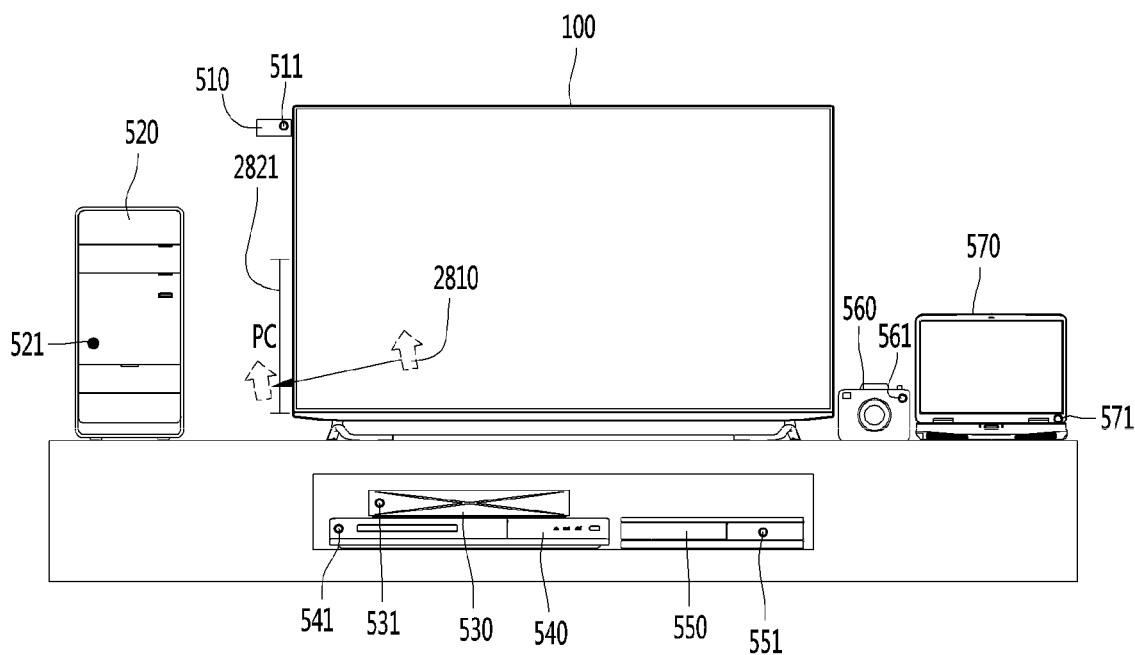
FIGS. 28a to 28b are views illustrating a method of distinguishably displaying an external device corresponding to a specific boundary such that a pointer deviates from an area of a screen through the specific boundary.

In FIG. 28a, the plurality of external devices 510, 520, 530, 540, 550, 560 and 570 mapped to the boundaries of the area of the screen of the display device 100 are shown. In this case, the plurality of external devices may include light output units 511, 521, 531, 541, 551, 561 and 571.

Meanwhile, when a pointer 2810 deviates from the area of the screen through a specific boundary among the boundaries of the area of the screen, the control unit 170 may transmit a light output command to the external device corresponding to the specific boundary. For example, as shown in FIG. 28a, when the pointer 2810 deviates from the area of the screen through a boundary 2821 corresponding to the PC 520, the control unit 170 may transmit the light output command to the PC 520. In this case, the control unit of the PC 520 may control the light output unit 521 of the PC 520 to output the light signal.

Figure 28B:
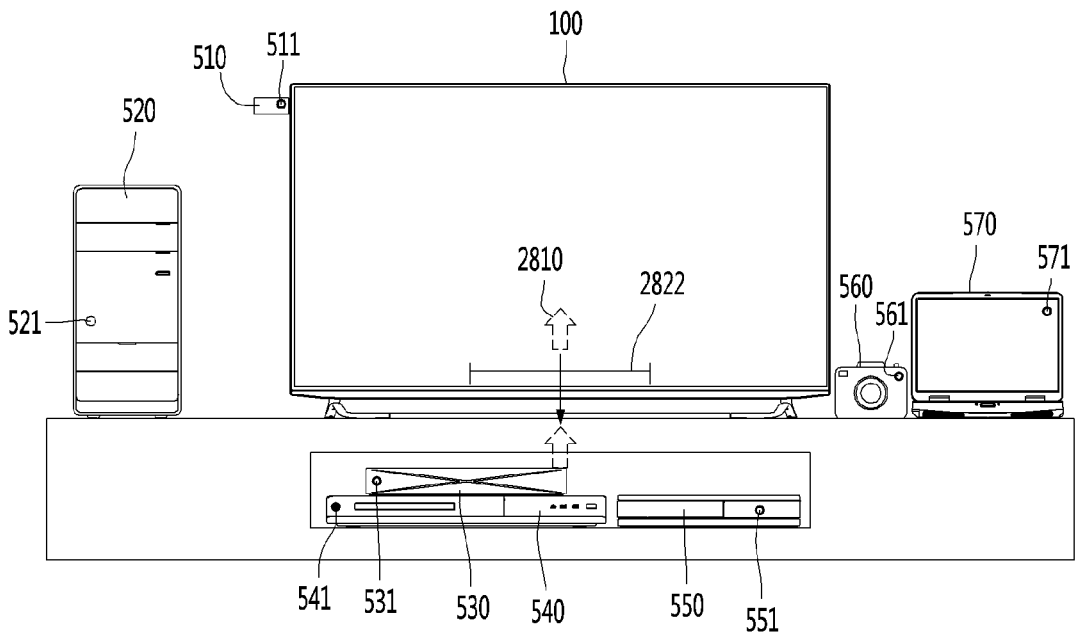

As another example, as shown in FIG. 28*b*, when the pointer 2810 deviates from the area of the screen through a boundary 2822 corresponding to the blu-ray player 540, the control unit 170 may transmit the light output command to the blu-ray player 540. In this case, the control unit of the blu-ray player 540 may control the light output unit 541 of the blu-ray player 540 to output the light signal.

Meanwhile, when user input is received in a state in which the pointer deviates from the area of the screen, the control unit 170 may switch input to input provided by the external device corresponding to the boundary, through which the pointer deviates from the area of the screen. For example, when a user request for switching input in a state in which the pointer 2810 deviates from the area of the screen through the boundary 2822 corresponding to the blu-ray player 540 such that the light output unit 541 of the blu-ray player 540 outputs the light signal, the control unit 170 may switch input provided to the display device 100 to input provided by the blu-ray player 540.

Figure 29:
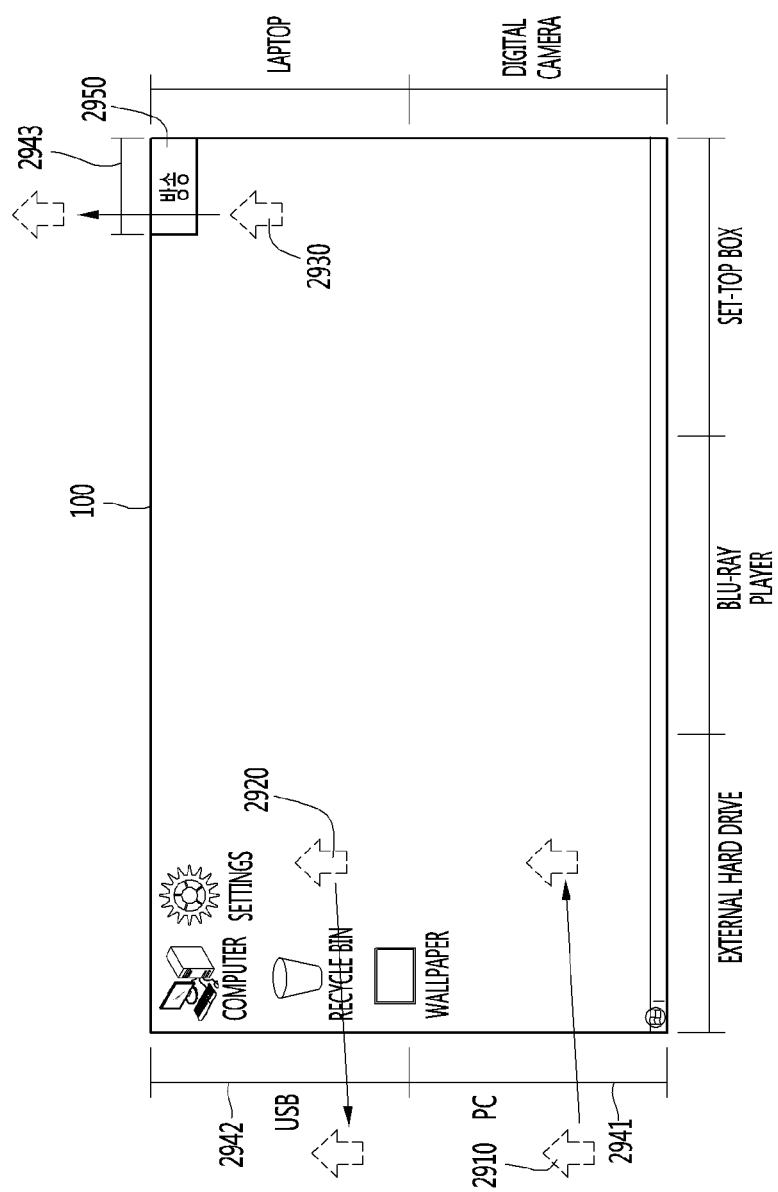
FIG. 29 is a view illustrating a method of switching input again in a state of switching input provided to a display device to external input.

FIG. 29 is a view illustrating a method of switching input again in a state of switching input provided to a display device to external input.

The control unit 170 may switch input provided to the display device again in a state in which input provided to the display device is switched to external input.

Specifically, the control unit 170 may receive information on second movement of the remote control device in a state in which input provided to the display device is switched to external input.

In addition, the control unit 170 may acquire the coordinates of the pointer moved in correspondence with second motion of the remote control device based on the information on second movement of the remote control device.

When the pointer moved in correspondence with second motion is moved from the area outside the screen to the area of the screen or the pointer moved in correspondence with second motion is moved from the area of the screen to the area outside screen based on the coordinates of the pointer moved in correspondence with second motion of the remote control device, input provided to the display device may be switched to second external input and an image may be displayed using the second external input.

Meanwhile, when input provided to the display device is input provided by a specific external device, the control unit 170 may perform control to switch input provided to the display device to basic input.

For example, as shown in FIG. 29, when a virtual pointer 2910 located outside the area of the screen is moved to the area of the screen according to motion of the remote control device, the control unit 170 may switch input provided to the display device to basic input.

In this case, basic input may be input provided by the broadcast provider, that is, broadcast content.

For example, when the display device 100 displays broadcast content using external input (broadcast content) received from a set-top box and the virtual pointer 2910 located outside the area of the screen is moved to the area of the screen according to motion of the remote control device, the control unit 170 may switch input provided to the display device to input provided by the set-top box. When input is switched, the control unit 170 may display an image using input (broadcast content) provided by the set-top box.

As another example, when the display device 100 displays broadcast content using a broadcast signal received through the tuner 131 and the virtual pointer 2910 located outside the area of the screen is moved to the area of the screen according to motion of the remote control device, the control unit 170 may display broadcast content using the broadcast signal received through the tuner 131.

Meanwhile, when the virtual pointer 2910 located outside the area of the screen is moved to the area of the screen according to motion of the remote control device and the virtual pointer 2910 is moved to the area of the screen through the boundary corresponding to the external device for providing input to the display device 100, the control unit 170 may switch input provided to the display device to basic input.

For example, in FIG. 29, external input is input provided by the PC. In this case, the pointer 2910 is moved to the area of the screen according to motion of the remote control device 200 and the pointer 2910 is moved to the area of the screen through the boundary corresponding to the PC for currently providing input to the display device 100. In this case, the control unit 170 may switch input provided to the display device to basic input and display an image using basic input.

Meanwhile, if input provided to the display device is input provided by a specific external device, the control unit 170 may perform control to switch input provided to the display device to input provided by an external device different from the specific external device.

For example, in FIG. 29, input provided by the display device 100 is input provided by the PC, and the image of the PC is displayed. Meanwhile, a second pointer 2920 is moved from the area of the screen to the area outside the screen and the second pointer 2920 is moved to the area outside the screen through the boundary corresponding to the USB among the boundaries of the area of the screen.

In this case, the control unit 170 may switch input provided to the display device from input provided by the PC to input provided by the USB. In addition, the control unit 170 may display an image using input provided by the USB.

Meanwhile, a plurality of boundaries for dividing all or some of the boundaries of the area of the screen may include a boundary 2943 corresponding to broadcast content. Meanwhile, the control unit 170 may display an area 2950 corresponding to the boundary 2943 corresponding to the broadcast content.

Meanwhile, when a third pointer 2930 is moved from the area of the screen to the area outside the screen and the third pointer 2930 is moved from the area of the screen to the area outside the screen through the boundary 2943 corresponding to the broadcast content, the control unit 170 may switch input provided to the display device 100 to the broadcast content provided by the broadcast provider and display the broadcast content.

Meanwhile, when the third pointer 2930 is moved from the area of the screen to the area outside the screen through the boundary 2943 corresponding to the broadcast content, the control unit 170 may display the broadcast content using the broadcast signal received through the tuner 131. The present invention is not limited thereto and, when the third pointer 2930 is moved from the area of the screen to the area outside the screen through the boundary 2943 corresponding to the broadcast content, the control unit 170 may switch input provided to the display device 100 to input provided by the set-top box connected to the display device. In addition, the control unit 170 may receive and display the broadcast content from the set-top box.

FIG. 30 is a view illustrating a method of mapping a new external device when the new external device is detected, according to an embodiment of the present invention.

Figure 30A:
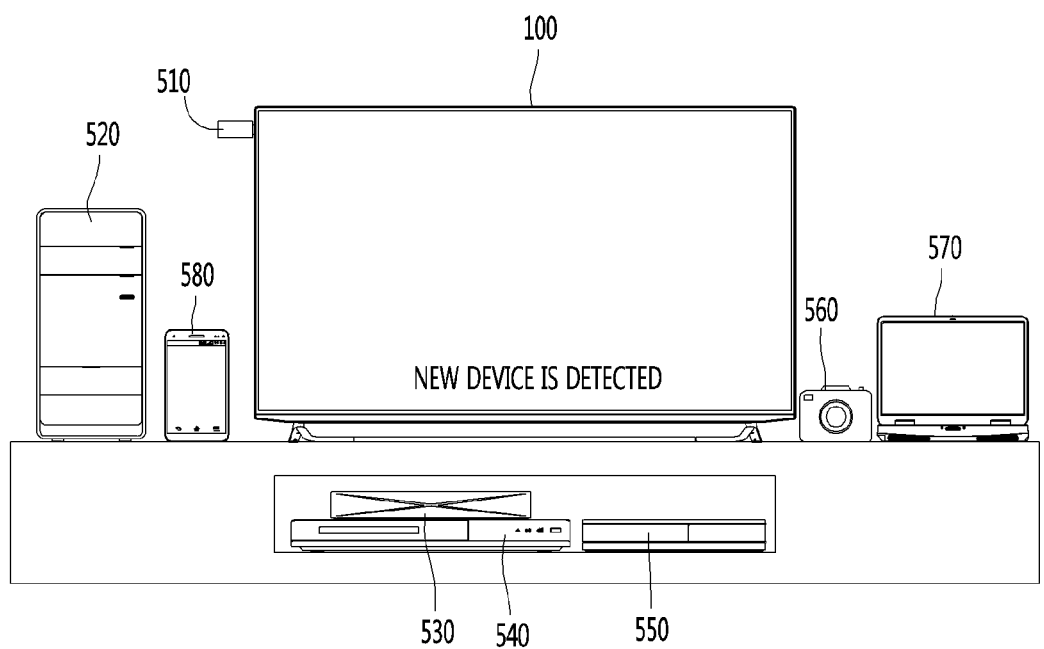
FIGS. 30a to 30d are views illustrating a method of mapping a new external device when the new external device is detected, according to an embodiment of the present invention.

In FIG. 30a, currently, the plurality of external devices 510, 520, 530, 540, 550, 560 and 570 exists around the display device 100 and specific boundaries of the area of the screen (or specific directions in which the pointer deviates from the area of the screen or specific boundaries of the area of the screen and specific directions in which the pointer deviates from the area of the screen) are mapped to the plurality of external devices 510, 520, 530, 540, 550, 560 and 570.

Meanwhile, when a new external device 580 accesses the display device 100, the control unit 170 may detect the new external device 580 through the communication unit 173. Meanwhile, although the new external device 580 is a mobile phone and the control unit 170 detects the new external device 580 through wireless communication using the communication unit 173 in the present embodiment, the present invention is not limited thereto. For example, when a new external device such as a camcorder is connected to the display device 100 through a connection terminal of the external device interface unit 135, the control unit 170 may detect the new external device using identification information received from the camcorder.

Figure 30B:
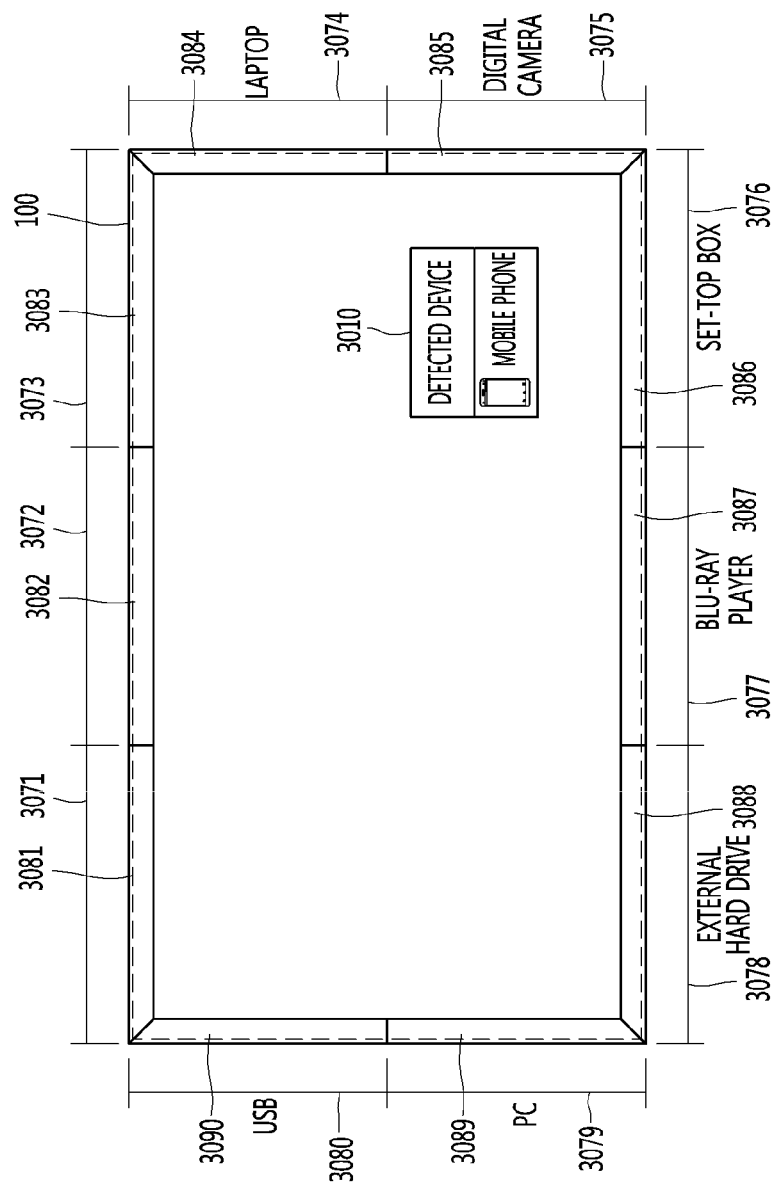

Meanwhile, when the new external device 580 is detected, the control unit 170 may display a message indicating that the new external device is detected and information 3010 on the new external device, as shown in FIG. 30b.

In addition, the control unit 170 may display a plurality of areas 3081, 3082, 3083, 3084, 3085, 3086, 3087, 3088, 3089 and 3090 respectively corresponding to a plurality of boundaries 3071, 3072, 3073, 3074, 3075, 3076, 3077, 3078, 3079 and 3080, to which external devices may be mapped. Here, the plurality of boundaries 3071, 3072, 3073, 3074, 3075, 3076, 3077, 3078, 3079 and 3080, to which the external devices may be mapped, may configure all or some of the boundaries of the area of the screen.

Meanwhile, the control unit 170 may display a plurality of areas 3084, 3085, 3086, 3087, 3088, 3089 and 3090 corresponding to boundaries 3074, 3075, 3076, 3077, 3078, 3079 and 3080, to which the external devices are mapped, among the plurality of boundaries 3071, 3072, 3073, 3074, 3075, 3076, 3077, 3078, 3079 and 3080, to which the external devices may be mapped, to be distinguished from the plurality of areas 3081, 3082 and 3083 corresponding to the boundaries 3071, 3072 and 3073, to which the external devices are not mapped. For example, the control unit 170 may highlight the plurality of areas 3081, 3082 and 3083 corresponding to the boundaries 3071, 3072 and 3073, to which the external devices are not mapped, or display the plurality of areas 3081, 3082 and 3083 corresponding to the boundaries 3071, 3072 and 3073, to which the external devices are not mapped, with a darker color than the plurality of areas 3084, 3085, 3086, 3087, 3088, 3089 and 3090 corresponding to the boundaries 3074, 3075, 3076, 3077, 3078, 3079 and 3080, to which the external devices are mapped.

Meanwhile, the boundaries, to which the external devices may be mapped, may be corrected. Specifically, when input of correcting the boundaries, to which the external devices may be mapped, is received, the control unit 170 may correct the number of boundaries, to which the external devices may be mapped, or a ratio of the length of each of the plurality of boundaries, to which the external devices may be mapped, to the total length of the boundaries.

Figure 30C:
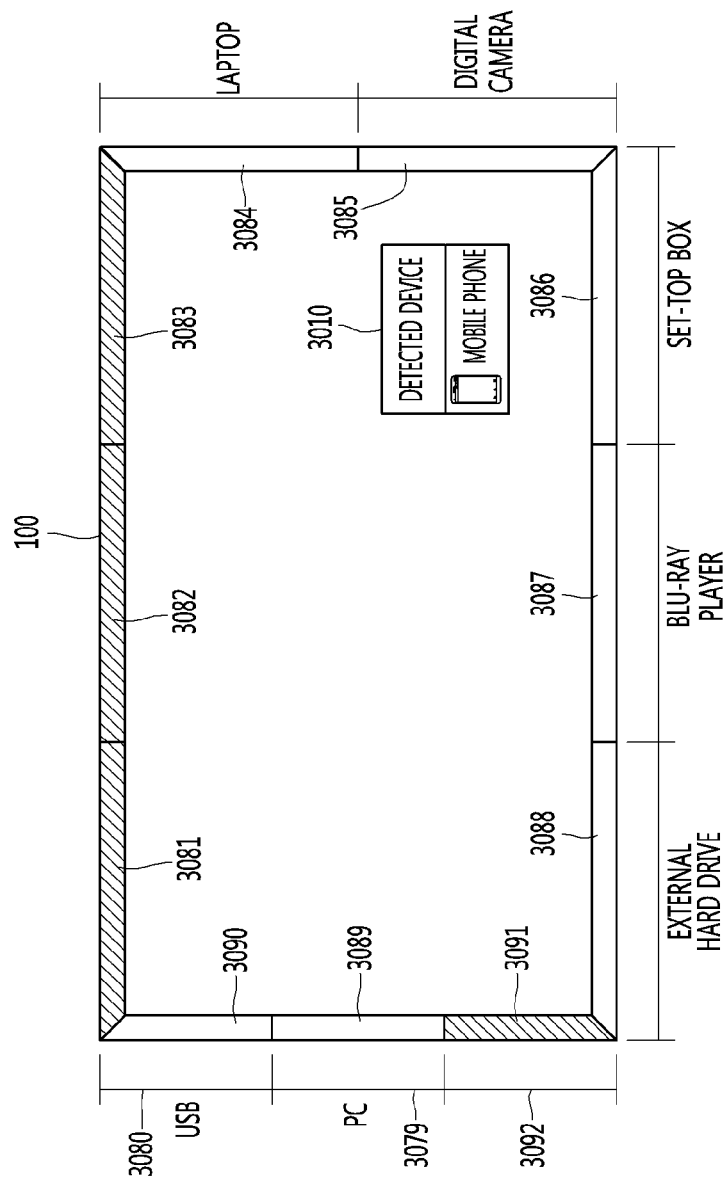

For example, when user input of further adding one to the number of left boundaries of the area of the screen is received, as shown in FIG. 30c, the control unit 170 may add a new boundary 3092, to which an external device may be mapped, to the left boundary of the area of the screen and change the lengths of the existing boundaries 3079 and 3080.

In addition, the control unit 170 may display areas 3089 and 3090 corresponding to the existing boundaries 3079 and 3080 having the changed lengths and an area 3091 corresponding to the newly added boundary 3092.

Figure 30D:
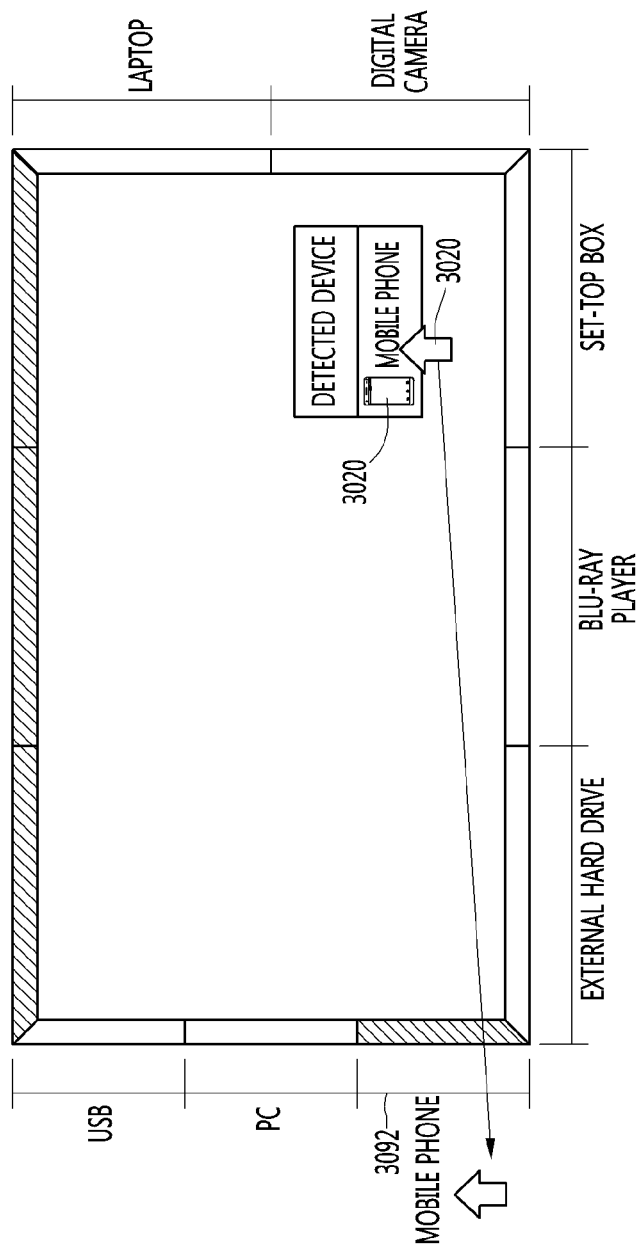

Meanwhile, as shown in FIG. 30d, when user input of selecting the newly detected external device is received and a pointer 3020 is moved to one boundary 3092 among the boundaries, to which the external devices are not mapped, according to motion of the remote control device 200, the control unit 170 may map and store the new external device 580 to the boundary 3092, through which the pointer is moved.

Meanwhile, although the new external device is mapped to one of the plurality of boundaries of the area of the screen in FIG. 30, the present invention is not limited thereto. For example, the new external device may be mapped to one of the plurality of directions, in which the pointer deviates from the area of the screen, and the new external device may be mapped to one of the plurality of boundaries of the area of the screen and one of the plurality of directions, in which the pointer deviates from the screen.

According to the present invention, it is possible to automatically detect the new external device and to provide an area, to which the new external device may be mapped, to the user.

In addition, according to the present invention, it is possible to provide an environment in which the user may flexibly change the mapping area and to provide an environment in which an external may be mapped to suit arrangement of the external devices.

Figure 31:
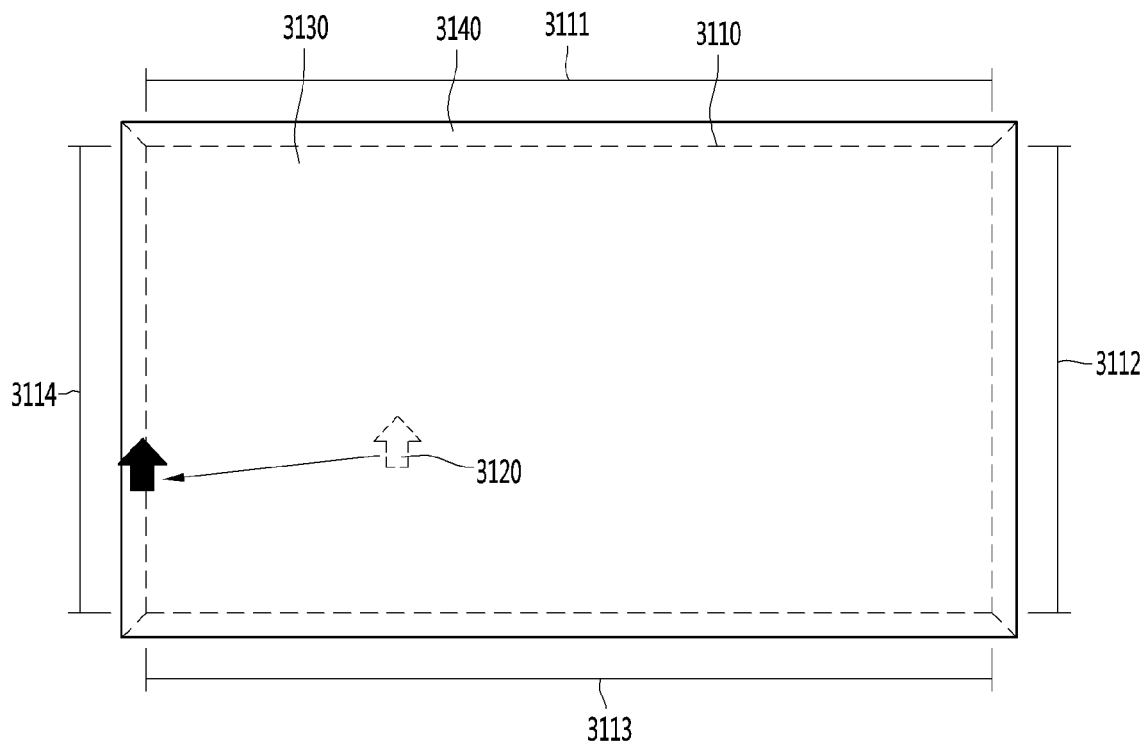
FIG. 31 is a view illustrating a method of operating a display device according to another embodiment of the present invention.

FIG. 31 is a view illustrating a method of operating a display device according to another embodiment of the present invention.

In the above-described embodiments, input provided to the display device is switched to external input when the pointer is moved from the area of the screen to the area outside the screen. The present invention is not limited thereto and input provided to the display device may be switched to external input when the pointer is moved to a specific area of the area of the screen.

Specifically, the area of the screen may include a first area 3130 and a second area 3140 divided by a specific boundary 3110 of the screen.

Here, the specific boundary 3110 of the screen may correspond to the boundary of the area of the screen described with reference to FIGS. 5 to 30.

That is, the whole or part of a specific boundary 3110 of the screen may include a plurality of boundaries, to which external devices may be mapped, and a plurality of external devices may be respectively mapped to the plurality of boundaries. In this case, when a pointer 3120 is moved from the first area 3130 to the second area 3140 according to motion of the remote control device 200 and the pointer 3120 is moved from the first area 3130 to the second area 3140 through a specific point of a specific boundary 3110, the control unit 170 may switch external input to input provided by the external device corresponding to the boundary including the specific point, through which the pointer 3120 passes. For example, when the pointer is moved to the second area 3140 through the left boundary of the first area 3130 and a PC is mapped to the left boundary of the first area 3030, the control unit 170 may switch input provided to the display device 100 to input provided by the PC.

As another example, when a plurality of external devices is mapped to a plurality of directions in which the pointer deviates from the specific boundary 3110 and the pointer 3120 is moved from the first area 3130 to the second area 3140 according to motion of the remote control device 200, the control unit 170 may switch external input to input provided by the external device corresponding to the direction in which the pointer 3120 deviates from the specific boundary 3110.

As another example, when the external device is mapped to the boundary and direction in which the pointer deviates from the specific boundary 3110 and the pointer 3120 is moved from the first area 3130 to the second area 3140 according to motion of the remote control device 200, the control unit 170 may switch external input to input provided by the external device corresponding to the boundary and direction in which the pointer 3120 deviates from the specific boundary 3110.

Figure 32:
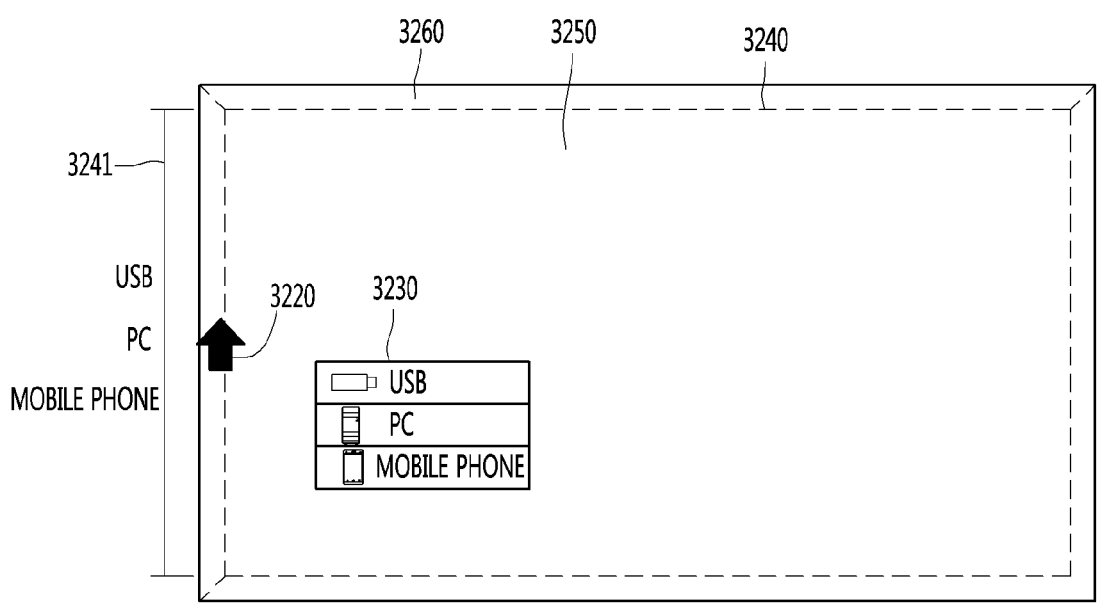
FIG. 32 is a view illustrating an operation method when one boundary corresponds to a plurality of external devices.

FIG. 32 is a view illustrating an operation method when one boundary corresponds to a plurality of external devices.

In the above-described embodiments, one external device is mapped to one boundary. For example, in FIG. 31, only the PC is mapped to the left boundary of the first area 3130.

The present invention is not limited thereto and a plurality of external devices may be mapped to one boundary.

For example, as shown in FIG. 32, if the area of the screen includes a first area 3250 and a second area 3260 divided by a specific boundary 3240 of the screen, a USB, a PC and a mobile phone may be mapped to the left boundary 3241 of the first area 3250.

Meanwhile, when a pointer 3220 is moved from the first rea 3250 to the second area 3260 according to motion of the remote control device 200 and the pointer 3220 is moved through the left boundary 3241 of the first area 3250, the control unit 170 may display a list of external devices (the USB, the PC and the mobile phone) mapped to the left boundary 3241 of the first area 3250.

When input of selecting one of the plurality of external devices (the USB, the PC and the mobile phone) is received, the control unit 170 may switch input provided to the display device to input provided by the external device selected by the user and display an image using input provided by the selected external device.

Figure 33:
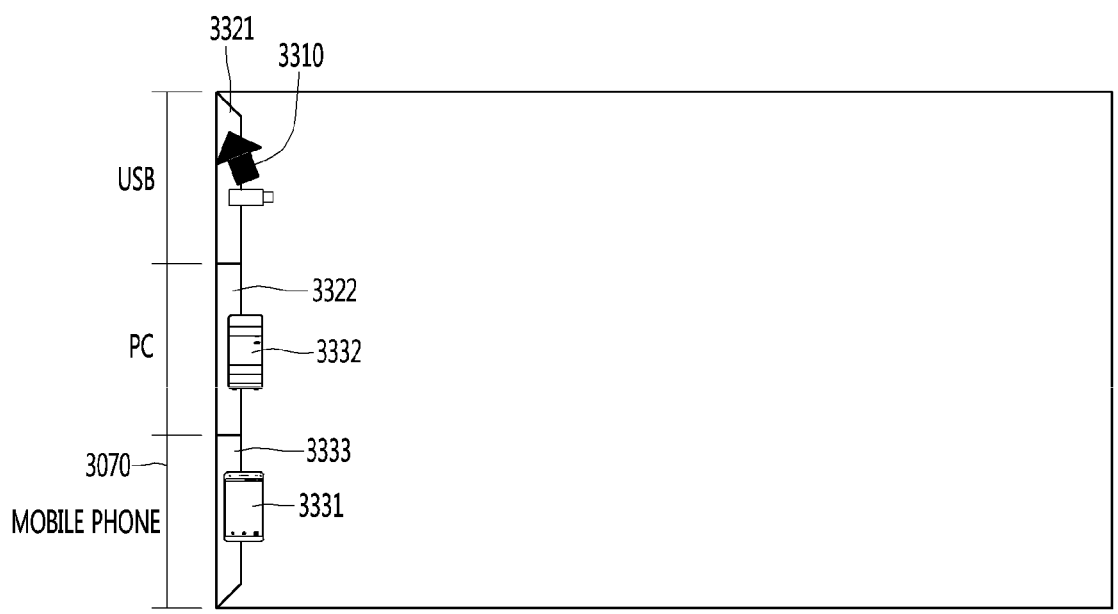
FIG. 33 is a view illustrating a method of operating a display device according to another embodiment of the present invention.

FIG. 33 is a view illustrating a method of operating a display device according to another embodiment of the present invention.

In FIG. 33, the USB, the PC and the mobile phone are mapped to the left boundary of the first area as described with reference to FIG. 32. However, unlike FIG. 32, the left boundary of the first area may include a boundary corresponding to the USB, a boundary corresponding to the PC and a boundary corresponding to the mobile phone.

Meanwhile, as shown in FIG. 32, when the pointer 3220 is moved from the first area 3250 to the second area 3260 according to motion of the remote control device 200 and the pointer 3220 is moved through the left boundary 3241 of the first area 3250, the control unit 170 may display areas 3321, 3322 and 3323 respectively corresponding to the plurality of boundaries included in the left boundary 3241 of the first area 3250 and a plurality of icons 3331, 3332 and 3333 indicating a plurality of devices respectively corresponding to the plurality of boundaries.

Meanwhile, when used input is received a pointer 3310 is moved to the area 3321 corresponding to the USB or the icon 3310 indicating the USB according to motion of the remote control device 200 or user input is received after movement to the icon 3310 indicating the USB in a state in which the areas 3321, 3322 and 3323 respectively corresponding to the plurality of boundaries and a plurality of icons 3331, 3332 and 3333 indicating the plurality of devices are displayed, the control unit 170 may switch input provided to the display device to input provided by the USB and display an image using input provided by the USB.

FIG. 34 is a view illustrating a mapping method of an external device according to another embodiment of the present invention.

Figure 34A:
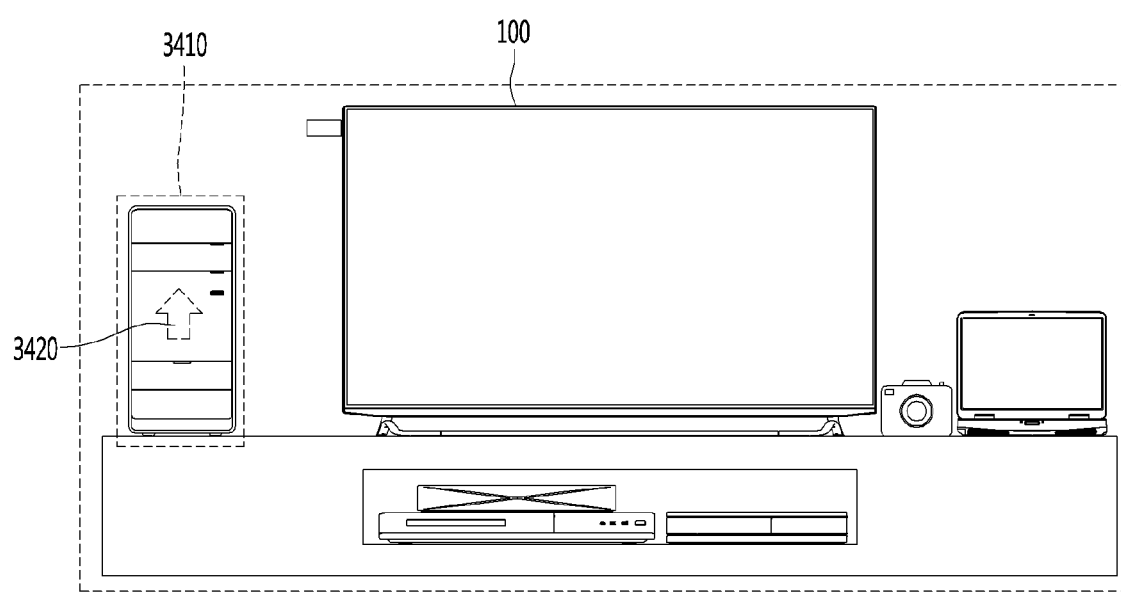
FIGS. 34a to 34b are views illustrating a mapping method of an external device according to another embodiment of the present invention.

In FIG. 34a, the display device 100 may communicate with a plurality of external devices. In addition, the control unit 170 may acquire the locations of the plurality of external devices.

Specifically, the control unit 170 may display a list of external devices which may communicate with the display device 100.

Meanwhile, when input of selecting a specific external device from among a plurality of external devices is received, the control unit 170 may output a command for directing the remote control device to the specific external device selected by the user.

Meanwhile, when the user of the remote control device 200 directs the remote control device 200 to the specific external device according to the command for directing the remote control device 200 to the specific external device, the control unit 170 may acquire information on the location of the specific external device relative to the display device 100.

For example, when a PC is selected from among a plurality of external devices and the remote control device 200 is directed to an area 3410 in which the PC is located, the control unit 170 may calculate the coordinates of a virtual pointer 3420 corresponding to motion of the remote control device and determine that the PC is located at the left side of the display device based on the calculated coordinates of the virtual pointer 3240.

Figure 34B:
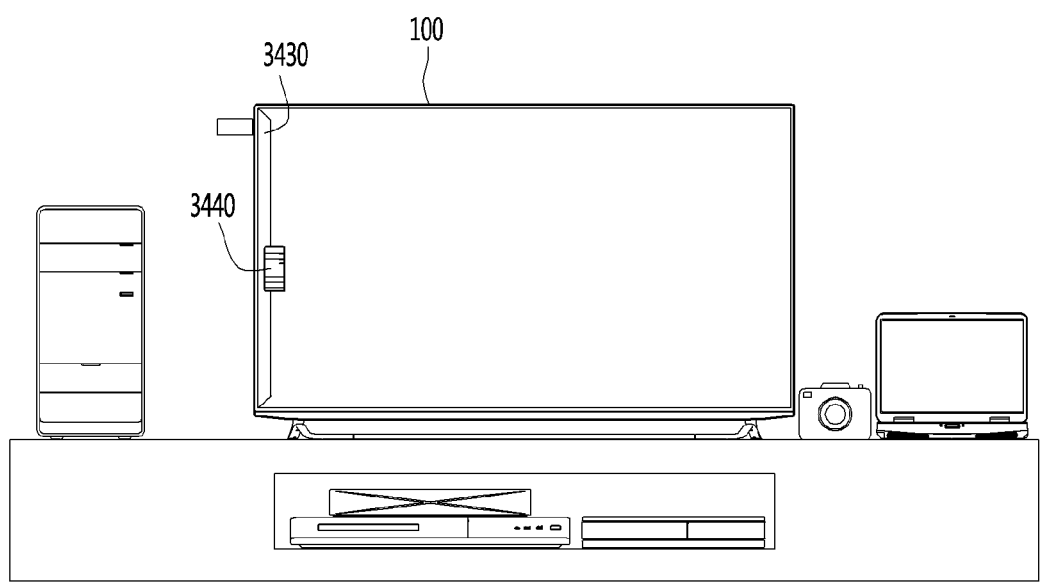

In this case, the control unit 170 may map and store the PC to the left boundary of the screen of the display device. In addition, when input of confirming the mapping state of the external device is received, the control unit 170 may display an area 3430 corresponding to the left boundary, to which the PC is mapped, and an icon 3440 indicating the PC, as shown in FIG. 34b.

Meanwhile, in FIG. 34, the display device determines the location of the external device relative to the display device and maps the external device to the boundary of the area of the screen in the direction in which the external device is located.

The present invention is not limited thereto and the location of the external device is mapped and input provided to the display device may be switched to input provided by the external device when the pointer is moved from the area of the screen to an area in which the external device is located.

This will be described in detail with reference to FIG. 35.

FIG. 35 is a view illustrating a method of mapping the location of an external device and switching input according to movement of a pointer according to another embodiment of the present invention.

As described with reference to FIG. 34, when the user directs the remote control device 200 to the specific external device, the control unit 170 may acquire information on the location of the specific external device relative to the display device 100. For example, when a PC is selected from among the plurality of external devices and the remote control device 200 is directed to an area in which the PC is located, the control unit 170 may calculate the coordinates of a virtual pointer corresponding to motion of the remote control device and acquire the coordinates of the area, in which the PC is located, based on the calculated coordinates of the virtual pointer.

Figure 35A:
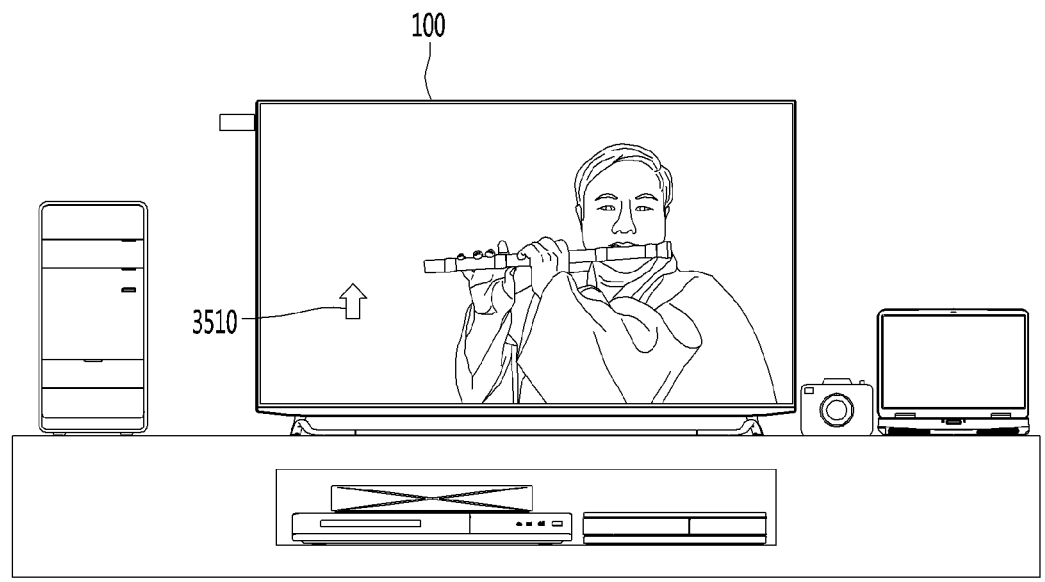
FIGS. 35a to 35c are views illustrating a method of mapping the location of an external device and switching input according to movement of a pointer according to another embodiment of the present invention.

Meanwhile, in FIG. 35*a*, broadcast content is currently displayed and a pointer 3510 is displayed.

Meanwhile, the coordinates of the pointer may be changed according to motion of the remote control device 200. That is, when the remote control device 200 is moved from the area of the screen to the area outside the screen, the control unit 170 may acquire the coordinates of a virtual pointer 3520 corresponding to motion of the remote control device 200.

Figure 35B:
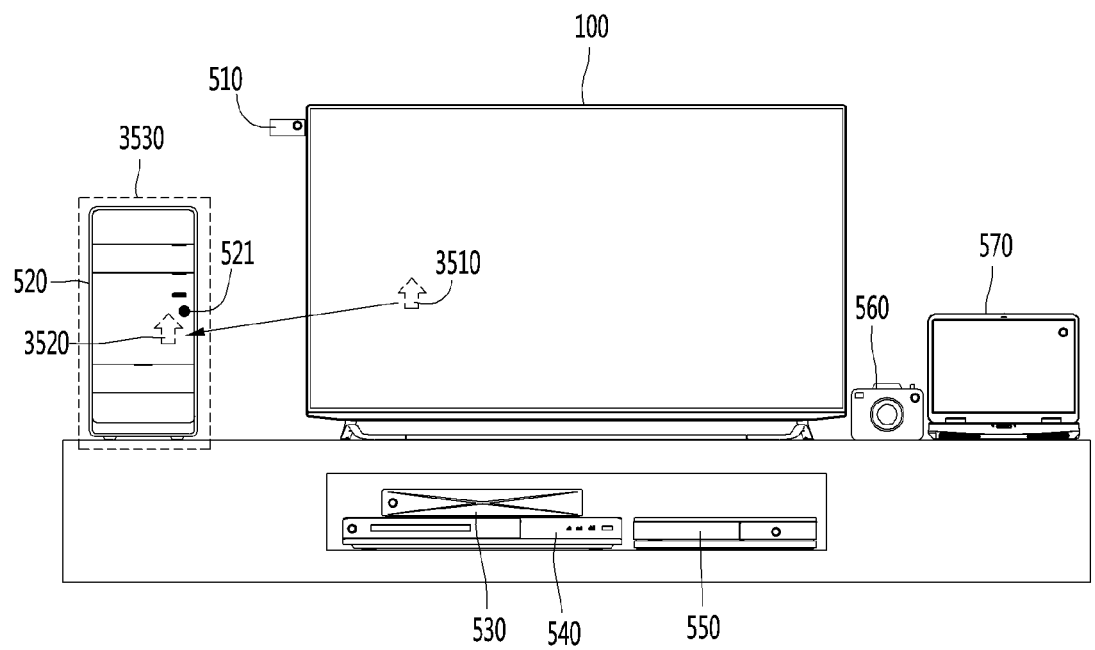

Meanwhile, in FIG. 35*b*, the control unit 170 may determine whether the coordinates of the virtual pointer 3520 coincide with the coordinates of the area 3530 in which the PC 520 is located.

When the coordinates of the virtual pointer 3520 coincide with the coordinates of the area 3530 in which the PC 520 is located, the control unit 170 may output a light output command to the PC 520. In this case, the control unit of the PC 520, which has received the light output command, may control the light output unit 521 to output a light signal.

Figure 35C:
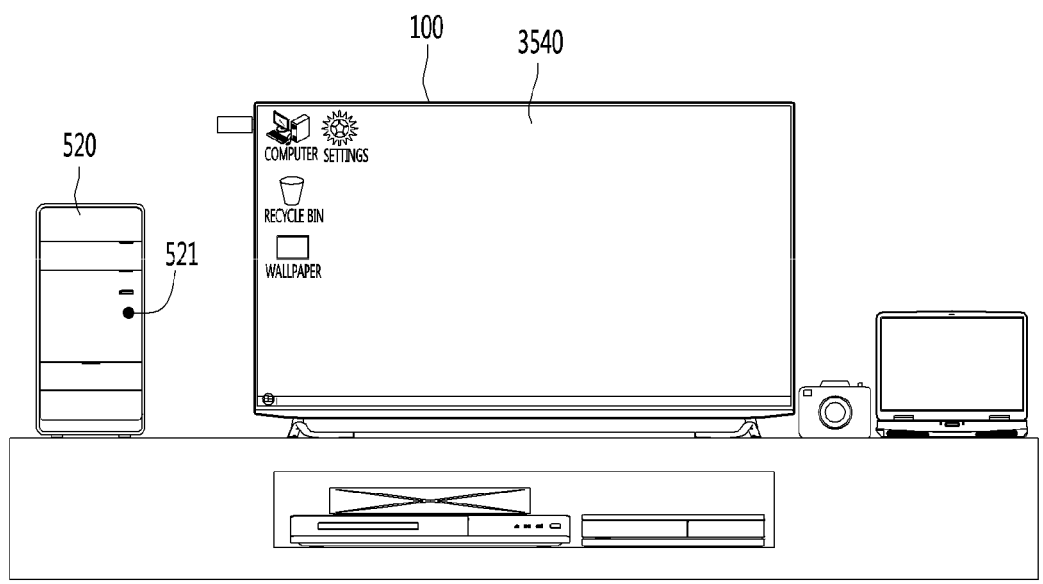

Meanwhile, when user input is received in a state in which the coordinates of the virtual pointer 3520 coincide with the coordinates of the area 3530 in which the PC 520 is located, the control unit 170 may switch input provided to the display device 100 to input provided by the PC and display an image using input provided by the PC, as shown in FIG. 35C.

Figure 36:
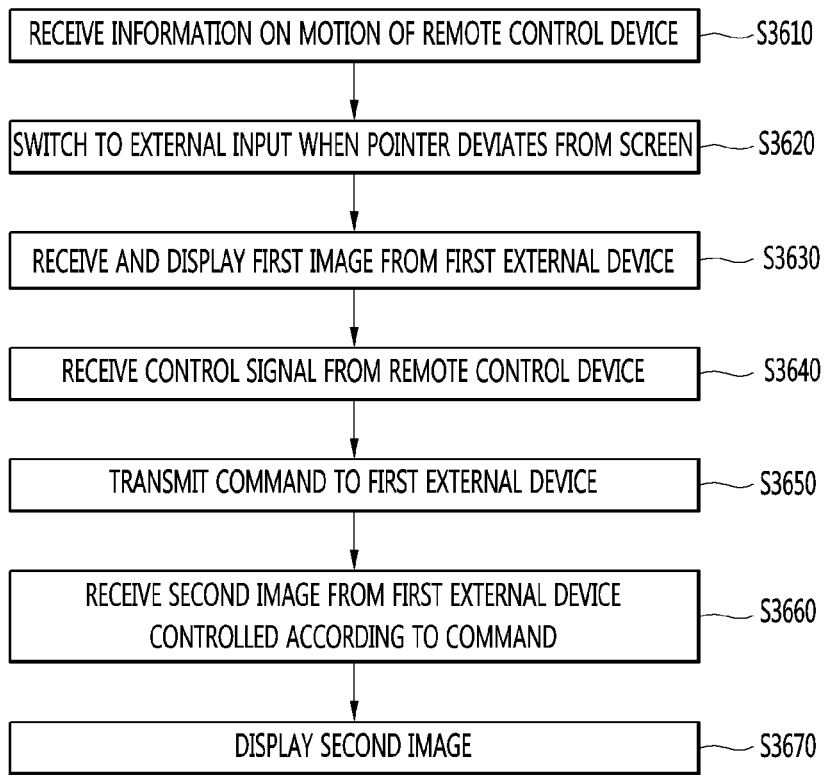
FIG. 36 is a view illustrating a method of operating a display device according to another embodiment of the present invention.

FIG. 36 is a flowchart illustrating a method of operating a display device according to another embodiment of the present invention.

In FIG. 36, the method of operating the display device according to the embodiment of the present invention may include step S3610 of receiving a first control signal including information on motion of the remote control device from the remote control device, step S3620 of switching input provided to the display device to external input when the pointer moved in correspondence with motion of the remote control device is moved from the area of the screen to the area outside the screen, step S3630 of receiving a first image from a first external device for providing input to the display device when input is switched and displaying the first image, step S3640 of receiving a second control signal from the remote control device, step S3650 of transmitting a command to the first external device based on the second control signal, step S3660 of receiving a second image from the first external device controlled according to the command and step S3670 of displaying the second image.

The method described with reference to FIGS. 2 to 35 is equally applied to step S3610 of receiving the first control signal including information on motion of the remote control device from the remote control device and step S3620 of switching input provided to the display device to external input when the pointer moved in correspondence with motion of the remote control device is moved from the area of the screen to the area outside the screen may use, a detailed description of which will be omitted.

Meanwhile, the method of operating the display device according to another embodiment of the present invention is divided into three embodiments and each step described with reference to FIG. 36 will be described.

Figure 48:
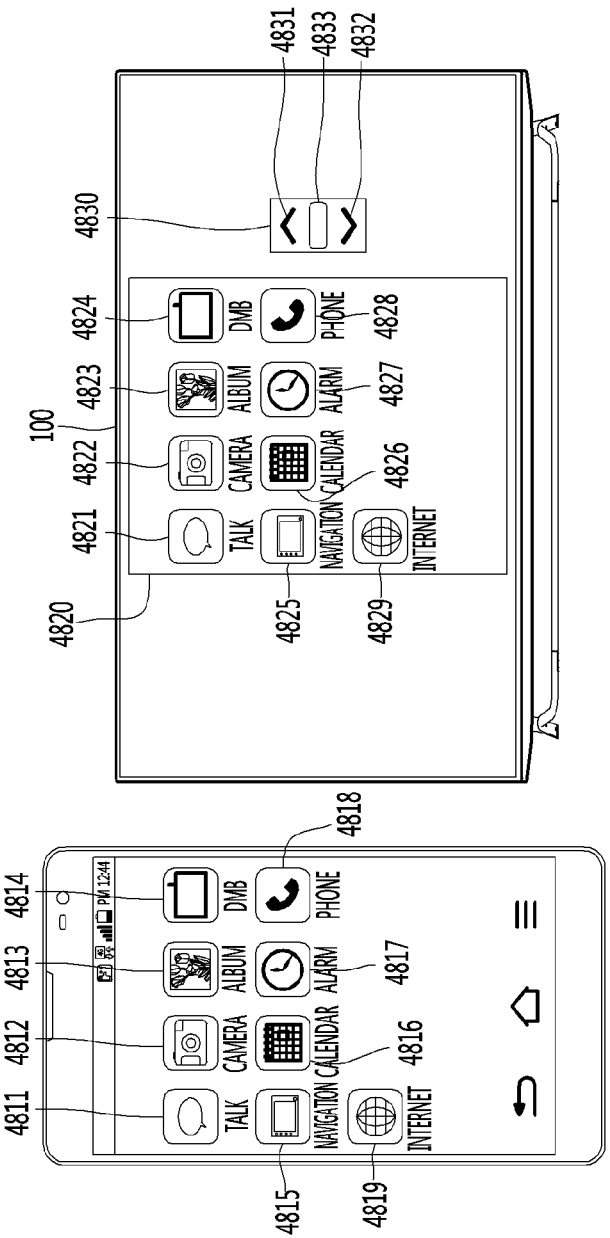
FIG. 48 is a view illustrating operation when a third external device for providing input to a display device 100 is a mobile phone.
Figure 49:
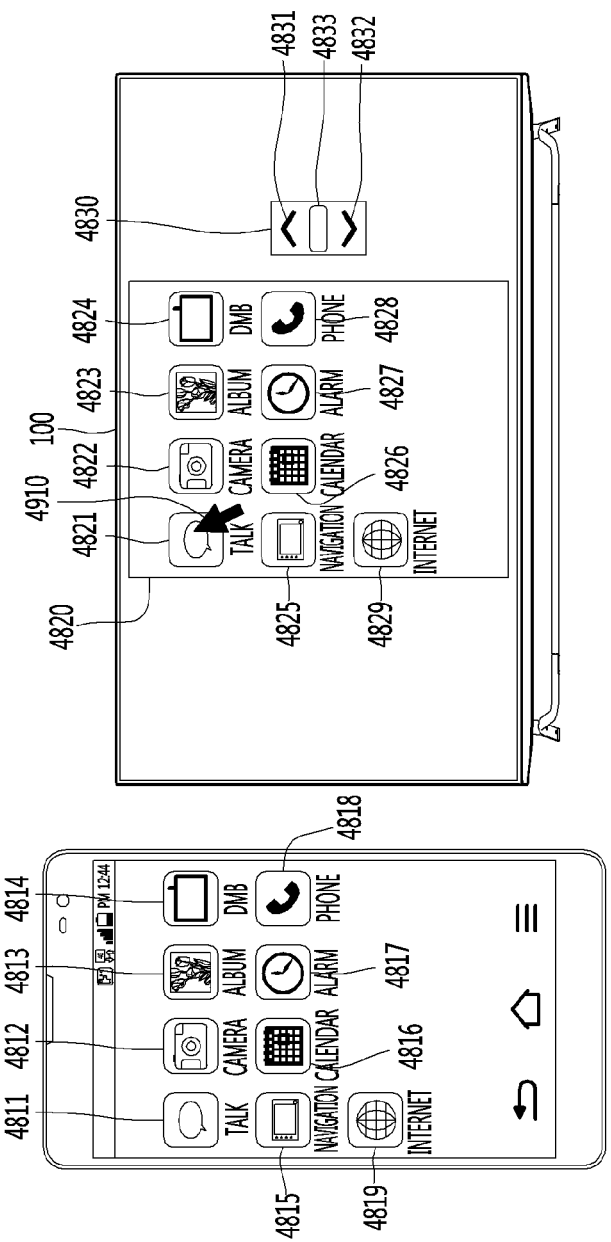
FIG. 49 is a view illustrating a method of receiving user input of selecting a specific area on a screen of a display device.
Figure 50:
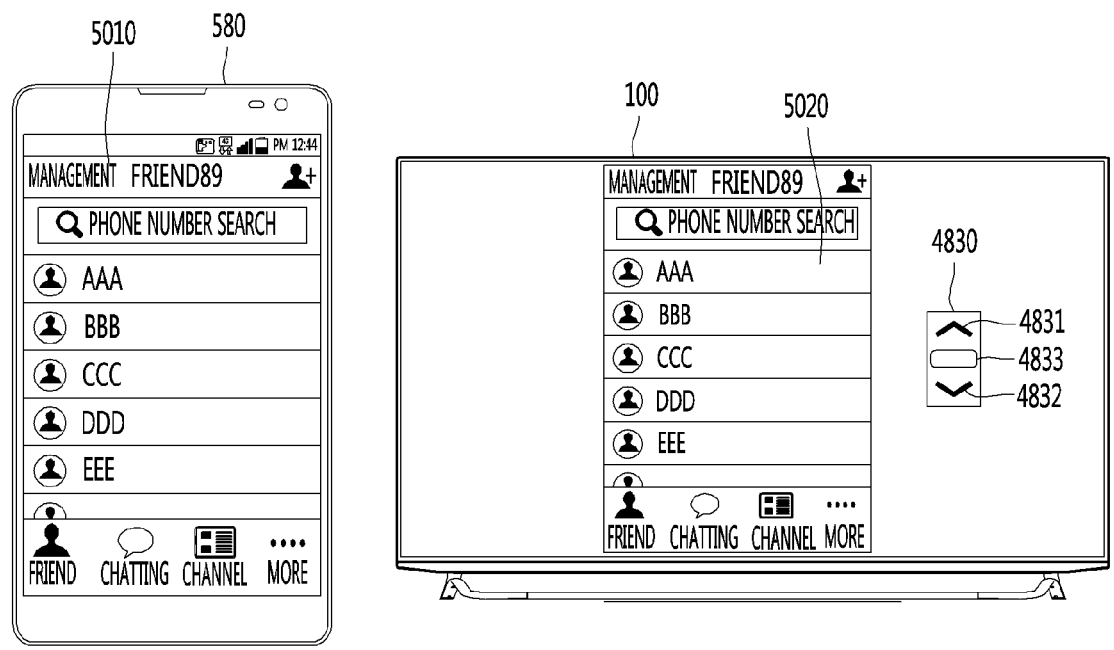
FIG. 50 is a view showing a third external device 580, which has received a command, and a display device.

Specifically, FIGS. 37 to 45 show an embodiment in which an external device is controlled by displaying a pointer corresponding to a remote control device on the display unit of the external device when the display unit is installed in the external device for providing input to the display device 100 and FIGS. 46 to 47 show an embodiment in which an external device is controlled when a display unit is not installed in the external device for providing input to the display device 100. In addition, FIGS. 48 to 50 show an embodiment in which an external device is controlled using an image displayed on the display device 100 when a display unit is installed in the external device.

First, the embodiment of FIGS. 37 to 45, that is, the embodiment in which the external device is controlled by displaying the pointer corresponding to the remote control device on the display unit of the external device when the display unit is installed in the external device for providing input to the display device 100, will be described.

Figure 37:
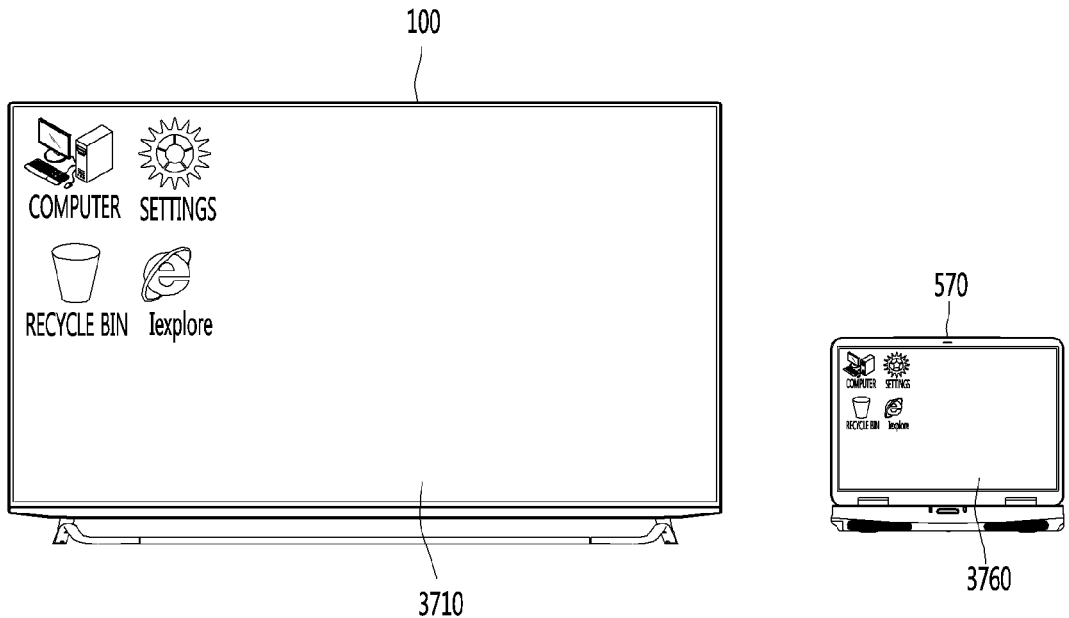
FIG. 37 is a view illustrating a method of receiving and displaying an image from an external device for providing input to a display device according to an embodiment of the present invention.

FIG. 37 is a view illustrating a method of receiving and displaying an image from an external device for providing input to a display device according to an embodiment of the present invention.

The method of operating the display device according to the embodiment of the present invention may include step S3630 of receiving a first image from a first external device for providing input to the display device when input is switched, and displaying the first image.

Specifically, when the pointer is moved from the area of the screen to the area outside the screen, input may be switched to input provided by an external device corresponding to a direction in which the pointer deviates from the area of the screen, an external device corresponding to a boundary, through which the pointer deviates from the area of the screen, or a boundary and direction in which the pointer deviates from the area of the screen. If the external device is a first external device, the control unit 170 may switch input provided to the display device 100 to input provided by the first external device 570 among the plurality of external devices communicating with the display device.

Here, assume that the first external device is a laptop.

In this case, the control unit 170 may receive an image from the first external device 570 and control the display unit 180 to display the received image 3710.

Here, the image received from the first external device 570 may be an image 3760 displayed on the screen of the first external device 570. That is, the image 3710 displayed on the display device 100 may be equal to the image 3760 displayed on the first external device.

Figure 38:
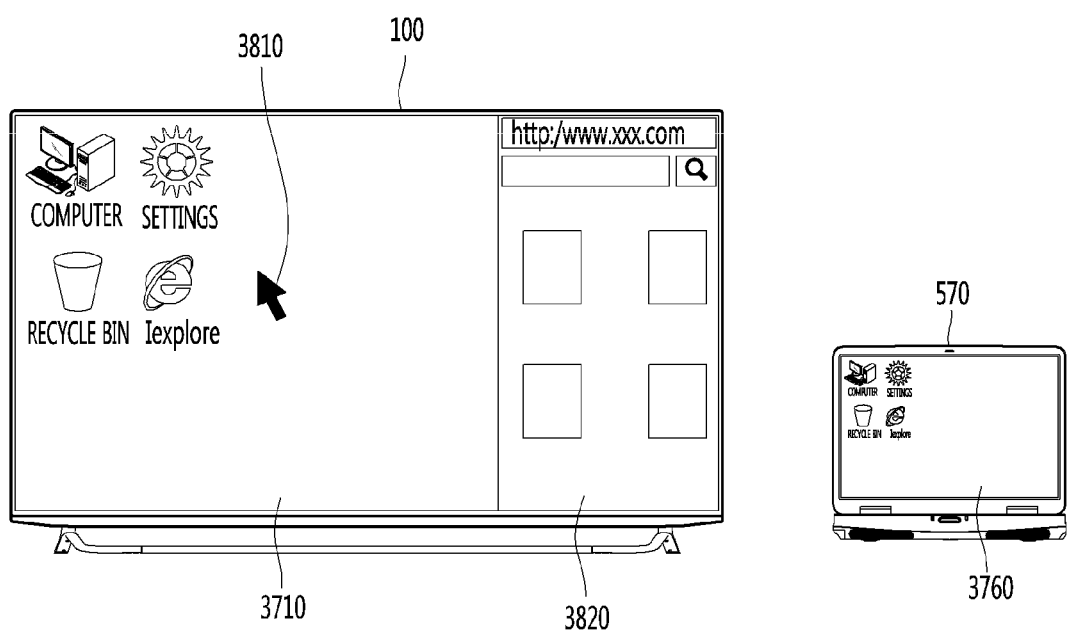
FIG. 38 is a view illustrating a method of displaying an image received from an external device and a pointer or another image.

FIG. 38 is a view illustrating a method of displaying an image received from an external device and a pointer or another image.

As shown in FIG. 38, the control unit 170 may control the display unit 180 to display a pointer 3810 along with the image 3710 received from the first external device 570. Here, the pointer 3810 may be moved in correspondence with motion of the remote control device 200.

In addition, the control unit 170 may display another image 3820 along with the image 3710 received from the first external device 570.

The other image 3820 may be an image received from a server, such as a web browser image, as shown in FIG. 38*a*.

The present invention is not limited thereto and the other image 3820 may include all images such as broadcast content received through the tuner 131, an image received from another external device and an OSD menu generated by the display device 100.

Returning to FIG. 36, the method of operating the display device according to the embodiment of the present invention may include step S3640 of receiving the second control signal from the remote control device and step S3650 of transmitting the command to the first external device based on the second control signal. This will be described in detail with reference to FIGS. 39 and 40.

FIGS. 39a to 39d are views illustrating a method of receiving the second control signal from the remote control device and transmitting the command to the first external device based on the second control signal according to an embodiment of the present invention.

In FIG. 39a, the control unit 170 may receive a control signal from the remote control device 200. Here, the control signal received from the remote control device 200 may include information on motion of the remote control device 200.

In this case, the control unit 170 may display a pointer 3810 moved in correspondence with motion of the remote control device 200. For example, when the remote control device 200 is moved in a state of displaying the pointer 3810 as shown in FIG. 39a, the pointer 3810 may be moved and displayed in correspondence with motion of the remote control device 200 as shown in FIG. 39b.

Meanwhile, the control unit 170 may determine whether the pointer is moved from the area of the screen to the area outside the screen based on information on motion of the remote control device 200.

Figure 39C:
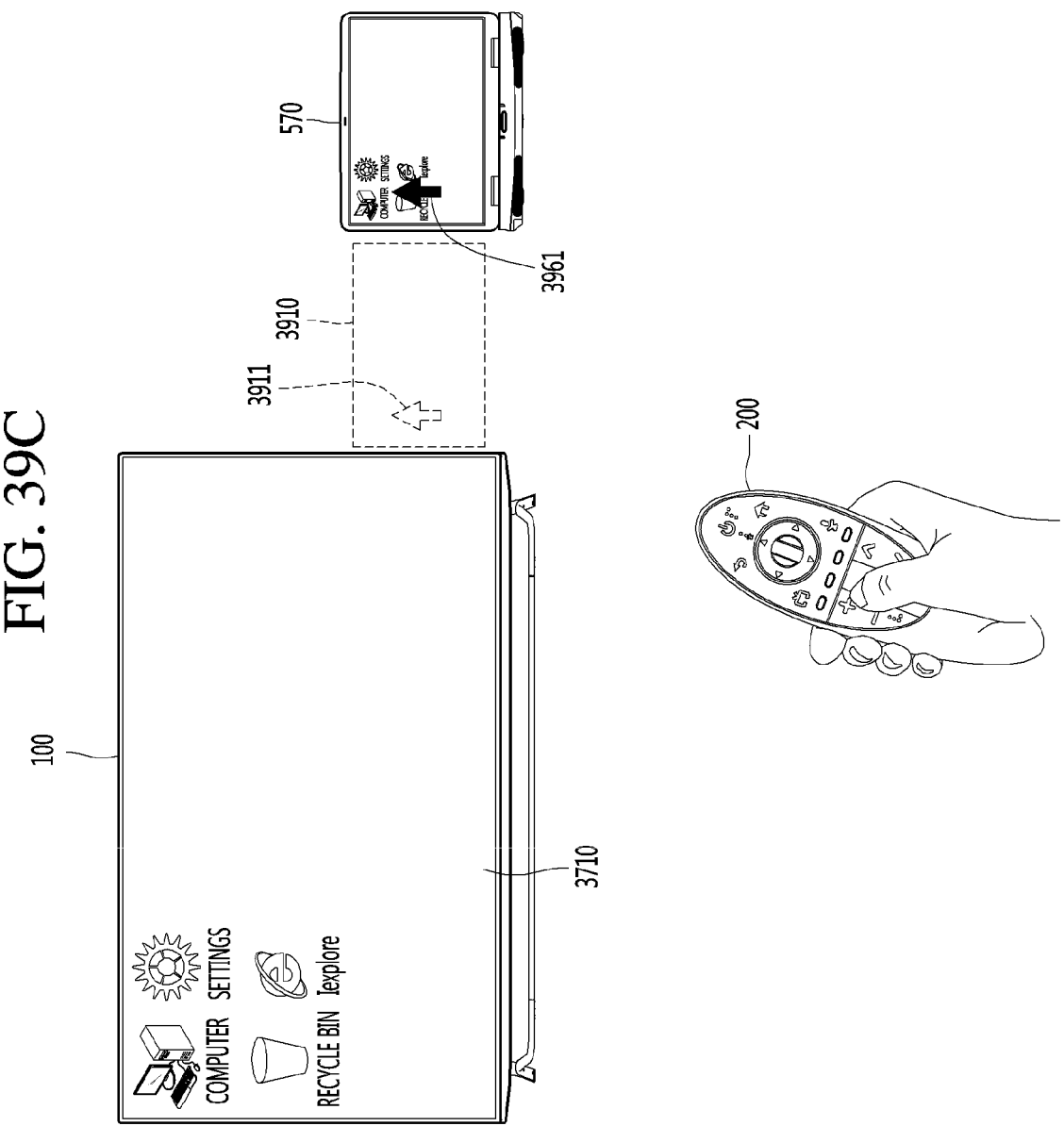

In addition, when the pointer is moved from the area of the screen to the area outside the screen, the control unit 170 may acquire the coordinates of a pointer 3911 in an area 3910 corresponding to the screen of the first external device 570, as shown in FIG. 39c. Here, the pointer 3911 moved to the area outside the screen does not mean the pointer displayed on the screen but means a virtual pointer.

In addition, the control unit 170 may transmit a command to the first external device 570. Specifically, the control unit 170 may transmit the coordinates of the pointer 3911 in the area 3910 corresponding to the screen of the first external device 570 to the first external device 570. In addition, the control unit 170 may transmit, to the first external device 570, a command for displaying a pointer at the coordinates on the screen of the first external device 570 corresponding to the coordinates of the pointer 3911 in the area 3910 corresponding to the screen of the first external device 570.

Meanwhile, when the command for displaying the pointer on the screen of the first external device 570 and the coordinates of the pointer 3911 in the area 3910 corresponding to the screen of the first external device 570 are received, the control unit of the first external device 570 may display a pointer 3961 based on the coordinates of the pointer 3911 in the area 3910 corresponding to the screen of the first external device 570.

Here, the location of the pointer 391 in the area 3910 corresponding to the screen of the first external device 570 may correspond to the location of the pointer 3961 on the screen of the first external device 570. For example, if the coordinates of the pointer 3911 in the area 3910 corresponding to the screen of the first external device 570 are (x, y)=(30, 270), the coordinates of the pointer 3961 displayed on the screen of the first external device 570 may be equally (x, y)=(30, 270).

Figure 39D:
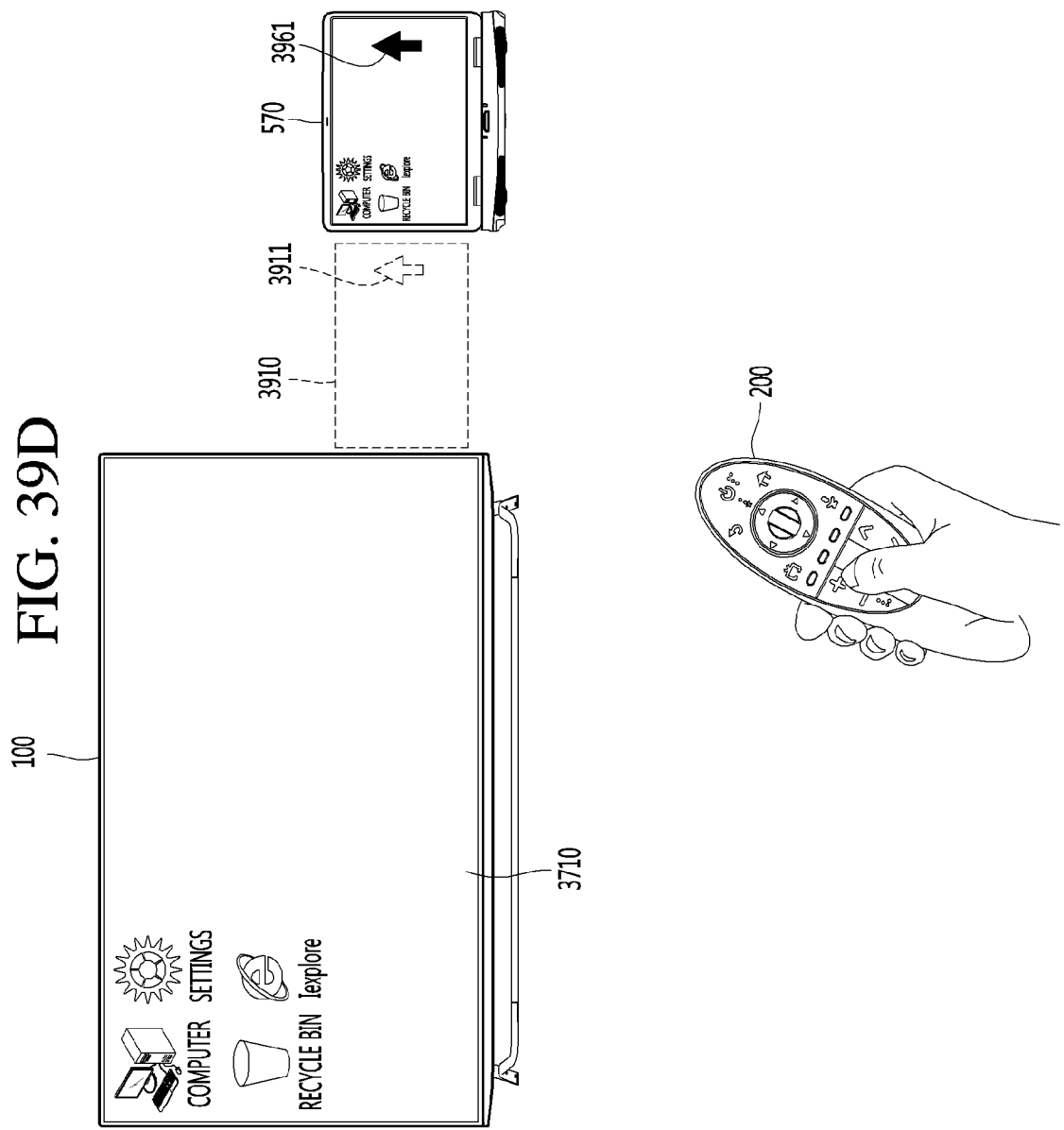

In addition, as shown in FIG. 39d, when the pointer 3911 in the area 3910 corresponding to the screen of the first external device 570 is moved, the control unit 170 of the display device 100 may transmit the changed coordinates of the pointer 3911 in the area 3910 corresponding to the screen of the first external device 570 to the first external device 570.

In this case, the first external device 570 may display the pointer 3961 at a location corresponding to the location of the pointer 3911 in the area 3910 corresponding to the screen of the first external device 570.

For example, if the coordinates of the pointer 3911 in the area 3910 corresponding to the screen of the first external device 570 are (x, y)=(690, 270), the coordinates of the pointer 3961 displayed on the screen of the first external device 570 may be equally (x, y)=(690, 270).

FIGS. 40a to 40e are views illustrating an area corresponding to a screen of a first external device according to various embodiments of the present invention.

Figure 40A:
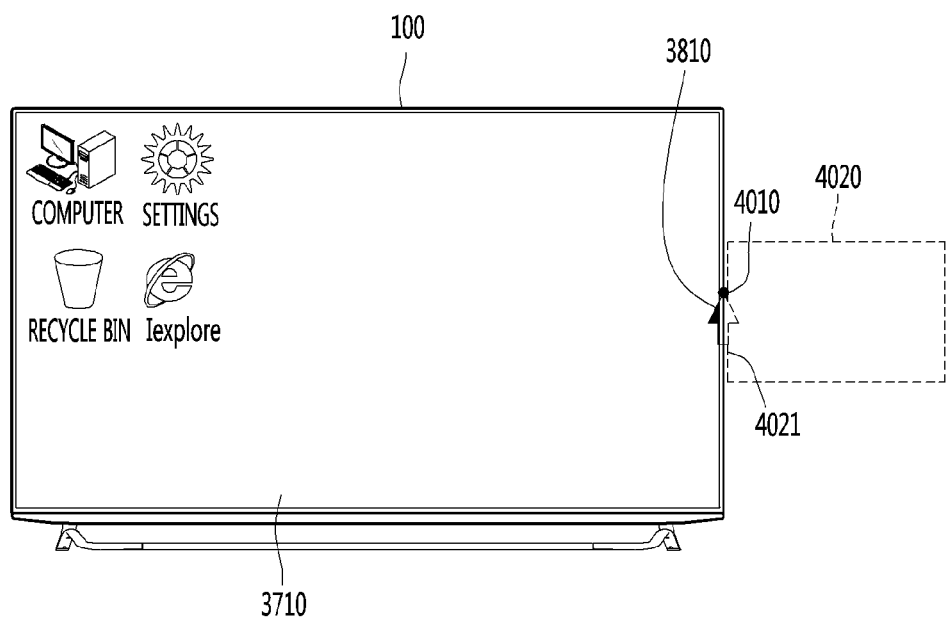
FIGS. 40a to 40e are views illustrating an area corresponding to a screen of a first external device according to various embodiments of the present invention.

In FIG. 40a, the area corresponding to the screen of the first external device 570 may be an area having a point, through which the pointer deviates from the screen, as the center of one side thereof. For example, when the pointer 8310 deviates from the screen through a specific point 4010, the center of one side 4021 of the area 4020 corresponding to the screen of the first external device 570 may be a specific point 4010, through which the pointer 8310 deviates from the screen. In addition, the width of the area 4020 corresponding to the screen of the first external device 570 may be equal to that of the screen of the first external device 570, and the height of the area 4020 corresponding to the screen of the first external device 570 may be equal to that of the screen of the first external device 570.

In addition, although one side 4021 of the area 4020 corresponding to the screen of the first external device 570 is described as being in contact with the display device 100 in the present embodiment, the present invention is not limited thereto. For example, the center of one side 4021 of the area 4020 corresponding to the screen of the first external device 570 may be located at a point deviating from the specific point 4010, through which the pointer 8310 deviates from the screen, by a specific distance in a direction horizontal to the ground.

Figure 40B:
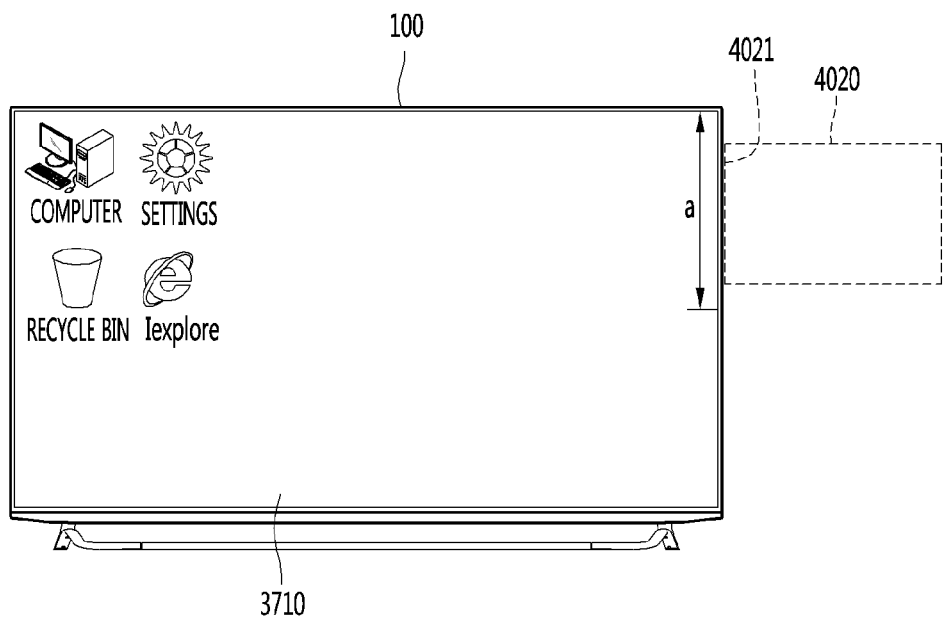

In FIG. 40b, the area corresponding to the screen of the first external device 570 may be formed at a location corresponding to the boundary, to which the first external device 570 is mapped. For example, if the first external device 570 corresponds to a boundary a of a plurality of boundaries of the area of the screen (that is, if the first external device 570 is mapped to the boundary a), the area 4020 corresponding to the screen of the first external device 570 may be located in an area deviating from the boundary a by a specific distance in a direction horizontal to the ground. The present invention is not limited thereto and, as shown in FIG. 40b, the area 4020 corresponding to the screen of the first external device 570 may be formed such that one side 4021 of the area 4020 corresponding to the screen of the first external device 570 is in contact with the boundary a.

Figure 40C:
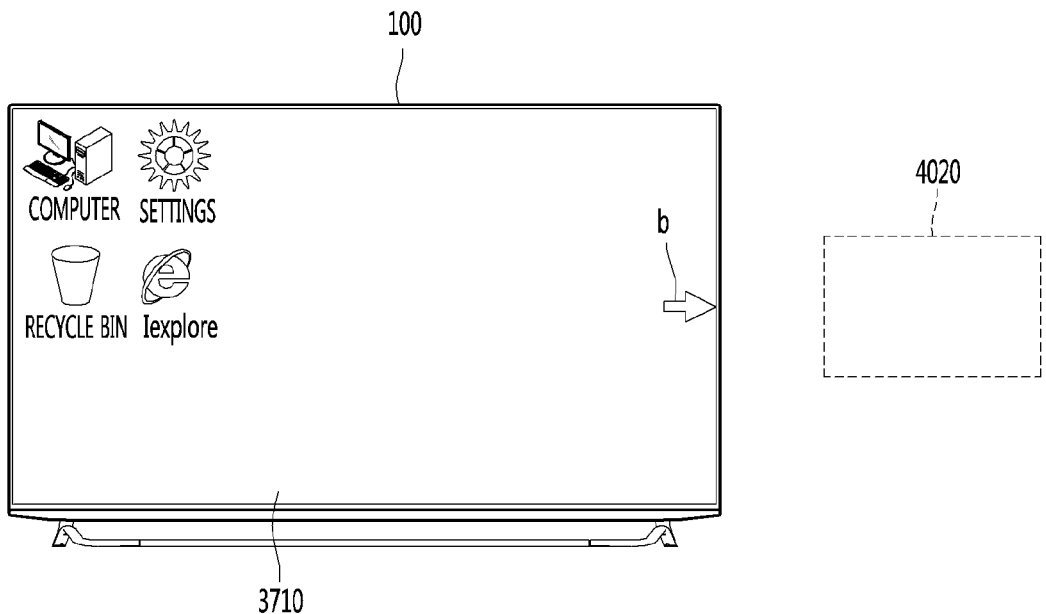

In FIG. 40c, if the first external device 570 corresponds to a specific direction of a plurality of direction in which the pointer deviates from the area of the screen (that is, if the first external device 570 is mapped to a specific direction), the area corresponding to the screen of the first external device 570 may be located in a specific direction from the display device 100. For example, if the first external device 570 is mapped to a direction b among the plurality of directions in which the pointer deviates from the area of the screen, the area 4020 corresponding to the screen of the first external device 570 may be located in the direction b of the display device 100.

Figure 40D:
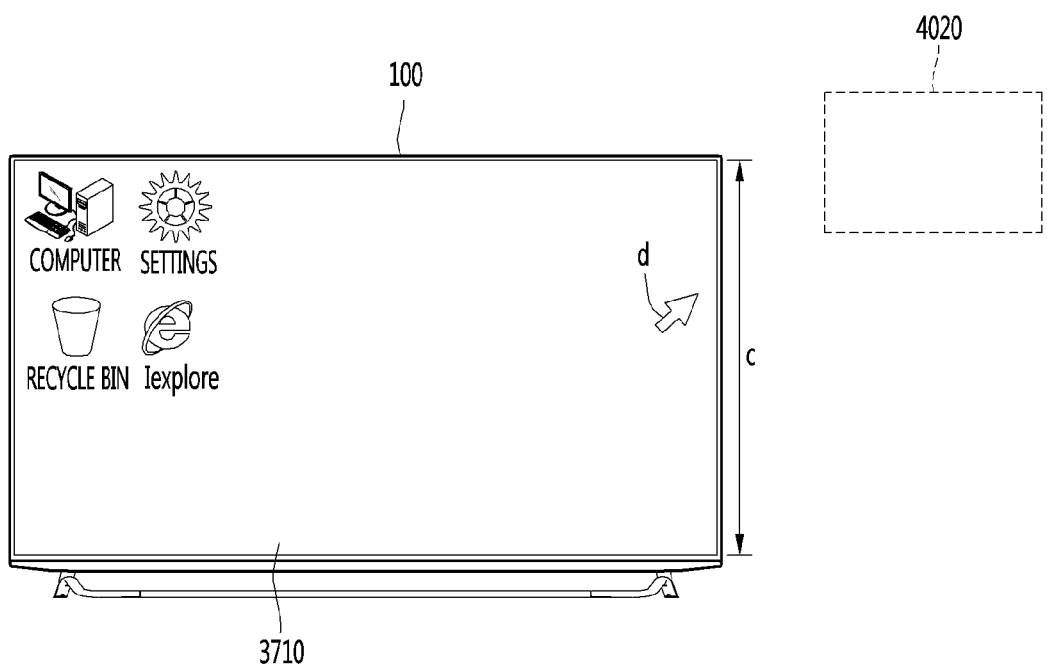

In FIG. 40d, if the first external device 570 corresponds to a specific boundary of the plurality of the boundaries of the screen and a specific direction of the plurality of directions in which the pointer deviates from the screen (that is, if the first external device 570 is mapped to the specific boundary and the specific direction), the area corresponding to the screen of the first external device 570 may be located at the specific boundary in the specific direction. For example, if the first external device 570 is mapped to a boundary c and a direction d, the area 4020 corresponding to the screen of the first external device 570 may be formed at a location corresponding to the boundary c in a direction corresponding to the direction d.

Meanwhile, in FIG. 34, the method of acquiring the coordinates of the specific external device by directing the remote control device 200 to the specific external device was described.

Figure 40E:
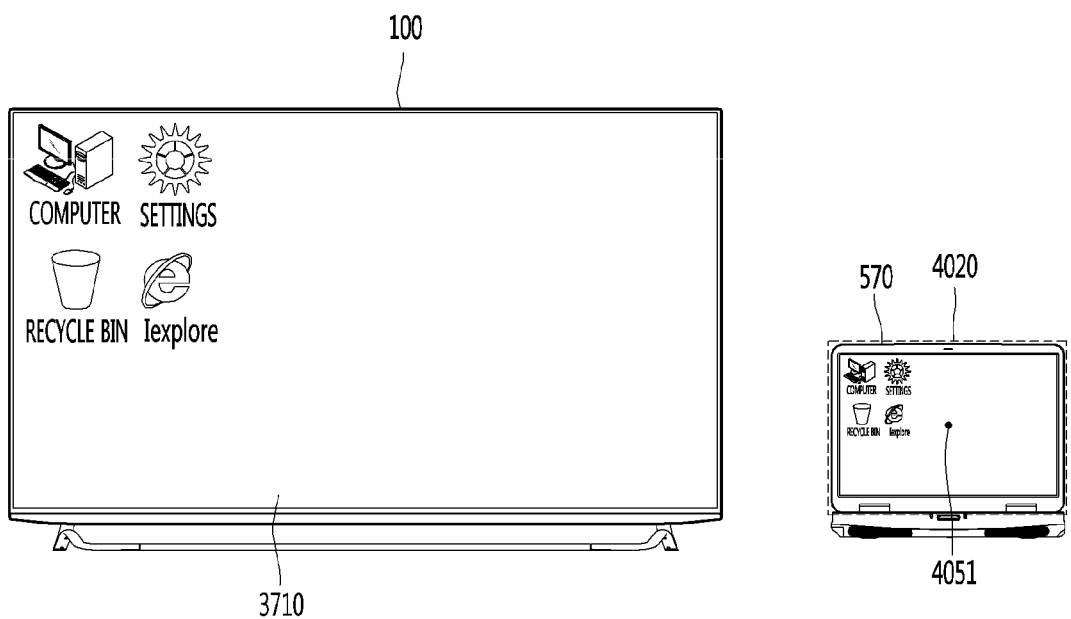

In this case, as shown in FIG. 40e, the area corresponding to the screen of the first external device 570 may be an area centered on the coordinates of the first external device 570.

For example, when the coordinates of the specific external device are acquired by directing the pointer of the remote control device 200 to a specific point 4051, the area 4020 corresponding to the screen of the first external device 570 may be an area centered on the specific point 4051.

Meanwhile, in addition to the description of FIGS. 40a to 40e, the area corresponding to the screen of the first external device may be formed in an arbitrary area among the areas outside the screen of the display device 100.

Meanwhile, as shown in FIGS. 40a to 40e, the size of the area corresponding to the screen of the first external device 570 may be equal to that of the screen of the first external device 570.

Specifically, the control unit 170 may receive information on the size of the screen of the first external device 570 from the first external device 570.

In addition, based on the information on the size of the screen of the first external device 570, the control unit 170 may set the area corresponding to the first external device 570 having the same size (that is, the same width and the same height) as the screen of the first external device 570.

Meanwhile, although the size of the area corresponding to the screen of the first external device 570 is described as being equal to that of the screen of the first external device 570, the present invention is not limited thereto. This will be described in detail with reference to FIG. 41.

Figure 41:
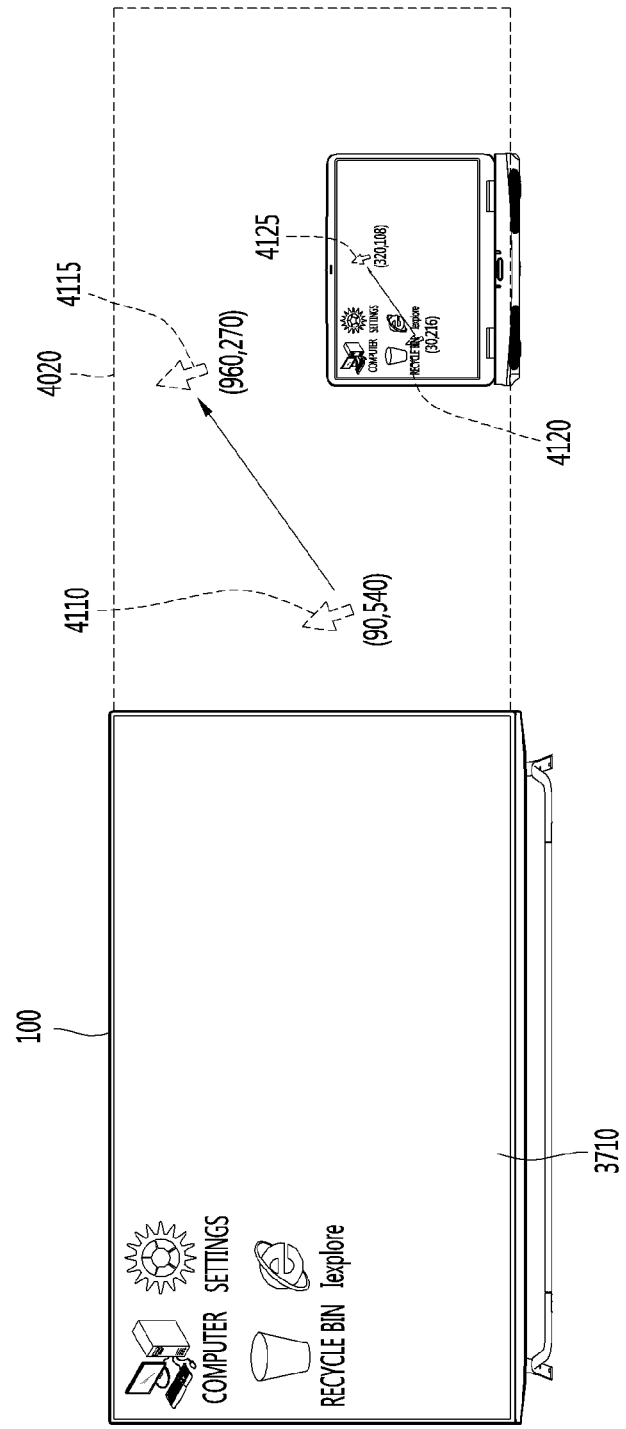
FIG. 41 is a view illustrating an area corresponding to a screen of a first external device and a coordinate transformation method.

FIG. 41 is a view illustrating an area corresponding to a screen of a first external device and a coordinate transformation method.

The size of the area corresponding to the screen of the first external device 570 may be different from that of the screen of the first external device 570. For example, as shown in FIG. 41, the size of the area 4020 corresponding to the screen of the first external device 570 may be equal to that of the screen of the display device 100.

Meanwhile, the control unit 170 may receive information on the size of the screen of the first external device 570 from the first external device 570.

Specifically, the control unit 170 may receive the information on the size of the screen of the first external device 570, when the display device 100 and the first external device 570 are connected.

Meanwhile, the control unit 170 may transform the coordinates of the pointer in the area 4020 corresponding to the screen of the first external device 570 into the coordinates of the pointer on the screen of the first external device 570, based on the information on the size of the screen of the first external device 570.

Specifically, as shown in FIG. 41, if the size of the area 4020 corresponding to the screen of the first external device 570 is equal to the size of the screen of the display device 100, the control unit 170 may transform the coordinates of the pointer in the area 4020 corresponding to the screen of the first external device 570 into the coordinates of the pointer on the screen of the first external device 570, based on the size of the screen of the display device 100 and the size of the screen of the first external device 570.

For example, assume that the width of the screen of the display device 100 is three times the width of the screen of the first external device 570 and the height of the screen of the display device 100 is 2.5 times the height of the screen of the first external device 570.

In this case, if the coordinates of the pointer 4110 in the area 4020 corresponding to the screen of the first external device 570 are (x, y)=(90, 540), the control unit 170 may transform the x coordinate in the area 4020 corresponding to the screen of the first external device 570 into the x coordinate of the screen of the first external device 570 using a ratio of the width of the screen of the first display device 100 to the width of the screen of the first external device 570 and transform the y coordinate in the area 4020 corresponding to the screen of the first external device 570 into they coordinate of the screen of the first external device 570 using a ratio of the height of the screen of the first display device 100 to the height of the screen of the first external device 570.

Therefore, the control unit 170 may acquire the transformed coordinates (x, y)=(90, 540) and transmit the transformed coordinates to first external device 570, and the first external device 570, which has received the transformed coordinates, may display a pointer 4120 at a point corresponding to the transformed coordinates.

In addition, when the pointer 4110 in the area 4020 corresponding to the screen of the first external device 570 is moved such that the coordinates of a new pointer 4115 are (x, y)=(960, 270), the control unit 170 may acquire and transmit the transformed coordinates (x, y)=(320, 108) to the first external device 570, and the first external device 570 may display a new pointer 4125 at a point corresponding to the transformed coordinates.

Meanwhile, although the coordinates are described as being transformed based on the size of the screen of the display device 100 and the size of the screen of the first external device 570 in the present embodiment, the present invention is not limited thereto.

Specifically, when the display device 100 and the first external device 570 are connected, the control unit 170 may receive information on resolution of the display unit of the first external device 570 from the first external device 570.

Alternatively, the control unit 170 may acquire information on the resolution of the first external device 570 based on the resolution of the image received from the first external device 570 when the image is received from the first external device 570.

In this case, the control unit 170 may transform the coordinates of the pointer in the area 4020 corresponding to the screen of the first external device 570 into the coordinates of the pointer on the screen of the first external device 570 based on the resolution of the display unit 180 of the display device 100 and the resolution of the display unit of the first external device 570. This transformation method is equal to the transformation method using the size of the screen and a detailed description thereof will be omitted.

Meanwhile, although the size of the area 4020 corresponding to the screen of the first external device 570 is described as being equal to that of the screen of the display device 100 in the present embodiment, the present invention is not limited thereto and the size of the area 4020 corresponding to the screen of the first external device 570 may be different from that of the size of the screen of the display device 100.

Even in this case, the control unit 170 may transform the coordinates of the pointer in the area 4020 corresponding to the screen of the first external device 570 into the coordinates of the pointer on the screen of the first external device 570, based on the size of the area 4020 corresponding to the screen of the first external device 570 and the size of the screen of the first external device 570, as described above.

Specifically, the control unit 170 may transform the x coordinate of the pointer in the area 4020 corresponding to the screen of the first external device 570 into the x coordinate of the pointer on the screen of the first external device 570 using a ratio of the width of the area 4020 corresponding to the screen of the first external device 570 to the width of the screen of the first external device 570, and the control unit 170 may transform they coordinate of the pointer in the area 4020 corresponding to the screen of the first external device 570 into they coordinate of the pointer on the screen of the first external device 570 using a ratio of the height of the area 4020 corresponding to the screen of the first external device 570 to the height of the screen of the first external device 570

Returning to FIG. 36, the method of operating the display device 100 according to the embodiment of the present invention may include step S3660 of receiving the second image from the first external device controlled according to the command and step S3670 of displaying the second image.

This will be described in detail with reference to FIG. 42.

Figure 42:
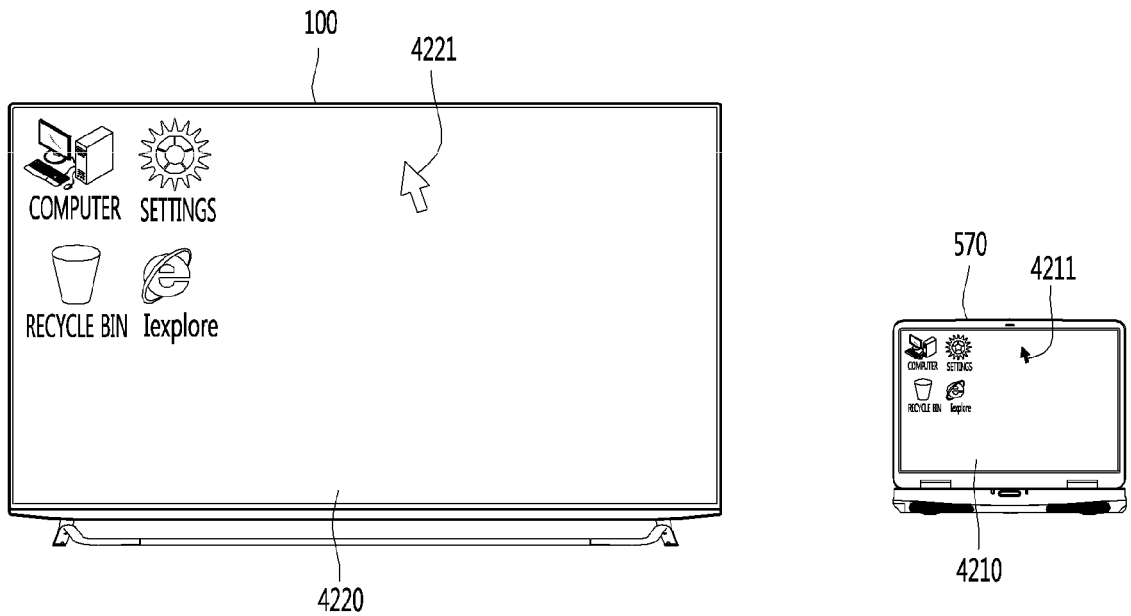
FIG. 42 is a view illustrating a method of, at a display device, receiving and displaying an image displayed on a screen of a first external device.

FIG. 42 is a view illustrating a method of, at a display device, receiving and displaying an image displayed on a screen of a first external device.

As described with reference to FIG. 37, when input provided to the display device 100 is switched to input provided by the first external device, the first external device 570 may provide an image to the display device 100 and the display device 100 may receive and display the image from the first external device 570.

As described with reference to FIG. 37, the display device 100 may receive and display the image displayed on the screen of the first external device 570.

Meanwhile, as described with reference to FIGS. 39 to 41, the first external device 570 may receive the coordinates of the pointer and display the pointer 4210 at the location corresponding to the received coordinates.

In this case, the first external device 570 may transmit an image 4210 including the pointer 4211 to the display device 100.

In this case, the control unit 170 of the display device 100 may receive the image 4210 including the pointer 4211 from the first external device 570. In addition, the control unit 170 may control the display unit 180 to display the received image 4220.

That is, since the display device 100 displays the image 4210 including the pointer 4211 without change, a pointer 4221 corresponding to the pointer 4211 displayed on the first external device 570 is displayed on the screen of the display device 100 without change.

Figure 43:
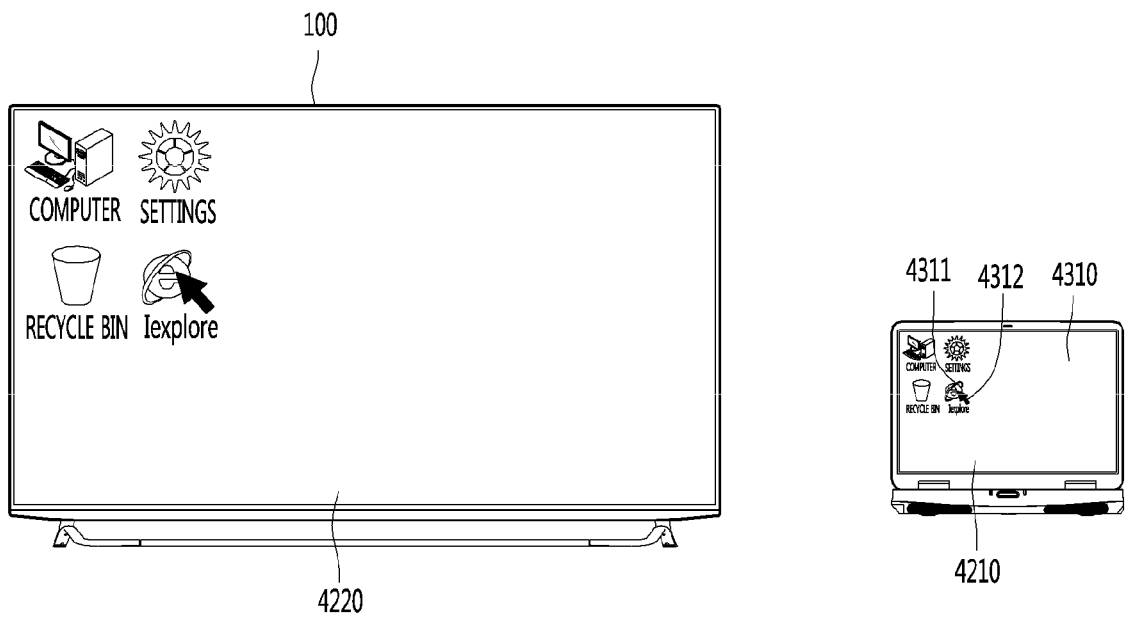
FIGS. 43 to 44 are views illustrating a method of selecting an area where a pointer is located on a screen of a first external device according to an embodiment of the present invention.
Figure 44:
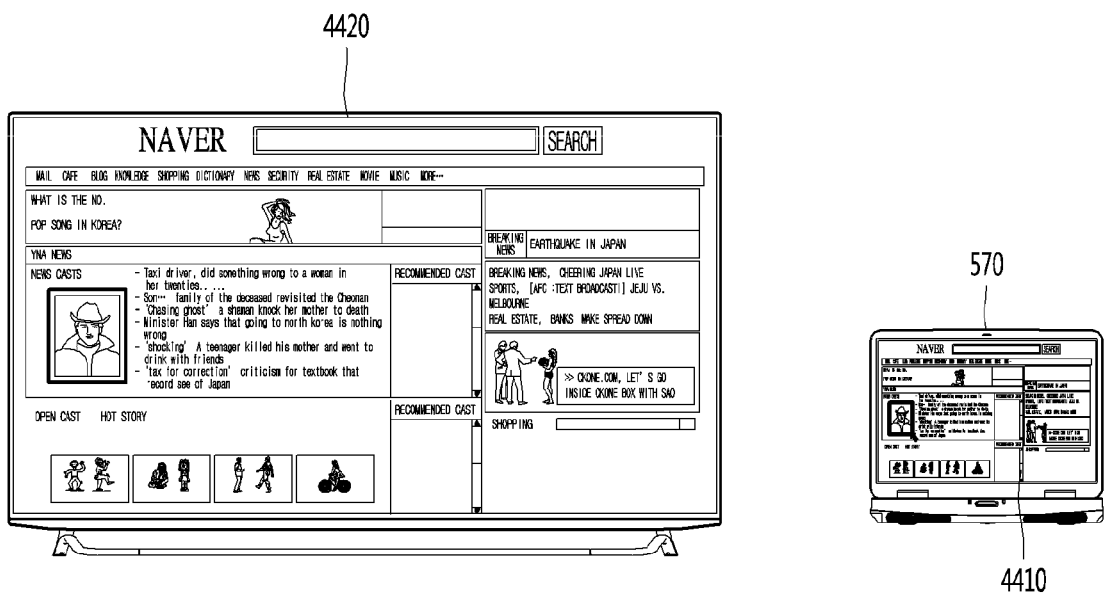

FIGS. 43 to 44 are views illustrating a method of selecting an area where a pointer is located on a screen of a first external device according to an embodiment of the present invention.

As shown in FIG. 43, a pointer 4312 displayed on the screen of the first external device is located in a specific area of the screen of the first external device.

In this case, the user may click a button for selecting the area where the pointer 4312 is located, which is included in the remote control device 200.

Specifically, the remote control device 200 may include a button corresponding to an input device of each of the plurality of external devices. For example, if the first external device 570 is a laptop, the remote control device 200 may include buttons corresponding to the buttons (at least one of a left click button, a right click button and a wheel button) of a mouse which is an input device of the first external device 570.

That is, the button for selecting the area, in which the pointer 4312 is located, on the remote control device 200 may be a button corresponding to the left click button of the mouse which is the input device of the first external device 570.

Meanwhile, the remote control device 200 may transmit a control signal corresponding to input of selecting the area, in which the pointer 4312 is located, to the display device 100.

Meanwhile, when the control signal corresponding to input of selecting the area, in which the pointer 4312 is located, is received from the remote control device 200, the control unit 170 of the display device 100 may transmit a command for selecting the area, in which the pointer 4312 is located, to the first external device 570 based on the received control signal.

Meanwhile, the control unit of the first external device 570 may control the first external device 570 based on the command for selecting the area, in which the pointer 4312 is located.

For example, when the command for selecting the area, in which the pointer 4312 is located, is received, the control unit of the first external device 570 may perform operation of selecting the area, in which the pointer 4312 is located. That is, the first external device 570 may perform the same operation as operation of selecting the area, in which the pointer 4312 is located, through the left click button of the mouse.

In this case, a web browsing icon 4311 is displayed in the area, in which the pointer 4312 is located. Accordingly, when the area, in which the pointer 4312 is located, is selected, the control unit of the first external device 570 may control the first external device 570 by executing a web browser.

In addition, the control unit of the first external device 570 may control the first external device 570, by displaying an image 4410 of the executed web browser, as shown in FIG. 44.

In addition, the control unit of the first external device 570 may transmit, to the display device 100, an image 4410 displayed on the first external device 570 controlled based on the command for selecting the area, in which the pointer 4312 is located.

Meanwhile, the control unit 170 of the display device 100 may receive an image 4420 provided by the first external device 570 controlled based on the command for selecting the area, in which the pointer 4312 is located, and display the received image 4420.

Meanwhile, although movement of the pointer and selection of the area, in which the pointer is located, are described in the present embodiment, the present invention is not limited thereto.

Specifically, the remote control device 200 may include a button corresponding to a button of another input device (or an input unit) excluding the mouse among the input devices (or the input units) of the laptop. For example, the remote control device 200 may include a button corresponding to a power button configuring the input unit installed in the laptop. Meanwhile, when the pointer corresponding to motion of the remote control device 200 deviates from the screen of the display device 100 to be located in the area corresponding to the screen of the first external device 570 such that the pointer is displayed on the screen of the laptop, the remote control device 200 may receive input of selecting the button of the remote control device 200 corresponding to the power button of the laptop. In addition, the control unit 170 of the display device 100 may receive a control signal corresponding to selected input from the remote control device 200. In addition, the control unit 170 of the display device 100 may transmit a control command corresponding to the selected input to the laptop and the laptop may power the laptop off according to the received control command.

As another example, if the external device is a blu-ray player, a button corresponding to the button of the remote control device which is the input device of the blu-ray player or a button corresponding to the button installed in the blu-ray player may be included in the remote control device 200 of the display device 100. Using the same method as the above-described method, the blu-ray player may be controlled using the remote control device 200 of the display device 100.

For example, when input of selecting the button of the remote control device 200 corresponding to a fast forward button of the blu-ray player is received, the remote control device 200 may transmit a control signal corresponding to the selected input to the display device 100. Meanwhile, the control unit 170 of the display device 100 may transmit a control command corresponding to the selected input to the blu-ray player, and the blu-ray player may perform fast forward operation with respect to the currently output video according to the received control command.

In addition, when the blu-ray player performs fast forward operation, video (fast forwarding video) provided by the blu-ray player for performing fast-forwarding operation may be transmitted to the display device 100, and the control unit 170 of the display device 100 may display the fast-forwarding video.

In addition, although the button of the remote control device 200 corresponding to the left click button of the mouse which is the input device of the laptop is described as being selected to control the laptop in the present embodiment, the present invention is not limited thereto. For example, the button of the remote control device 200 corresponding to the right click button of the mouse or the button of the remote control device 200 corresponding to the wheel button of the mouse may be selected to control the laptop.

In addition, the button installed in the remote control device 200 to correspond to the button included in the input device of the external device may be provided separately from the button for controlling the display device 100.

The present invention is not limited thereto and the button provided in the remote control device 200 for controlling the display device 100 may be the same button as the button provided in the remote control device 200 to control the first external device 570. That is, control of the display device 100 and control of the first external device 570 may be performed using user input to the same button.

Specifically, the control unit 100 of the display device 100 may determine whether a control mode using the remote control device 200 is a mode for controlling the first external device 570 or a mode for controlling the display device 100.

More specifically, the control unit 100 of the display device 100 may determine that input to the button provided in the remote control device 200 is input of controlling the display device 100 when the pointer corresponding to motion of the remote control device 200 is located in the area of the screen of the display device 100. That is, when the pointer corresponding to motion of the remote control device 200 is located in the area of the screen of the display device 100 and a control signal is received from the remote control device 200, the control unit 170 of the display device 100 may control the display device 100 based on the received control signal.

In addition, when the pointer corresponding to motion of the remote control device 200 deviates from the screen of the display device 100 to be located in the area corresponding to the screen of the first external device 570 such that the pointer is displayed on the screen of the first external device 570, the control unit 170 of the display device 100 may determine that input to the button provided in the remote control device 200 is input of controlling the first external device 570. That is, when the pointer is displayed on the screen of the first external device 570 and a control signal is received from the remote control device 200, the control unit 170 of the display device 100 may transmit a control command corresponding to the received control signal to the first external device 570 to control the first external device 570.

For example, when the pointer corresponding to motion of the remote control device 200 is located in the area of the screen of the display device 100 and a volume up button provided in the remote control device 200 is selected by the user, the control unit 170 of the display device 100 may raise the volume of the display device 100. In contrast, when the pointer is displayed on the screen of the first external device 570 and the volume up button provided in the remote control device 200 is selected by the user, the control unit 170 of the display device 100 may transmit a volume up command to the first external device 570. In this case, the first external device 570 may raise the volume of the first external device 570 according to the received command.

As another example, a specific button provided in the remote control device 200 may function as a button for changing the channel of the display device 100 when the pointer is located in the area of the screen of the display device 100 and as a button for controlling the brightness of the image displayed on the first external device 570 when the pointer is displayed on the screen of the first external device 570.

Meanwhile, although the button corresponding to the button included in the input device (the input unit) of the external device is described as being provided in the remote control device 200, the present invention is not limited thereto. For example, if the first external device 570 is a laptop, a UI corresponding to the button included in a keyboard which is an input device of the laptop may be displayed on the display device 100. That is, the UI corresponding to the button included in the input device of the external device may be displayed on the display device 100, and the external device may be controlled by selecting the UI displayed on the display device 100. This will be described in detail below.

Figure 45A:
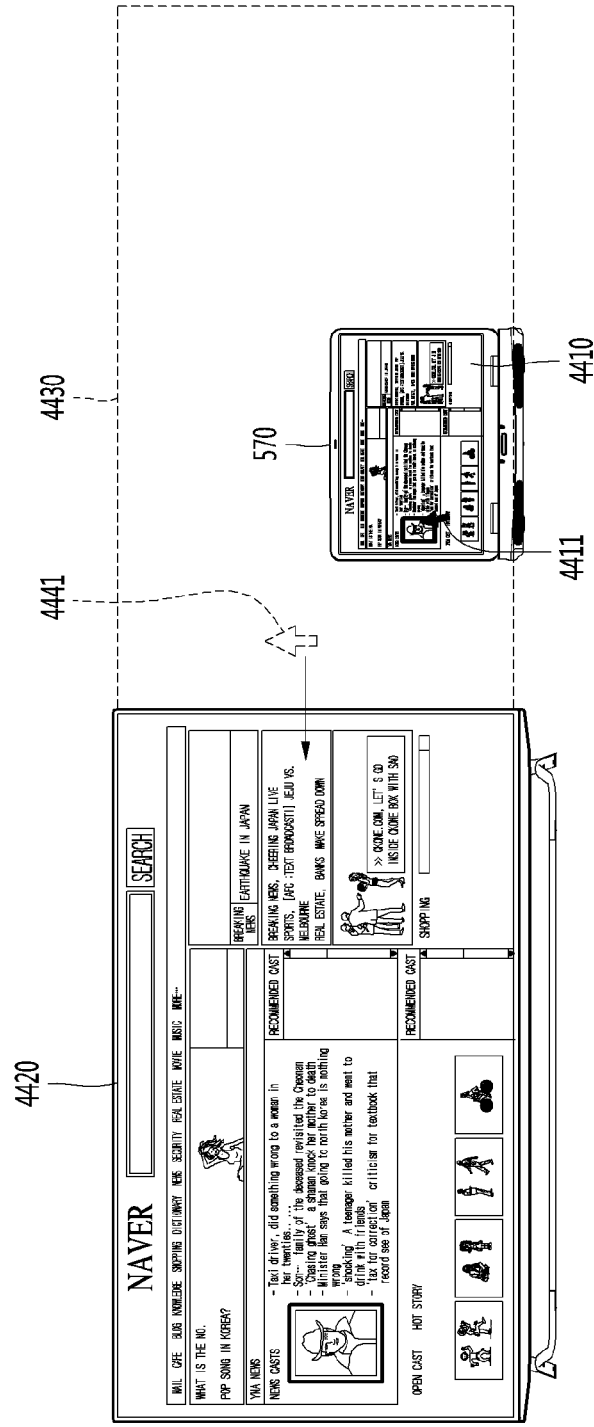

FIGS. 45a to 45b are views illustrating an operation method when a pointer moved to an area outside a screen moves back to an area of the screen according to an embodiment of the present invention.

Currently, a pointer 4441 is located in an area outside the screen of the display device 100 and is located in an area 4430 corresponding to the screen of the first external device 570. Accordingly, the pointer 4411 is displayed in the area of the screen of the first external device 570 corresponding to the location of a virtual pointer 4441 in the area 4430 corresponding to the screen of the first external device 570.

In addition, as described with reference to FIG. 44, the display device 100 is changed to the mode for controlling the first external device 570. Therefore, it is determined that the control signal received by the remote control device 200 is a signal for controlling the first external device 570, and a control command corresponding to the control signal received by the remote control device 200 is being transmitted to the first external device 570.

Meanwhile, when the virtual pointer 4441 located in the area outside the screen is moved to the area of the screen again, the control unit 170 of the display device 100 may display a pointer 4442 corresponding to motion of the remote control device 200 on the screen of the display device 100, as shown in FIG. 45b.

Meanwhile, as the pointer corresponding to motion of the remote control device 200 is moved from the area outside the screen to the area of the screen or as the pointer 4442 corresponding to motion of the remote control device 200 is displayed on the screen of the display device 100, the control unit 170 of the display device 100 may change the operation mode from the mode for controlling the first external device 570 to the operation mode for controlling the display device 100.

Specifically, when the pointer corresponding to motion of the remote control device 200 is moved from the area 4430 outside the screen of the display device 100 to the area of the screen of the display device 100, the control unit 170 of the display device 100 may determine that input to the button provided in the remote control device 200 is input of controlling the display device 100. That is, when the control signal is received from the remote control device 200, the control unit 170 may control the display device 100 based on the received signal.

In this case, all operations for controlling the display device 100 using the remote control device 200 may be performed. In addition, operation of switching the external device for providing input to the display device 100 described with reference to FIGS. 2 to 35 may also be performed.

Meanwhile, although the control method when the external device for providing input to the display device 100 is switched to the first external device is described in the embodiments of FIGS. 37 to 45, the present invention is not limited thereto.

For example, as described with reference to FIGS. 2 to 35, when the pointer is moved from the area of the screen to the area outside the screen such that the external device for providing input to the display device 100 is switched to the first external device, the control unit 170 of the display device 100 may control the first external device described with reference to FIGS. 37 to 45 while the external device for providing input to the display device 100 is switched to the first external device.

In the present invention, it is possible to control all external devices for providing input to a TV only using the remote controller of the TV without operating an external device through an input unit installed in the external device, operating the external device using a remote controller capable of controlling the external device or operating the external device using an integrated remote controller capable of controlling not only the TV but also the external device.

In addition, in the present invention, it is possible to intuitively control the external device for providing input to the display device, by directly displaying the pointer moved in correspondence with the remote controller of the TV on the external device for providing input to the display device.

In addition, in the present invention, since the external device for providing input to the TV is changed and, at the same time, the pointer is displayed on the external device to control the external device, it is possible to easily perform input switching and control of the external device through only one operation.

In addition, in the present invention, it is possible to easily control the pointer displayed on the external device having a relatively small screen using the remote controller for controlling the TV having a relatively large screen, by providing coordinates transformed in consideration of the resolution or size of the screen when the display device provides the coordinates of the pointer to the external device.

In addition, in the present invention, when the external device is controlled by operating the remote controller of the TV, the image provided by the controlled external device is displayed on the TV. Therefore, the user can confirm the control situation through the screen of the external device and confirm the control situation of the external device through the screen of the TV.

Referring to FIGS. 36, 46 and 47 again, a method of controlling an external device when a display unit is not installed in the external device for providing input to the display device 100 will be described.

In FIG. 36, all the methods described with reference to FIGS. 2 to 35 are equally applied to step S3610 of receiving the first control signal including information on motion of the remote control device from the remote control device and step S3620 of switching input provided to the display device to external input when the pointer moved in correspondence with motion of the remote control device is moved from the area of the screen to the area outside the screen, a detailed description of which will be omitted.

Meanwhile, the method of operating the display device according to another embodiment of the present invention may include step S3630 of receiving the first image from the first external device for providing input to the display device when input is switched, and displaying the first image.

This will be described in detail with reference to FIG. 46.

FIG. 46 is a view illustrating operation when an external device for providing input to a display device 100 to a second external device which does not include a display device.

Specifically, when the pointer is moved from the area of the screen to the area outside the screen, input may be switched to input provided by an external device corresponding to a direction in which the pointer deviates from the area of the screen, an external device corresponding to a boundary, through which the pointer deviates from the area of the screen, or an external device corresponding to a boundary and direction, in which the pointer deviates from the area of the screen. In this case, if the external device is a second external device 550, the control unit 170 may switch input provided to the display device 100 to input provided by the second external device 550 among the plurality of external devices communicating with the display device.

Here, assume that the second external device is a set-top box.

The second external device 220 may output an image to the display device 100 and the control unit 170 of the display device 100 may control the display unit 180 to receive the image output from the second external device 550 and to display the received image 4610.

Meanwhile, the second external device 550 is a set-top box which does not include a display unit and may only output an image.

Returning to FIG. 36, the method of operating the display device according to the embodiment of the present invention may include step S3640 of receiving a second control signal from the remote control device, step S3650 of transmitting a command to the first external device based on the second control signal, step S3660 of receiving a second image from the first external device controlled according to the command and step S3670 of displaying the second image.

The control unit 170 may receive a control signal corresponding to input of controlling the second external device 550 from the remote control device 200.

Specifically, the remote control device 200 may include a button corresponding to a button configuring the input device (or the input unit) of the second external device 550.

For example, if the input device of the second external device 550 is a second remote control device, the button corresponding to the button of the second remote control device which is the input device of the second external device 550 may be included in the remote control device 200. As another example, if an input unit including a button is installed in the second external device 550, the button corresponding to the button included in the input unit of the second external device 500 may be included in the remote control device 200.

Meanwhile, the button provided in the remote control device 200 in order to control the display device 100 and the button of the remote control device 200 corresponding to the button of the second remote control device may be equal to each other.

Meanwhile, the control unit 170 of the display device 100 may determine whether the control mode using the remote control device 200 is a mode for controlling the second external device 550 or a mode for controlling the display device 100.

Specifically, if the pointer corresponding to motion of the remote control device 200 is located in the area of the screen of the display device 100, the control unit 100 of the display device 100 may determine that input to the button provided in the remote control device 200 is input of controlling the display device 100.

In contrast, if the pointer corresponding to motion of the remote control device 200 is located in the area outside the screen of the display device 100, the control unit 100 of the display device 100 may determine that input to the button provided in the remote control device 200 is input of controlling the second external device 550.

When the control mode using the remote control device 200 is the mode for controlling the second external device 550 and user input of selecting a specific button of the plurality of buttons of the remote control device 200 respectively corresponding to the plurality of buttons of the second remote control device is received, the remote control device 200 may transmit a control signal corresponding to the user input of selecting the specific button to the display device 100.

In addition, when the control signal corresponding to the user input of selecting the specific button is received from the remote control device 200, the control unit 170 of the display device 100 may transmit a control command corresponding to the user input of selecting the specific button to the second external device 550 and the second external device 550 may control the second external device according to the received control command.

For example, when user input of selecting a specific button of the remote control device 100 corresponding to a channel change button of the second remote control device is received, the remote control device 200 may transmit a control signal corresponding to the user input of selecting the specific button to the display device 100. In this case, the control unit 170 may transmit a control command for changing the channel to the second external device 550 based on the received control signal.

Meanwhile, the control unit of the second external device 500 may control the second external device 500 according to the received control command. For example, the control unit of the second external device 550 may receive broadcast content of the changed channel according to the received channel change command and provide the broadcast image of the changed channel to the display device 100.

Meanwhile, the control unit 170 of the display device 100 may receive the controlled image (the broadcast image of the changed channel) based on the control command for controlling the second external device 550 and control the display unit 180 to display the received image.

FIGS. 47a to 47b are views illustrating a method of controlling an external device when a second external device does not include a display device, according to another embodiment of the present invention.

When specific input is received in a state in which input provided to the display device 100 is switched to input provided by the second external device 550, the control unit 170 of the display device 100 may display one or more UIs 4711, 4712, 4713, 4714 and 4715 for controlling the second external device 550.

Specifically, when the remote control device 200 receives specific input of controlling the second external device 550, the remote control device 200 may transmit a signal corresponding to the specific input to the display device 100.

When the signal corresponding to the specific input is received, the control unit 170 of the display device 100 may display one or more UIs 4711, 4712, 4713, 4714 and 4715 for controlling the second external device 550.

Here, one or more UIs 4711, 4712, 4713, 4714 and 4715 for controlling the second external device 550 may correspond to the buttons installed in the input device of the second external device 500.

For example, if the remote controller of the set-top box includes a power button, a channel change button, a volume button, a menu button and an exit button, one or more UIs 4711, 4712, 4713, 4714 and 4715 for controlling the second external device 550 may correspond to the power button, the channel change button, the volume button, the menu button and the exit button provided in the remote controller of the set-top box, respectively.

Meanwhile, as shown in FIG. 47b, when a specific UI 4712 is selected from among one or more UIs 4711, 4712, 4713, 4714 and 4715 by user input as a pointer 4720 is moved, the control unit 100 of the display device 100 may transmit a control command corresponding to the selected specific UI 4712 to the second external device 550. For example, if a channel up UI is selected, the control unit 100 of the display device 100 may transmit a channel up command to the second external device 550.

Meanwhile, the control unit of the second external device 550 may control the second external device 550 based on the command received from the display device 100. For example, when the channel up command is received from the display device 100, the control unit of the second external device 550 may receive broadcast content corresponding to a channel of a higher number. In addition, the second external device 500 may transmit the broadcast content corresponding to the channel of the higher number to the display device 100, and the control unit 170 of the display device 100 may control the display unit 180 to display the image of the received broadcast content.

The present invention provides an environment in which the external device can be easily controlled using the remote controller of the TV even when the external device does not include a display unit.

Referring to FIGS. 36 and 48 to 50 again, the method of controlling the external device using the image displayed on the display device 100 when the display unit is installed in the external device according to another embodiment of the present invention will be described.

In FIG. 36, all the methods described with reference to FIGS. 2 to 35 are equally applied to step S3610 of receiving the first control signal including the information on motion of the remote control device from the remote control device and step S3620 of switching input provided to the display device to external input when the pointer moved in correspondence with motion of the remote control device is moved from the area of the screen to the area outside the screen, a detailed description of which will be omitted.

FIG. 48 is a view illustrating operation when a third external device for providing input to a display device 100 is a mobile phone.

The method of operating the display device according to another embodiment of the present invention may include step S3630 of receiving a first image from a third external device for providing input to the display device when input is switched and displaying the first image.

Specifically, the control unit 170 may receive an image from the third external device 580 (mobile phone) and control the display unit 180 to display the received image 4820.

Here, the image received from the third external device 580 may be an image 4810 displayed on the screen of the third external device 580. That is, the image 4820 displayed on the display device 100 and the image 4810 displayed on the third external device 580 may be equal to each other.

Accordingly, if the image 4810 displayed on the third external device 580 includes one or more icons 4811, 4812, 4813, 4814, 4815, 4816, 4817, 4818 and, the image 4820 displayed on the display device 100 may also include one or more icons 4821, 4822, 4823, 4824, 4825, 4826, 4827, 4828 and 4829.

Meanwhile, the control unit 170 of the display device 100 may display an UI 4830 corresponding to a button installed in the third external device 580.

For example, the third external device 580 is a mobile phone. When a first button capable of raising the volume, a second button capable of lowering the volume and a third button capable of turning on/off the power are included, the control unit 170 may display a first UI 4831 corresponding to the first button, a second UI 4832 corresponding to the second button and a third UI 4833 corresponding to the third button.

FIG. 49 is a view illustrating a method of receiving user input of selecting a specific area on a screen of a display device.

The method of operating the display device according to the embodiment of the present invention may include step S3640 of receiving a second control signal from the remote control device.

Specifically, as shown in FIG. 49, the control unit 170 of the display device 100 may display a pointer 4910 moved in correspondence with motion of the remote control device.

In addition, when user input of selecting an area, in which the pointer 4910 is located, is received, the remote control device 200 may transmit a signal corresponding to the user input of selecting the area, in which the pointer 4910 is located, to the display device 100.

In addition, the control unit 170 may receive the signal corresponding to the user input of selecting the area, in which the pointer 4910 is located, from the remote control device 200.

Meanwhile, the method of operating the display device according to the embodiment of the present invention may include step of S3650 of transmitting a command to an external device based on a second control signal.

Specifically, based on the signal corresponding to the user input of selecting the area, in which the pointer 4910 is located, the control unit 170 of the display device 100 may transmit a command for selecting an area corresponding to the area, in which the pointer 4910 is located, to the third external device 580.

In this case, the command for selecting an area corresponding to the area, in which the pointer 4910 is located, may be information on the coordinates of the pointer 4910 in the image 4820 displayed on the display device 100 or information on coordinates obtained by transforming the coordinates of the pointer 4910 in the image 4820 displayed on the display device 100 into coordinates corresponding to the screen size of the third external device 580.

Meanwhile, when user input of selecting a first UI 4831 from among a first UI 4931, a second UI 4832 and a third UI 4833 corresponding to the buttons installed in the third external device 580 is received, the control unit 170 of the display device 100 may transmit a command indicating that the button corresponding to the first UI 4831 has been selected to the third external device 580.

FIG. 50 is a view showing a third external device 580, which has received a command, and a display device.

When a command for selecting the area corresponding to the area, in which the pointer 4910 is located, is received, the third external device 580 may perform operation of selecting the area corresponding to the area, in which the pointer 4910 is located.

For example, in FIG. 49, an icon 4821 corresponding to a messenger application is displayed in the area, in which the pointer 4910 is located. An icon 4811 corresponding to the messenger application is also displayed in the area of the screen of the third external device 580.

In this case, when the command for selecting the area corresponding to the area, in which the pointer 4910 is located, is received, the third external device 580 may perform operation of selecting the area corresponding to the area, in which the pointer 4910 is located, that is, operation of selecting the icon 4811 corresponding to the messenger application. Accordingly, the third external device 580 may execute the messenger application and display an execution image 5010 of the executed messenger application.

In addition, the third external device 580 may transmit the execution image 5010 of the messenger application to the display device 100.

In addition, when a command indicating that the button corresponding to a first UI 4831 has been selected from among a first UI 4831, a second UI 4832 and a third UI 4833 corresponding to the buttons installed in the third external device 580 is received, the third external device 580 may perform operation corresponding to the received command.

That is, when the command indicating that the button corresponding to the first UI 4831 has been is received, the third external device 580 may control the third external device 580 according to the received command. For example, when the button corresponding to the first UI 4831 is a volume up button, the control unit of the third external device 580 may raise the volume of the sound output from the third external device 580.

Meanwhile, the method of operating the display device according to the embodiment of the present invention may include step S3660 of receiving a second image from the external device controlled according to the command and step S3670 of displaying the second image.

That is, the display device 100 may receive an image (the execution image of the messenger application) transmitted by the third external device 580 controlled by the command for selecting the area corresponding to the area, in which the pointer 4910 is located.

In addition, the display device 100 may display the received execution image 5020 of the messenger application.

Meanwhile, although the mobile phone is described in the present embodiment, the present invention is not limited thereto. For example, the present embodiment is applicable to the case where the external device for providing input to the display device 100 is a laptop.

For example, if an image displayed on the laptop includes a specific icon, the image received from the laptop and displayed on the display device 100 may also include the specific icon.

In this case, when user input of selecting an area in which the specific icon is located is received, the control unit 170 of the display device 100 may transmit a command for selecting the area corresponding to the area, in which the specific icon is located, to the laptop, and the laptop may perform operation of selecting the area corresponding to the area, in which the specific icon is located. For example, if the specific icon is a web browser icon, the laptop may execute a web browser and display the execution image of the web browser.

As another example, a UI corresponding to a button included in the input device of the laptop, for example, a button included in a keyboard, may be displayed on the display device 100.

In addition, when user input of selecting a specific UI from among a plurality of UIs respectively corresponding to a plurality of buttons included in a keyboard is received, the display device 100 may transmit a command indicating that the specific UI has been selected to the laptop.

In this case, the laptop, which has received the command, may perform operation corresponding to the received command. For example, when a UI corresponding to a "K" button" is selected in a state in which a text input window is activated, the laptop may display the letter "K" in the text input window.

In the present invention, although an external device for providing input to a display device includes a display unit, an image displayed on the external device and a UI corresponding to a button of the external device may be displayed on the display device. Accordingly, the present invention may provide an environment in which the user may control the external device using the image displayed on the TV.

In particular, if the external device for providing input to the display device is an external device (a mobile phone, etc.) having a relatively small screen size, the image displayed on the mobile phone is displayed on the TV, thereby providing an environment in which the user may easily move a pointer on the screen of the TV using the remote controller.

Meanwhile, an application capable of supporting a common protocol in communication between the display device 100 and a plurality of external devices may be installed and executed in the display device 100 and the plurality of external devices.

Meanwhile, the control unit 170 is responsible for controlling the device and may be used interchangeably with a central processing unit, a microprocessor or a processor.

According to one embodiment of the present invention, the above-described method may be implemented as code that can be written to a processor-readable recording medium and can thus be read by a processor. Examples of the processor-readable recording medium include a ROM, a RAM, a CD-ROM, a magnetic tape, a floppy disk, optical data storage, and a carrier wave (e.g., data transmission over the Internet).

The display device according to the present invention should not be limited to configurations and methods of the above-described embodiments, and all or some of the embodiments may be selectively combined with one another to achieve various alterations.

The invention claimed is:

1. A method of operating a display device, the method comprising:

detecting a plurality of external devices communicating with the display device;

receiving a user input of mapping at least one of a direction, in which a pointer moves, and a boundary, to which the pointer moves, to each of the plurality of detected external devices;

mapping and storing information on at least one of the direction and the boundary to each of the plurality of detected external devices based on the user input;

displaying a broadcast content on a screen of the display device using input provided to the display device;

displaying the pointer on the screen;

receiving information on a motion of a remote control device;

acquiring coordinates of the pointer moved in correspondence with the motion of the remote control device based on the information on the motion of the remote control device;

when the pointer is moved to a screen boundary based on the acquired coordinates of the pointer, switching the input provided to the display device to input provided by a first external device corresponding to at least one of a first direction in which the pointer moves or a first boundary to which the pointer moves; and displaying, on the screen, a content provided by the first external device, wherein the screen boundary is a boundary between an area of the screen and an area other than the area of the screen.

2. The method according to claim 1, wherein the switching of the input provided to the display device to the input provided by the first external device includes switching the input provided to the display device to the input provided by the first external device among a plurality of external devices communicating with the display device, and wherein the first external device corresponds to the first direction among a plurality of directions, in which the pointer moves, the first boundary located at a point where the pointer moves, among a plurality of boundaries included in the screen boundary, or a second boundary among the plurality of boundaries and a second direction among the plurality of directions.

3. The method according to claim 2, wherein the switching of the input provided to the display device to the input provided by the first external device includes switching the input provided to the display device to the input provided by the first external device corresponding to the first direction, when the pointer moves in the first direction.

4. The method according to claim 2, wherein the switching of the input provided to the display device to the input provided by the first external device includes switching the input provided to the display device to the input provided by the first external device corresponding to the first boundary, when the pointer moves to the first boundary.

5. The method according to claim 2, wherein the switching of the input provided to the display device to the input provided by the first external device includes switching the input provided to the display device to the input provided by the first external device corresponding to the second boundary and the second direction, when the pointer moves to the second boundary and the pointer moves in the second direction.

6. The method according to claim 1, wherein the displaying of the pointer on the screen includes displaying the pointer on the screen when an input to a specific button included in the remote control device is received,
wherein the receiving of the information on the motion of the remote control device includes receiving the information on the motion of the remote control device in a state in which the input to the specific button is maintained, and
wherein the switching of the input provided to the display device to the input provided by the first external device includes switching the input provided to the display device to the input provided by the first external device when the pointer moves to the screen boundary in a state in which the input to the specific button is maintained.

7. The method according to claim 1, further comprising displaying at least one of the direction and the boundary corresponding to each of the plurality of external devices.

8. The method according to claim 1, further comprising:
receiving information on a second motion of the remote control device in a state in which the input provided to the display device is switched to the input provided by the first external device;
acquiring the coordinates of the pointer or a virtual pointer moved in correspondence with the second motion of the remote control device based on the information on the second motion of the remote control device;
switching the input provided to the display device from the input provided by the first external device to an input provided by a second external device communicating with the display device when the virtual pointer moved in correspondence with the second motion is moved from the area outside the screen to the area of the screen or when the pointer moved in correspondence with the second motion is moved to the screen boundary, based on the coordinates of the pointer or the virtual pointer moved in correspondence with the second motion; and
displaying, one the screen, a content provided by the second external device.

9. A display device comprising:
a display unit configured to display an image;
a user input interface unit configured to receive information on a motion of a remote control device;
an external input interface unit configured to receive input provided to the display device; and
a control unit configured to:
detect a plurality of external devices communicating with the display device,
receive a user input of mapping at least one of a direction, in which the pointer moves and a boundary, to which the pointer moves, to each of the plurality of detected external devices,
map and store information on at least one of the direction and the boundary to each of the plurality of detected external devices based on the user input,
display, on a screen of the display unit, a broadcast content using input provided to the display device,
display the pointer on the screen,
acquire coordinates of the pointer moved in correspondence with the motion of the remote control device based on the information on the motion of the remote control device,
when the pointer is moved to a screen boundary based on the acquired coordinates of the pointer, switch the input provided to the display device to input provided by a first external device corresponding to at least one of a first direction in which the pointer moves or a first boundary to which the pointer moves, and
display, on the screen, a content provided by the first external device,
wherein the screen boundary is a boundary between an area of the screen and an area other than the area of the screen.

10. The display device according to claim 9, wherein the control unit switches the input provided to the display device to the input provided by the first external device among a plurality of external devices communicating with the display device, and
wherein the first external device corresponds to the first direction among a plurality of directions, in which the pointer moves, the first boundary located at a point where the pointer moves, among a plurality of boundaries included in the screen boundary, or a second boundary among the plurality of boundaries and a second direction among the plurality of directions.

11. The display device according to claim 10, wherein the control unit switches the input provided to the display device to the input provided by the first external device corresponding to the first direction, when the pointer moves in the first direction.

12. The display device according to claim 10, wherein the control unit switches the input provided to the display device to the input provided by the first external device corresponding to the first boundary, when the pointer moves to the first boundary.

13. The display device according to claim 10, wherein the control unit switches the input provided to the display device to the input provided by the first external device corresponding to the second boundary and the second direction, when the pointer moves to the second boundary and the pointer moves in the second direction.

14. The display device according to claim 9, wherein the control unit displays the pointer on the screen when an input to a specific button included in the remote control device is received, receives the information on the motion of the remote control device in a state in which the input to the specific button is maintained, and switches the input provided to the display device to the input provided by the first external device when the pointer moves to the screen boundary in a state in which the input to the specific button is maintained.

15. The display device according to claim 9, wherein the control unit displays at least one of the direction and the boundary corresponding to each of the plurality of external devices.

16. The display device according to claim 9, wherein the control unit receives information on a second motion of the remote control device in a state in which the input provided to the display device is switched to the input provided by the first external device, acquires the coordinates of the pointer or a virtual pointer moved in correspondence with the second motion of the remote control device based on the information on the second motion of the remote control device, switches the input provided to the display device from the input provided by the first external device to an input provided by a second external device communicating with the display device when the virtual pointer moved in correspondence with the second motion is moved from the area outside the screen to the area of the screen or when the pointer moved in correspondence with the second motion is moved to the screen boundary, based on the coordinates of the pointer or the virtual pointer moved in correspondence with the second motion, and displays, on the screen, a content provided by the second external device.

* * * * *